US012795802B2

(12) United States Patent
Lang et al.

(10) Patent No.: US 12,795,802 B2
(45) Date of Patent: *Nov. 10, 2026

(54) CONTEXTUALIZATION OF VOICE INPUTS

(71) Applicant: Sonos, Inc., Santa Barbara, CA (US)

(72) Inventors: Jonathan P. Lang, Santa Barbara, CA (US); Romi Kadri, Cambridge, MA (US); Christopher Butts, Evanston, IL (US)

(73) Assignee: Sonos, Inc., Santa Barbara, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 18/654,711

(22) Filed: May 3, 2024

(65) Prior Publication Data

US 2025/0081314 A1 Mar. 6, 2025

Related U.S. Application Data

(63) Continuation of application No. 17/528,843, filed on Nov. 17, 2021, now Pat. No. 11,979,960, which is a (Continued)

(51) Int. Cl.
*G10L 15/00* (2013.01)
*G06F 3/16* (2006.01)
(Continued)

(52) U.S. Cl.
CPC ........... *H05B 47/165* (2020.01); *G06F 3/165* (2013.01); *G06F 3/167* (2013.01); *G10L 15/22* (2013.01);
(Continued)

(58) Field of Classification Search
CPC ............... G10L 15/22; G10L 2015/223; G10L 15/26; G10L 15/265; G10L 15/30; G10L 15/08;
(Continued)

(56) References Cited

U.S. PATENT DOCUMENTS

| | | | |
|---|---|---|---|
| 999,715 | A | 8/1911 | Gundersen |
| 4,741,038 | A | 4/1988 | Elko et al. |

(Continued)

FOREIGN PATENT DOCUMENTS

| | | | |
|---|---|---|---|
| AU | 2017100486 | A4 | 6/2017 |
| AU | 2017100581 | A4 | 6/2017 |

(Continued)

OTHER PUBLICATIONS

US 9,299,346 B1, 03/2016, Hart et al. (withdrawn)

(Continued)

*Primary Examiner* — Edgar X Guerra-Erazo

(74) *Attorney, Agent, or Firm* — FORTEM IP LLP

(57) ABSTRACT

Disclosed herein are example techniques to provide contextual information corresponding to a voice command. An example implementation may involve receiving voice data indicating a voice command, receiving contextual information indicating a characteristic of the voice command, and determining a device operation corresponding to the voice command. Determining the device operation corresponding to the voice command may include identifying, among multiple zones of a media playback system, a zone that corresponds to the characteristic of the voice command, and determining that the voice command corresponds to one or more particular devices that are associated with the identified zone. The example implementation may further involve causing the one or more particular devices to perform the device operation.

20 Claims, 6 Drawing Sheets

Related U.S. Application Data continuation of application No. 16/819,755, filed on Mar. 16, 2020, now Pat. No. 11,184,969, which is a continuation of application No. 16/192,126, filed on Nov. 15, 2018, now Pat. No. 10,593,331, which is a continuation of application No. 15/211,689, filed on Jul. 15, 2016, now Pat. No. 10,134,399.

(51) Int. Cl.

| | |
|---|---|
| ***G10L 15/22*** | (2006.01) |
| ***G10L 15/30*** | (2013.01) |
| ***G10L 17/22*** | (2013.01) |
| ***H05B 47/165*** | (2020.01) |
| *G01S 5/18* | (2006.01) |

(52) U.S. Cl.
CPC .............. *G10L 15/30* (2013.01); *G10L 17/22* (2013.01); *G01S 5/18* (2013.01); *G10L 2015/223* (2013.01); *G10L 2015/226* (2013.01); *G10L 2015/228* (2013.01)

(58) Field of Classification Search
CPC ................... G10L 15/00; G10L 17/005; G10L 2021/02166; G10L 25/78; G10L 17/22; G10L 2021/02082; G10L 25/72; G06F 3/167; G06F 3/0482; G06F 3/16; G06F 3/165; H04R 2227/005; H04R 1/406; H04R 3/005
See application file for complete search history.

(56) References Cited

U.S. PATENT DOCUMENTS

| | | | |
|---|---|---|---|
| 4,941,187 | A | 7/1990 | Slater |
| 4,974,213 | A | 11/1990 | Siwecki |
| 5,036,538 | A | 7/1991 | Oken et al. |
| 5,440,644 | A | 8/1995 | Farinelli et al. |
| 5,588,065 | A | 12/1996 | Tanaka et al. |
| 5,717,768 | A | 2/1998 | Laroche |
| 5,740,260 | A | 4/1998 | Odom |
| 5,761,320 | A | 6/1998 | Farinelli et al. |
| 5,857,172 | A | 1/1999 | Rozak |
| 5,923,902 | A | 7/1999 | Inagaki |
| 5,949,414 | A | 9/1999 | Namikata et al. |
| 6,032,202 | A | 2/2000 | Lea et al. |
| 6,070,140 | A | 5/2000 | Tran |
| 6,088,459 | A | 7/2000 | Hobelsberger |
| 6,219,645 | B1 | 4/2001 | Byers |
| 6,256,554 | B1 | 7/2001 | DiLorenzo |
| 6,301,603 | B1 | 10/2001 | Maher et al. |
| 6,311,157 | B1 | 10/2001 | Strong |
| 6,366,886 | B1 | 4/2002 | Dragosh et al. |
| 6,404,811 | B1 | 6/2002 | Cvetko et al. |
| 6,408,078 | B1 | 6/2002 | Hobelsberger |
| 6,469,633 | B1 | 10/2002 | Wachter |
| 6,522,886 | B1 | 2/2003 | Youngs et al. |
| 6,594,347 | B1 | 7/2003 | Calder et al. |
| 6,594,630 | B1 | 7/2003 | Zlokarnik et al. |
| 6,611,537 | B1 | 8/2003 | Edens et al. |
| 6,611,604 | B1 | 8/2003 | Irby et al. |
| 6,631,410 | B1 | 10/2003 | Kowalski et al. |
| 6,704,671 | B1 | 3/2004 | Umminger, III |
| 6,757,517 | B2 | 6/2004 | Chang |
| 6,778,869 | B2 | 8/2004 | Champion |
| 6,937,977 | B2 | 8/2005 | Gerson |
| 7,099,821 | B2 | 8/2006 | Visser et al. |
| 7,103,542 | B2 | 9/2006 | Doyle |
| 7,130,608 | B2 | 10/2006 | Hollstrom et al. |
| 7,130,616 | B2 | 10/2006 | Janik |
| 7,143,939 | B2 | 12/2006 | Henzerling |
| 7,174,299 | B2 | 2/2007 | Fujii et al. |
| 7,228,275 | B1 | 6/2007 | Endo et al. |
| 7,236,773 | B2 | 6/2007 | Thomas |
| 7,295,548 | B2 | 11/2007 | Blank et al. |
| 7,356,471 | B2 | 4/2008 | Ito et al. |
| 7,383,297 | B1 | 6/2008 | Atsmon et al. |
| 7,391,791 | B2 | 6/2008 | Balassanian et al. |
| 7,483,538 | B2 | 1/2009 | McCarty et al. |
| 7,516,068 | B1 | 4/2009 | Clark |
| 7,571,014 | B1 | 8/2009 | Lambourne et al. |
| 7,577,757 | B2 | 8/2009 | Carter et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,661,107 | B1 | 2/2010 | Van Dyke et al. |
| 7,702,508 | B2 | 4/2010 | Bennett |
| 7,705,565 | B2 | 4/2010 | Patino et al. |
| 7,792,311 | B1 | 9/2010 | Holmgren et al. |
| 7,853,341 | B2 | 12/2010 | McCarty et al. |
| 7,961,892 | B2 | 6/2011 | Fedigan |
| 7,987,294 | B2 | 7/2011 | Bryce et al. |
| 8,014,423 | B2 | 9/2011 | Thaler et al. |
| 8,019,076 | B1 | 9/2011 | Lambert |
| 8,032,383 | B1 | 10/2011 | Bhardwaj et al. |
| 8,041,565 | B1 | 10/2011 | Bhardwaj et al. |
| 8,045,952 | B2 | 10/2011 | Qureshey et al. |
| 8,073,125 | B2 | 12/2011 | Zhang et al. |
| 8,073,681 | B2 | 12/2011 | Baldwin et al. |
| 8,085,947 | B2 | 12/2011 | Haulick et al. |
| 8,103,009 | B2 | 1/2012 | McCarty et al. |
| 8,136,040 | B2 | 3/2012 | Fleming |
| 8,165,867 | B1 | 4/2012 | Fish |
| 8,233,632 | B1 | 7/2012 | Macdonald et al. |
| 8,234,395 | B2 | 7/2012 | Millington |
| 8,239,206 | B1 | 8/2012 | LeBeau et al. |
| 8,255,224 | B2 | 8/2012 | Singleton et al. |
| 8,284,982 | B2 | 10/2012 | Bailey |
| 8,290,603 | B1 | 10/2012 | Lambourne |
| 8,325,909 | B2 | 12/2012 | Tashev et al. |
| 8,340,975 | B1 | 12/2012 | Rosenberger |
| 8,364,481 | B2 | 1/2013 | Strope et al. |
| 8,385,557 | B2 | 2/2013 | Tashev et al. |
| 8,386,261 | B2 | 2/2013 | Mellott et al. |
| 8,386,523 | B2 | 2/2013 | Mody et al. |
| 8,423,893 | B2 | 4/2013 | Ramsay et al. |
| 8,428,758 | B2 | 4/2013 | Naik et al. |
| 8,453,058 | B1 | 5/2013 | Coccaro et al. |
| 8,473,618 | B2 | 6/2013 | Spear et al. |
| 8,483,853 | B1 | 7/2013 | Lambourne |
| 8,484,025 | B1 | 7/2013 | Moreno et al. |
| 8,489,398 | B1 | 7/2013 | Gruenstein |
| 8,566,722 | B2 | 10/2013 | Gordon et al. |
| 8,588,849 | B2 | 11/2013 | Patterson et al. |
| 8,594,320 | B2 | 11/2013 | Faller |
| 8,600,443 | B2 | 12/2013 | Kawaguchi et al. |
| 8,620,232 | B2 | 12/2013 | Helsloot |
| 8,639,214 | B1 | 1/2014 | Fujisaki |
| 8,676,273 | B1 | 3/2014 | Fujisaki |
| 8,710,970 | B2 | 4/2014 | Oelrich et al. |
| 8,719,039 | B1 | 5/2014 | Sharifi |
| 8,738,925 | B1 | 5/2014 | Park et al. |
| 8,762,156 | B2 | 6/2014 | Chen |
| 8,768,712 | B1 | 7/2014 | Sharifi |
| 8,775,191 | B1 | 7/2014 | Sharifi et al. |
| 8,798,995 | B1 | 8/2014 | Edara |
| 8,831,761 | B2 | 9/2014 | Kemp et al. |
| 8,831,957 | B2 | 9/2014 | Taubman et al. |
| 8,848,879 | B1 | 9/2014 | Coughlan et al. |
| 8,861,756 | B2 | 10/2014 | Zhu et al. |
| 8,874,448 | B1 | 10/2014 | Kauffmann et al. |
| 8,898,063 | B1 | 11/2014 | Sykes et al. |
| 8,938,394 | B1 | 1/2015 | Faaborg et al. |
| 8,942,252 | B2 | 1/2015 | Balassanian et al. |
| 8,983,383 | B1 | 3/2015 | Haskin |
| 8,983,844 | B1 | 3/2015 | Thomas et al. |
| 9,002,024 | B2 | 4/2015 | Nakadai et al. |
| 9,015,049 | B2 | 4/2015 | Baldwin et al. |
| 9,042,556 | B2 | 5/2015 | Kallai et al. |
| 9,047,857 | B1 | 6/2015 | Barton |
| 9,060,224 | B1 | 6/2015 | List |
| 9,070,367 | B1 | 6/2015 | Hoffmeister et al. |
| 9,088,336 | B2 | 7/2015 | Mani et al. |

(56) References Cited

U.S. PATENT DOCUMENTS 9,094,539 B1 7/2015 Noble
9,098,467 B1 8/2015 Blanksteen et al.
9,124,650 B2 9/2015 Maharajh et al.
9,124,711 B2 9/2015 Park et al.
9,148,742 B1 9/2015 Koulomzin et al.
9,183,845 B1 11/2015 Gopalakrishnan et al.
9,190,043 B2 11/2015 Krisch et al.
9,208,785 B2 12/2015 Ben-David et al.
9,215,545 B2 12/2015 Dublin et al.
9,226,088 B2 12/2015 Pandey et al.
9,245,527 B2 1/2016 Lindahl
9,251,793 B2 2/2016 Lebeau et al.
9,253,572 B2 2/2016 Beddingfield, Sr. et al.
9,262,612 B2 2/2016 Cheyer
9,263,042 B1 2/2016 Sharifi
9,275,637 B1 3/2016 Salvador et al.
9,288,597 B2 3/2016 Carlsson et al.
9,300,266 B2 3/2016 Grokop
9,304,736 B1 4/2016 Whiteley et al.
9,307,321 B1 4/2016 Unruh
9,313,317 B1 4/2016 Lebeau et al.
9,318,107 B1 4/2016 Sharifi
9,319,816 B1 4/2016 Narayanan
9,324,322 B1 4/2016 Torok et al.
9,335,819 B1 5/2016 Jaeger et al.
9,354,687 B2 5/2016 Bansal et al.
9,361,878 B2 6/2016 Boukadakis
9,361,885 B2 6/2016 Ganong, III et al.
9,368,105 B1 6/2016 Freed et al.
9,373,329 B2 6/2016 Strope et al.
9,374,634 B2 6/2016 Macours
9,386,154 B2 7/2016 Baciu et al.
9,390,708 B1 7/2016 Hoffmeister
9,401,058 B2 7/2016 De La Fuente et al.
9,412,392 B2 8/2016 Lindahl et al.
9,426,567 B2 8/2016 Lee et al.
9,431,021 B1 8/2016 Scalise et al.
9,443,516 B2 9/2016 Katuri et al.
9,443,527 B1 9/2016 Watanabe et al.
9,472,201 B1 10/2016 Sleator
9,472,203 B1 10/2016 Ayrapetian et al.
9,484,030 B1 11/2016 Meaney et al.
9,489,948 B1 11/2016 Chu et al.
9,491,033 B1 11/2016 Soyannwo et al.
9,494,683 B1 11/2016 Sadek
9,509,269 B1 11/2016 Rosenberg
9,510,101 B1 11/2016 Polleros
9,514,476 B2 12/2016 Kay et al.
9,514,747 B1 12/2016 Bisani et al.
9,514,752 B2 12/2016 Sharifi
9,516,081 B2 12/2016 Tebbs et al.
9,532,139 B1 12/2016 Lu et al.
9,536,541 B2 1/2017 Chen et al.
9,542,941 B1 1/2017 Weksler et al.
9,548,053 B1 1/2017 Basye et al.
9,548,066 B2 1/2017 Jain et al.
9,552,816 B2 1/2017 Vanlund et al.
9,554,210 B1 1/2017 Ayrapetian et al.
9,558,755 B1 1/2017 Laroche et al.
9,560,441 B1 1/2017 McDonough, Jr. et al.
9,576,591 B2 2/2017 Kim et al.
9,601,116 B2 3/2017 Casado et al.
9,615,170 B2 4/2017 Kirsch et al.
9,615,171 B1 4/2017 O'Neill et al.
9,626,695 B2 4/2017 Balasubramanian et al.
9,632,748 B2 4/2017 Faaborg et al.
9,633,186 B2 4/2017 Ingrassia, Jr. et al.
9,633,368 B2 4/2017 Greenzeiger et al.
9,633,660 B2 4/2017 Haughay et al.
9,633,661 B1 4/2017 Typrin et al.
9,633,671 B2 4/2017 Giacobello et al.
9,633,674 B2 4/2017 Sinha et al.
9,640,179 B1 5/2017 Hart et al.
9,640,183 B2 5/2017 Jung et al.
9,640,194 B1 5/2017 Nemala et al.
9,641,919 B1 5/2017 Poole et al.
9,646,614 B2 5/2017 Bellegarda et al.
9,648,564 B1 5/2017 Cui et al.
9,653,060 B1 5/2017 Hilmes et al.
9,653,075 B1 5/2017 Chen et al.
9,659,555 B1 5/2017 Hilmes et al.
9,672,812 B1 6/2017 Watanabe et al.
9,672,821 B2 6/2017 Krishnaswamy et al.
9,674,587 B2 6/2017 Triplett et al.
9,685,171 B1 6/2017 Yang
9,691,378 B1 6/2017 Meyers et al.
9,691,379 B1 6/2017 Mathias et al.
9,691,384 B1 6/2017 Wang et al.
9,697,826 B2 7/2017 Sainath et al.
9,697,828 B1 7/2017 Prasad et al.
9,698,999 B2 7/2017 Mutagi et al.
9,704,478 B1 7/2017 Mtaladevuni et al.
9,706,320 B2 7/2017 Starobin et al.
9,721,566 B2 8/2017 Newendorp et al.
9,721,568 B1 8/2017 Polansky et al.
9,721,570 B1 8/2017 Beal et al.
9,728,188 B1 8/2017 Rosen et al.
9,734,822 B1 8/2017 Sundaram et al.
9,736,578 B2 8/2017 Iyengar et al.
9,743,204 B1 8/2017 Welch et al.
9,743,207 B1 8/2017 Hartung
9,747,011 B2 8/2017 Lewis et al.
9,747,899 B2 8/2017 Pogue et al.
9,747,920 B2 8/2017 Ayrapetian et al.
9,747,926 B2 8/2017 Sharifi et al.
9,749,738 B1 8/2017 Adsumilli et al.
9,749,760 B2 8/2017 Lambourne
9,754,605 B1 9/2017 Chhetri
9,756,422 B2 9/2017 Paquier et al.
9,762,967 B2 9/2017 Clarke et al.
9,767,786 B2 9/2017 Starobin et al.
9,769,420 B1 9/2017 Moses
9,779,725 B2 10/2017 Sun et al.
9,779,732 B2 10/2017 Lee et al.
9,779,734 B2 10/2017 Lee
9,779,735 B2 10/2017 Civelli et al.
9,781,532 B2 10/2017 Sheen
9,799,330 B2 10/2017 Nemala et al.
9,805,733 B2 10/2017 Park
9,811,314 B2 11/2017 Plagge et al.
9,812,128 B2 11/2017 Mixter et al.
9,813,810 B1 11/2017 Nongpiur
9,813,812 B2 11/2017 Berthelsen et al.
9,818,407 B1 11/2017 Secker-Walker et al.
9,820,036 B1 11/2017 Tritschler et al.
9,820,039 B2 11/2017 Lang
9,826,306 B2 11/2017 Lang
9,865,259 B1 1/2018 Typrin et al.
9,865,264 B2 1/2018 Gelfenbeyn et al.
9,875,740 B1 1/2018 Kumar et al.
9,881,616 B2 1/2018 Beckley et al.
9,898,250 B1 2/2018 Williams et al.
9,899,021 B1 2/2018 Vitaladevuni et al.
9,900,723 B1 2/2018 Choisel et al.
9,916,839 B1 3/2018 Scalise et al.
9,940,930 B1 4/2018 Campbell et al.
9,947,316 B2 4/2018 Millington et al.
9,947,333 B1 4/2018 David
9,972,318 B1 5/2018 Kelly et al.
9,972,343 B1 5/2018 Thorson et al.
9,973,849 B1 5/2018 Zhang et al.
9,979,560 B2 5/2018 Kim et al.
9,992,642 B1 6/2018 Rapp et al.
9,997,151 B1 6/2018 Ayrapetian et al.
10,013,381 B2 7/2018 Mayman et al.
10,013,995 B1 7/2018 Lashkari et al.
10,025,447 B1 7/2018 Dixit et al.
10,026,401 B1 7/2018 Mutagi et al.
10,028,069 B1 7/2018 Lang
10,038,419 B1 7/2018 Elliot et al.
10,048,930 B1 8/2018 Vega et al.
10,049,675 B2 8/2018 Haughay
10,051,366 B1 8/2018 Buoni et al.
10,051,600 B1 8/2018 Zhong et al.

(56) References Cited

U.S. PATENT DOCUMENTS

| | | | |
|---|---|---|---|
| 10,057,698 | B2 | 8/2018 | Drinkwater et al. |
| RE47,049 | E | 9/2018 | Zhu et al. |
| 10,068,573 | B1 | 9/2018 | Aykac et al. |
| 10,074,369 | B2 | 9/2018 | Devaraj et al. |
| 10,074,371 | B1 | 9/2018 | Wang et al. |
| 10,079,015 | B1 | 9/2018 | Lockhart et al. |
| 10,089,981 | B1 | 10/2018 | Elangovan et al. |
| 10,097,919 | B2 | 10/2018 | Jarvis et al. |
| 10,108,393 | B2 | 10/2018 | Millington et al. |
| 10,115,400 | B2 | 10/2018 | Wilberding |
| 10,116,748 | B2 | 10/2018 | Farmer et al. |
| 10,127,908 | B1 | 11/2018 | Deller et al. |
| 10,127,911 | B2 | 11/2018 | Kim et al. |
| 10,134,388 | B1 | 11/2018 | Lilly |
| 10,134,398 | B2 | 11/2018 | Sharifi |
| 10,134,399 | B2 | 11/2018 | Lang et al. |
| 10,136,204 | B1 | 11/2018 | Poole et al. |
| 10,152,969 | B2 | 12/2018 | Reilly et al. |
| 10,157,042 | B1 | 12/2018 | Jayakumar et al. |
| 10,181,323 | B2 | 1/2019 | Beckhardt et al. |
| 10,186,265 | B1 | 1/2019 | Lockhart et al. |
| 10,186,266 | B1 | 1/2019 | Devaraj et al. |
| 10,186,276 | B2 | 1/2019 | Dewasurendra et al. |
| 10,192,546 | B1 | 1/2019 | Piersol et al. |
| 10,204,624 | B1 | 2/2019 | Knudson et al. |
| 10,224,056 | B1 | 3/2019 | Torok et al. |
| 10,225,651 | B2 | 3/2019 | Lang |
| 10,229,680 | B1 | 3/2019 | Gillespie et al. |
| 10,241,754 | B1 | 3/2019 | Kadarundalagi Raghuram Doss et al. |
| 10,248,376 | B2 | 4/2019 | Keyser-Allen et al. |
| 10,249,205 | B2 | 4/2019 | Hammersley et al. |
| 10,276,161 | B2 | 4/2019 | Hughes et al. |
| 10,297,256 | B2 | 5/2019 | Reilly et al. |
| 10,304,440 | B1 | 5/2019 | Panchapagesan et al. |
| 10,304,475 | B1 | 5/2019 | Wang et al. |
| 10,318,236 | B1 | 6/2019 | Pal et al. |
| 10,332,508 | B1 | 6/2019 | Hoffmeister |
| 10,339,917 | B2 | 7/2019 | Aleksic et al. |
| 10,339,957 | B1 | 7/2019 | Chenier et al. |
| 10,346,122 | B1 | 7/2019 | Morgan |
| 10,354,650 | B2 | 7/2019 | Gruenstein et al. |
| 10,354,658 | B2 | 7/2019 | Wilberding |
| 10,365,887 | B1 | 7/2019 | Mulherkar |
| 10,365,889 | B2 | 7/2019 | Plagge et al. |
| 10,366,688 | B2 | 7/2019 | Gunn et al. |
| 10,366,699 | B1 | 7/2019 | Dharia et al. |
| 10,374,816 | B1 | 8/2019 | Leblang et al. |
| 10,381,001 | B2 | 8/2019 | Gunn et al. |
| 10,381,002 | B2 | 8/2019 | Gunn et al. |
| 10,381,003 | B2 | 8/2019 | Wakisaka et al. |
| 10,388,272 | B1 | 8/2019 | Thomson et al. |
| 10,424,296 | B2 | 9/2019 | Penilla et al. |
| 10,433,058 | B1 | 10/2019 | Torgerson et al. |
| 10,445,057 | B2 | 10/2019 | Vega et al. |
| 10,445,365 | B2 | 10/2019 | Luke et al. |
| 10,469,966 | B2 | 11/2019 | Lambourne |
| 10,482,899 | B2 | 11/2019 | Ramprashad et al. |
| 10,499,146 | B2 | 12/2019 | Lang et al. |
| 10,510,340 | B1 | 12/2019 | Fu et al. |
| 10,510,362 | B2 | 12/2019 | Hicks et al. |
| 10,511,904 | B2 | 12/2019 | Buoni et al. |
| 10,515,625 | B1 | 12/2019 | Metallinou et al. |
| 10,522,146 | B1 | 12/2019 | Tushinskiy |
| 10,546,583 | B2 | 1/2020 | White et al. |
| 10,555,077 | B2 | 2/2020 | Jarvis |
| 10,565,998 | B2 | 2/2020 | Wilberding |
| 10,565,999 | B2 | 2/2020 | Wilberding |
| 10,567,515 | B1 | 2/2020 | Bao |
| 10,573,312 | B1 | 2/2020 | Thomson et al. |
| 10,573,321 | B1 | 2/2020 | Smith et al. |
| 10,580,405 | B1 | 3/2020 | Wang et al. |
| 10,586,534 | B1 | 3/2020 | Argyropoulos et al. |
| 10,586,540 | B1 | 3/2020 | Smith et al. |
| 10,593,328 | B1 | 3/2020 | Wang et al. |
| 10,593,330 | B2 | 3/2020 | Sharifi |
| 10,599,287 | B2 | 3/2020 | Kumar et al. |
| 10,600,406 | B1 | 3/2020 | Shapiro et al. |
| 10,602,268 | B1 | 3/2020 | Soto |
| 10,614,807 | B2 | 4/2020 | Beckhardt et al. |
| 10,621,981 | B2 | 4/2020 | Sereshki |
| 10,622,009 | B1 | 4/2020 | Zhang et al. |
| 10,623,811 | B1 | 4/2020 | Cwik |
| 10,624,612 | B2 | 4/2020 | Sumi et al. |
| 10,643,609 | B1 | 5/2020 | Pogue et al. |
| 10,645,130 | B2 | 5/2020 | Corbin et al. |
| 10,672,383 | B1 | 6/2020 | Thomson et al. |
| 10,679,625 | B1 | 6/2020 | Lockhart et al. |
| 10,681,460 | B2 | 6/2020 | Woo et al. |
| 10,685,669 | B1 | 6/2020 | Lan et al. |
| 10,694,608 | B2 | 6/2020 | Baker et al. |
| 10,699,711 | B2 | 6/2020 | Reilly |
| 10,706,843 | B1 | 7/2020 | Elangovan et al. |
| 10,712,997 | B2 | 7/2020 | Wilberding et al. |
| 10,720,173 | B2 | 7/2020 | Freeman et al. |
| 10,728,196 | B2 | 7/2020 | Wang |
| 10,735,870 | B2 | 8/2020 | Ballande et al. |
| 10,740,065 | B2 | 8/2020 | Jarvis et al. |
| 10,746,840 | B1 | 8/2020 | Barton et al. |
| 10,748,531 | B2 | 8/2020 | Kim |
| 10,762,896 | B1 | 9/2020 | Yavagal et al. |
| 10,777,189 | B1 | 9/2020 | Fu et al. |
| 10,777,203 | B1 | 9/2020 | Pasko |
| 10,789,041 | B2 | 9/2020 | Kim et al. |
| 10,797,667 | B2 | 10/2020 | Fish et al. |
| 10,824,682 | B2 | 11/2020 | Alvares et al. |
| 10,825,471 | B2 | 11/2020 | Walley et al. |
| 10,837,667 | B2 | 11/2020 | Nelson et al. |
| 10,847,137 | B1 | 11/2020 | Mandal et al. |
| 10,847,143 | B2 | 11/2020 | Millington et al. |
| 10,847,149 | B1 | 11/2020 | Mok et al. |
| 10,847,164 | B2 | 11/2020 | Wilberding |
| 10,848,885 | B2 | 11/2020 | Lambourne |
| RE48,371 | E | 12/2020 | Zhu et al. |
| 10,867,596 | B2 | 12/2020 | Yoneda et al. |
| 10,867,604 | B2 | 12/2020 | Smith et al. |
| 10,871,943 | B1 | 12/2020 | D'Amato |
| 10,878,811 | B2 | 12/2020 | Smith et al. |
| 10,878,826 | B2 | 12/2020 | Li et al. |
| 10,885,091 | B1 | 1/2021 | Meng et al. |
| 10,897,679 | B2 | 1/2021 | Lambourne |
| 10,911,596 | B1 | 2/2021 | Do et al. |
| 10,943,598 | B2 | 3/2021 | Singh et al. |
| 10,964,314 | B2 | 3/2021 | Jazi et al. |
| 10,971,158 | B1 | 4/2021 | Patangay et al. |
| 11,024,311 | B2 | 6/2021 | Mixter et al. |
| 11,025,569 | B2 | 6/2021 | Lind et al. |
| 11,050,615 | B2 | 6/2021 | Mathews et al. |
| 11,062,705 | B2 | 7/2021 | Watanabe et al. |
| 11,095,978 | B2 | 8/2021 | Gigandet et al. |
| 11,100,923 | B2 | 8/2021 | Fainberg et al. |
| 11,127,405 | B1 | 9/2021 | Antos et al. |
| 11,137,979 | B2 | 10/2021 | Plagge |
| 11,138,969 | B2 | 10/2021 | D'Amato |
| 11,140,494 | B2 | 10/2021 | Pedersen et al. |
| 11,159,878 | B1 | 10/2021 | Chatlani et al. |
| 11,172,328 | B2 | 11/2021 | Soto et al. |
| 11,172,329 | B2 | 11/2021 | Soto et al. |
| 11,175,880 | B2 | 11/2021 | Liu et al. |
| 11,184,704 | B2 | 11/2021 | Jarvis |
| 11,184,969 | B2 | 11/2021 | Lang |
| 11,189,284 | B2 | 11/2021 | Maeng |
| 11,206,052 | B1 | 12/2021 | Park et al. |
| 11,212,612 | B2 | 12/2021 | Lang et al. |
| 11,264,019 | B2 | 3/2022 | Bhattacharya et al. |
| 11,277,512 | B1 | 3/2022 | Leeds et al. |
| 11,302,326 | B2 | 4/2022 | Sereshki |
| 11,315,556 | B2 | 4/2022 | Smith et al. |
| 11,354,092 | B2 | 6/2022 | D'Amato |
| 11,361,763 | B1 | 6/2022 | Maas et al. |
| 11,373,645 | B1 | 6/2022 | Mathew et al. |
| 11,388,532 | B2 | 7/2022 | Lambourne |
| 11,411,763 | B2 | 8/2022 | Mackay et al. |
| 11,445,301 | B2 | 9/2022 | Park et al. |

(56) References Cited

U.S. PATENT DOCUMENTS 11,475,899 B2 10/2022 Lesso
11,514,898 B2 11/2022 Millington
11,531,520 B2 12/2022 Wilberding
11,532,306 B2 12/2022 Kim et al.
11,580,969 B2 2/2023 Han et al.
11,646,023 B2 5/2023 Smith
11,664,023 B2 5/2023 Reilly
11,694,689 B2 7/2023 Smith
11,700,139 B2 7/2023 Drake
11,709,653 B1 7/2023 Shin
11,714,600 B2 8/2023 D'Amato
11,727,936 B2 8/2023 Smith
11,769,505 B2 9/2023 Sereshki
11,790,937 B2 10/2023 Smith et al.
11,816,393 B2 11/2023 Vega-Zayas et al.
11,817,076 B2 11/2023 Sereshki et al.
11,832,068 B2 11/2023 Jarvis et al.
11,979,960 B2 * 5/2024 Lang ........................ G06F 3/165
2001/0003173 A1 6/2001 Lim
2001/0042107 A1 11/2001 Palm
2002/0022453 A1 2/2002 Balog et al.
2002/0026442 A1 2/2002 Lipscomb et al.
2002/0034280 A1 3/2002 Infosino
2002/0046023 A1 4/2002 Fujii et al.
2002/0054685 A1 5/2002 Avendano et al.
2002/0055950 A1 5/2002 Witteman
2002/0072816 A1 6/2002 Shdema et al.
2002/0116196 A1 8/2002 Tran
2002/0124097 A1 9/2002 Isely et al.
2002/0143532 A1 10/2002 McLean et al.
2003/0015354 A1 1/2003 Edwards et al.
2003/0038848 A1 2/2003 Lee et al.
2003/0040908 A1 2/2003 Yang et al.
2003/0070182 A1 4/2003 Pierre et al.
2003/0070869 A1 4/2003 Hlibowicki
2003/0072462 A1 4/2003 Hlibowicki
2003/0095672 A1 5/2003 Hobelsberger
2003/0097482 A1 5/2003 DeHart et al.
2003/0130850 A1 7/2003 Badt et al.
2003/0157951 A1 8/2003 Hasty, Jr.
2003/0235244 A1 12/2003 Pessoa et al.
2004/0024478 A1 2/2004 Hans et al.
2004/0093219 A1 5/2004 Shin et al.
2004/0105566 A1 6/2004 Matsunaga et al.
2004/0127241 A1 7/2004 Shostak
2004/0128135 A1 7/2004 Anastasakos et al.
2004/0153321 A1 8/2004 Chung et al.
2004/0161082 A1 8/2004 Brown et al.
2004/0234088 A1 11/2004 McCarty et al.
2005/0031131 A1 2/2005 Browning et al.
2005/0031132 A1 2/2005 Browning et al.
2005/0031133 A1 2/2005 Browning et al.
2005/0031134 A1 2/2005 Leske
2005/0031137 A1 2/2005 Browning et al.
2005/0031138 A1 2/2005 Browning et al.
2005/0031139 A1 2/2005 Browning et al.
2005/0031140 A1 2/2005 Browning
2005/0033582 A1 2/2005 Gadd et al.
2005/0047606 A1 3/2005 Lee et al.
2005/0077843 A1 4/2005 Benditt
2005/0131558 A1 6/2005 Braithwaite et al.
2005/0164664 A1 7/2005 DiFonzo et al.
2005/0195988 A1 9/2005 Tashev et al.
2005/0201254 A1 9/2005 Looney et al.
2005/0207584 A1 9/2005 Bright
2005/0235334 A1 10/2005 Togashi et al.
2005/0254662 A1 11/2005 Blank et al.
2005/0268234 A1 12/2005 Rossi et al.
2005/0283330 A1 12/2005 Laraia et al.
2005/0283475 A1 12/2005 Beranek et al.
2006/0004834 A1 1/2006 Pyhalammi et al.
2006/0023945 A1 2/2006 King et al.
2006/0041431 A1 2/2006 Maes
2006/0093128 A1 5/2006 Oxford
2006/0104451 A1 5/2006 Browning et al.
2006/0104454 A1 5/2006 Guitarte Perez et al.
2006/0147058 A1 7/2006 Wang
2006/0161964 A1 7/2006 Chung
2006/0190269 A1 8/2006 Tessel et al.
2006/0190968 A1 8/2006 Jung et al.
2006/0247913 A1 11/2006 Huerta et al.
2006/0262943 A1 11/2006 Oxford
2007/0018844 A1 1/2007 Sutardja
2007/0019815 A1 1/2007 Asada et al.
2007/0033043 A1 2/2007 Hyakumoto
2007/0038461 A1 2/2007 Abbott et al.
2007/0038999 A1 2/2007 Millington
2007/0060054 A1 3/2007 Romesburg
2007/0071206 A1 3/2007 Gainsboro et al.
2007/0071255 A1 3/2007 Schobben
2007/0076131 A1 4/2007 Li et al.
2007/0076906 A1 4/2007 Takagi et al.
2007/0140058 A1 6/2007 McIntosh et al.
2007/0140521 A1 6/2007 Mitobe et al.
2007/0142944 A1 6/2007 Goldberg et al.
2007/0147651 A1 6/2007 Mitobe et al.
2007/0201639 A1 8/2007 Park et al.
2007/0254604 A1 11/2007 Kim
2007/0286426 A1 12/2007 Xiang et al.
2008/0008333 A1 1/2008 Nishikawa et al.
2008/0031466 A1 2/2008 Buck et al.
2008/0037814 A1 2/2008 Shau
2008/0090537 A1 4/2008 Sutardja
2008/0090617 A1 4/2008 Sutardja
2008/0144858 A1 6/2008 Khawand et al.
2008/0146289 A1 6/2008 Korneluk et al.
2008/0160977 A1 7/2008 Ahmaniemi et al.
2008/0182518 A1 7/2008 Lo
2008/0192946 A1 8/2008 Faller
2008/0207115 A1 8/2008 Lee et al.
2008/0208594 A1 8/2008 Cross et al.
2008/0221897 A1 9/2008 Cerra et al.
2008/0247530 A1 10/2008 Barton et al.
2008/0248797 A1 10/2008 Freeman et al.
2008/0291896 A1 11/2008 Tuubel et al.
2008/0291916 A1 11/2008 Xiong et al.
2008/0301729 A1 12/2008 Broos et al.
2009/0003620 A1 1/2009 McKillop et al.
2009/0005893 A1 1/2009 Sugii et al.
2009/0010445 A1 1/2009 Matsuo
2009/0013255 A1 1/2009 Yuschik et al.
2009/0018828 A1 1/2009 Nakadai et al.
2009/0043206 A1 2/2009 Towfiq et al.
2009/0046866 A1 2/2009 Feng et al.
2009/0052688 A1 2/2009 Ishibashi et al.
2009/0076821 A1 3/2009 Brenner et al.
2009/0113053 A1 4/2009 Van Wie et al.
2009/0153289 A1 6/2009 Hope et al.
2009/0191854 A1 7/2009 Beason
2009/0197524 A1 8/2009 Haff et al.
2009/0214048 A1 8/2009 Stokes, III et al.
2009/0220107 A1 9/2009 Every et al.
2009/0228919 A1 9/2009 Zott et al.
2009/0238377 A1 9/2009 Ramakrishnan et al.
2009/0238386 A1 9/2009 Usher et al.
2009/0248397 A1 10/2009 Garcia et al.
2009/0249222 A1 10/2009 Schmidt et al.
2009/0264072 A1 10/2009 Dai
2009/0299745 A1 12/2009 Kennewick et al.
2009/0323907 A1 12/2009 Gupta et al.
2009/0323924 A1 12/2009 Tashev et al.
2009/0326949 A1 12/2009 Douthitt et al.
2010/0014690 A1 1/2010 Wolff et al.
2010/0023638 A1 1/2010 Bowman
2010/0035593 A1 2/2010 Franco et al.
2010/0041443 A1 2/2010 Yokota
2010/0070276 A1 3/2010 Wasserblat et al.
2010/0070922 A1 3/2010 DeMaio et al.
2010/0075723 A1 3/2010 Min et al.
2010/0088100 A1 4/2010 Lindahl
2010/0092004 A1 4/2010 Kuze
2010/0161335 A1 6/2010 Whynot
2010/0172516 A1 7/2010 Lastrucci
2010/0178873 A1 7/2010 Lee et al.

(56) References Cited

U.S. PATENT DOCUMENTS

| | | | |
|---|---|---|---|
| 2010/0179806 | A1 | 7/2010 | Zhang et al. |
| 2010/0179874 | A1 | 7/2010 | Higgins et al. |
| 2010/0185448 | A1 | 7/2010 | Meisel |
| 2010/0211199 | A1 | 8/2010 | Naik et al. |
| 2010/0260348 | A1 | 10/2010 | Bhow et al. |
| 2010/0278351 | A1 | 11/2010 | Fozunbal et al. |
| 2010/0299639 | A1 | 11/2010 | Ramsay et al. |
| 2010/0329472 | A1 | 12/2010 | Nakadai et al. |
| 2010/0332236 | A1 | 12/2010 | Tan |
| 2011/0019833 | A1 | 1/2011 | Kuech et al. |
| 2011/0033059 | A1 | 2/2011 | Bhaskar et al. |
| 2011/0035580 | A1 | 2/2011 | Wang et al. |
| 2011/0044461 | A1 | 2/2011 | Kuech et al. |
| 2011/0044489 | A1 | 2/2011 | Saiki et al. |
| 2011/0046952 | A1 | 2/2011 | Koshinaka |
| 2011/0066634 | A1 | 3/2011 | Phillips et al. |
| 2011/0091055 | A1 | 4/2011 | Leblanc |
| 2011/0103615 | A1 | 5/2011 | Sun |
| 2011/0131032 | A1 | 6/2011 | Yang et al. |
| 2011/0145581 | A1 | 6/2011 | Malhotra et al. |
| 2011/0170707 | A1 | 7/2011 | Yamada et al. |
| 2011/0176687 | A1 | 7/2011 | Birkenes |
| 2011/0182436 | A1 | 7/2011 | Murgia et al. |
| 2011/0202924 | A1 | 8/2011 | Banguero et al. |
| 2011/0218656 | A1 | 9/2011 | Bishop et al. |
| 2011/0267985 | A1 | 11/2011 | Wilkinson et al. |
| 2011/0276333 | A1 | 11/2011 | Wang et al. |
| 2011/0280422 | A1 | 11/2011 | Neumeyer et al. |
| 2011/0285808 | A1 | 11/2011 | Feng et al. |
| 2011/0289506 | A1 | 11/2011 | Trivi et al. |
| 2011/0299706 | A1 | 12/2011 | Sakai |
| 2012/0009906 | A1 | 1/2012 | Patterson et al. |
| 2012/0020485 | A1 | 1/2012 | Visser et al. |
| 2012/0020486 | A1 | 1/2012 | Fried et al. |
| 2012/0022863 | A1 | 1/2012 | Cho et al. |
| 2012/0022864 | A1 | 1/2012 | Leman et al. |
| 2012/0027218 | A1 | 2/2012 | Every et al. |
| 2012/0076308 | A1 | 3/2012 | Kuech et al. |
| 2012/0078635 | A1 | 3/2012 | Rothkopf et al. |
| 2012/0086568 | A1 | 4/2012 | Scott et al. |
| 2012/0123268 | A1 | 5/2012 | Tanaka et al. |
| 2012/0128160 | A1 | 5/2012 | Kim et al. |
| 2012/0131125 | A1 | 5/2012 | Seidel et al. |
| 2012/0148075 | A1 | 6/2012 | Goh et al. |
| 2012/0162540 | A1 | 6/2012 | Ouchi et al. |
| 2012/0163603 | A1 | 6/2012 | Abe et al. |
| 2012/0177215 | A1 | 7/2012 | Bose et al. |
| 2012/0183149 | A1 | 7/2012 | Hiroe |
| 2012/0224457 | A1 | 9/2012 | Kim et al. |
| 2012/0224715 | A1 | 9/2012 | Kikkeri |
| 2012/0237047 | A1 | 9/2012 | Neal et al. |
| 2012/0245941 | A1 | 9/2012 | Cheyer |
| 2012/0265528 | A1 | 10/2012 | Gruber et al. |
| 2012/0288100 | A1 | 11/2012 | Cho |
| 2012/0297284 | A1 | 11/2012 | Matthews, III et al. |
| 2012/0308044 | A1 | 12/2012 | Vander Mey et al. |
| 2012/0308046 | A1 | 12/2012 | Muza |
| 2013/0006453 | A1 | 1/2013 | Wang et al. |
| 2013/0024018 | A1 | 1/2013 | Chang et al. |
| 2013/0034241 | A1 | 2/2013 | Pandey et al. |
| 2013/0039527 | A1 | 2/2013 | Jensen et al. |
| 2013/0051755 | A1 | 2/2013 | Brown et al. |
| 2013/0058492 | A1 | 3/2013 | Silzle et al. |
| 2013/0066453 | A1 | 3/2013 | Seefeldt |
| 2013/0073293 | A1 | 3/2013 | Jang et al. |
| 2013/0080146 | A1 | 3/2013 | Kato et al. |
| 2013/0080167 | A1 | 3/2013 | Mozer |
| 2013/0080171 | A1 | 3/2013 | Mozer et al. |
| 2013/0124211 | A1 | 5/2013 | Mcdonough |
| 2013/0129100 | A1 | 5/2013 | Sorensen |
| 2013/0148821 | A1 | 6/2013 | Sorensen |
| 2013/0170647 | A1 | 7/2013 | Reilly et al. |
| 2013/0171930 | A1 | 7/2013 | Anand et al. |
| 2013/0179173 | A1 | 7/2013 | Lee et al. |
| 2013/0183944 | A1 | 7/2013 | Mozer et al. |
| 2013/0185639 | A1 | 7/2013 | Lim |
| 2013/0191119 | A1 | 7/2013 | Sugiyama |
| 2013/0191122 | A1 | 7/2013 | Mason |
| 2013/0198298 | A1 | 8/2013 | Li et al. |
| 2013/0211826 | A1 | 8/2013 | Mannby |
| 2013/0216056 | A1 | 8/2013 | Thyssen |
| 2013/0230184 | A1 | 9/2013 | Kuech et al. |
| 2013/0238326 | A1 | 9/2013 | Kim et al. |
| 2013/0262101 | A1 | 10/2013 | Srinivasan |
| 2013/0283169 | A1 | 10/2013 | Van Wie |
| 2013/0289994 | A1 | 10/2013 | Newman et al. |
| 2013/0294611 | A1 | 11/2013 | Yoo et al. |
| 2013/0301840 | A1 | 11/2013 | Yemdji et al. |
| 2013/0315420 | A1 | 11/2013 | You |
| 2013/0317635 | A1 | 11/2013 | Bates et al. |
| 2013/0322462 | A1 | 12/2013 | Poulsen |
| 2013/0322634 | A1 | 12/2013 | Bennett et al. |
| 2013/0322665 | A1 | 12/2013 | Bennett et al. |
| 2013/0324031 | A1 | 12/2013 | Loureiro |
| 2013/0329896 | A1 | 12/2013 | Krishnaswamy et al. |
| 2013/0331970 | A1 | 12/2013 | Beckhardt et al. |
| 2013/0332165 | A1 | 12/2013 | Beckley et al. |
| 2013/0336499 | A1 | 12/2013 | Beckhardt et al. |
| 2013/0339028 | A1 | 12/2013 | Rosner et al. |
| 2013/0343567 | A1 | 12/2013 | Triplett et al. |
| 2014/0003611 | A1 | 1/2014 | Mohammad et al. |
| 2014/0003625 | A1 | 1/2014 | Sheen et al. |
| 2014/0003635 | A1 | 1/2014 | Mohammad et al. |
| 2014/0005813 | A1 | 1/2014 | Reimann |
| 2014/0006026 | A1 | 1/2014 | Lamb et al. |
| 2014/0006825 | A1 | 1/2014 | Shenhav |
| 2014/0019743 | A1 | 1/2014 | DeLuca |
| 2014/0034929 | A1 | 2/2014 | Hamada et al. |
| 2014/0046464 | A1 | 2/2014 | Reimann |
| 2014/0056435 | A1 | 2/2014 | Nems et al. |
| 2014/0064476 | A1 | 3/2014 | Mani et al. |
| 2014/0064501 | A1 | 3/2014 | Olsen et al. |
| 2014/0073298 | A1 | 3/2014 | Rossmann |
| 2014/0075306 | A1 | 3/2014 | Rega |
| 2014/0075311 | A1 | 3/2014 | Boettcher et al. |
| 2014/0094151 | A1 | 4/2014 | Klappert et al. |
| 2014/0100854 | A1 | 4/2014 | Chen et al. |
| 2014/0108010 | A1 | 4/2014 | Maltseff et al. |
| 2014/0109138 | A1 | 4/2014 | Cannistraro et al. |
| 2014/0122075 | A1 | 5/2014 | Bak et al. |
| 2014/0122092 | A1 | 5/2014 | Goldstein |
| 2014/0126745 | A1 | 5/2014 | Dickins et al. |
| 2014/0136195 | A1 | 5/2014 | Abdossalami et al. |
| 2014/0145168 | A1 | 5/2014 | Ohsawa et al. |
| 2014/0146983 | A1 | 5/2014 | Kim et al. |
| 2014/0149118 | A1 | 5/2014 | Lee et al. |
| 2014/0159581 | A1 | 6/2014 | Pruemmer et al. |
| 2014/0161263 | A1 | 6/2014 | Koishida et al. |
| 2014/0163978 | A1 | 6/2014 | Basye et al. |
| 2014/0164400 | A1 | 6/2014 | Kruglick |
| 2014/0167929 | A1 | 6/2014 | Shim et al. |
| 2014/0167931 | A1 | 6/2014 | Lee et al. |
| 2014/0168344 | A1 | 6/2014 | Shoemake et al. |
| 2014/0172899 | A1 | 6/2014 | Hakkani-Tur et al. |
| 2014/0172953 | A1 | 6/2014 | Blanksteen |
| 2014/0181199 | A1 | 6/2014 | Kumar et al. |
| 2014/0181271 | A1 | 6/2014 | Millington |
| 2014/0188476 | A1 | 7/2014 | Li et al. |
| 2014/0192986 | A1 | 7/2014 | Lee et al. |
| 2014/0195252 | A1 | 7/2014 | Gruber et al. |
| 2014/0200881 | A1 | 7/2014 | Chatlani |
| 2014/0207457 | A1 | 7/2014 | Biatov et al. |
| 2014/0214429 | A1 | 7/2014 | Pantel |
| 2014/0215332 | A1 | 7/2014 | Lee et al. |
| 2014/0219472 | A1 | 8/2014 | Huang et al. |
| 2014/0222436 | A1 | 8/2014 | Binder et al. |
| 2014/0229184 | A1 | 8/2014 | Shires |
| 2014/0229959 | A1 | 8/2014 | Beckhardt et al. |
| 2014/0244013 | A1 | 8/2014 | Reilly |
| 2014/0244269 | A1 | 8/2014 | Tokutake |
| 2014/0244712 | A1 | 8/2014 | Walters et al. |
| 2014/0249817 | A1 | 9/2014 | Hart et al. |
| 2014/0252386 | A1 | 9/2014 | Ito et al. |
| 2014/0253676 | A1 | 9/2014 | Nagase et al. |

(56) References Cited

U.S. PATENT DOCUMENTS

| | | | |
|---|---|---|---|
| 2014/0254805 | A1 | 9/2014 | Su et al. |
| 2014/0258292 | A1 | 9/2014 | Thramann et al. |
| 2014/0259075 | A1 | 9/2014 | Chang et al. |
| 2014/0269757 | A1 | 9/2014 | Park et al. |
| 2014/0270216 | A1 | 9/2014 | Tsilfidis et al. |
| 2014/0270282 | A1 | 9/2014 | Tammi et al. |
| 2014/0274185 | A1 | 9/2014 | Luna et al. |
| 2014/0274203 | A1 | 9/2014 | Ganong, III et al. |
| 2014/0274218 | A1 | 9/2014 | Kadiwala et al. |
| 2014/0277650 | A1 | 9/2014 | Zurek et al. |
| 2014/0278343 | A1 | 9/2014 | Tran |
| 2014/0278372 | A1 | 9/2014 | Nakadai et al. |
| 2014/0278445 | A1 | 9/2014 | Eddington, Jr. |
| 2014/0278933 | A1 | 9/2014 | McMillan |
| 2014/0288686 | A1 | 9/2014 | Sant et al. |
| 2014/0291642 | A1 | 10/2014 | Watabe et al. |
| 2014/0303969 | A1 | 10/2014 | Inose et al. |
| 2014/0310002 | A1 | 10/2014 | Nitz et al. |
| 2014/0310614 | A1 | 10/2014 | Jones |
| 2014/0324203 | A1 | 10/2014 | Coburn, IV et al. |
| 2014/0328490 | A1 | 11/2014 | Mohammad et al. |
| 2014/0330896 | A1 | 11/2014 | Addala et al. |
| 2014/0334645 | A1 | 11/2014 | Yun et al. |
| 2014/0340888 | A1 | 11/2014 | Ishisone et al. |
| 2014/0357248 | A1 | 12/2014 | Tonshal et al. |
| 2014/0358535 | A1 | 12/2014 | Lee et al. |
| 2014/0363022 | A1 | 12/2014 | Dizon et al. |
| 2014/0363024 | A1 | 12/2014 | Apodaca |
| 2014/0364089 | A1 | 12/2014 | Lienhart et al. |
| 2014/0365225 | A1 | 12/2014 | Haiut |
| 2014/0365227 | A1 | 12/2014 | Cash et al. |
| 2014/0368734 | A1 | 12/2014 | Hoffert et al. |
| 2014/0369491 | A1 | 12/2014 | Kloberdans et al. |
| 2014/0372109 | A1 | 12/2014 | Iyer et al. |
| 2015/0006176 | A1 | 1/2015 | Pogue et al. |
| 2015/0006184 | A1 | 1/2015 | Marti et al. |
| 2015/0010169 | A1 | 1/2015 | Popova et al. |
| 2015/0014680 | A1 | 1/2015 | Yamazaki et al. |
| 2015/0016642 | A1 | 1/2015 | Walsh et al. |
| 2015/0018992 | A1 | 1/2015 | Griffiths et al. |
| 2015/0019201 | A1 | 1/2015 | Schoenbach |
| 2015/0019219 | A1 | 1/2015 | Tzirkel-Hancock et al. |
| 2015/0030172 | A1 | 1/2015 | Gaensler et al. |
| 2015/0032443 | A1 | 1/2015 | Karov et al. |
| 2015/0032456 | A1 | 1/2015 | Wait |
| 2015/0036831 | A1 | 2/2015 | Klippel |
| 2015/0039303 | A1 | 2/2015 | Lesso et al. |
| 2015/0039310 | A1 | 2/2015 | Clark et al. |
| 2015/0039311 | A1 | 2/2015 | Clark et al. |
| 2015/0039317 | A1 | 2/2015 | Klein et al. |
| 2015/0058018 | A1 | 2/2015 | Georges et al. |
| 2015/0063580 | A1 | 3/2015 | Huang et al. |
| 2015/0066479 | A1 | 3/2015 | Pasupalak et al. |
| 2015/0073807 | A1 | 3/2015 | Kumar |
| 2015/0086034 | A1 | 3/2015 | Lombardi et al. |
| 2015/0088500 | A1 | 3/2015 | Conliffe |
| 2015/0091709 | A1 | 4/2015 | Reichert et al. |
| 2015/0092947 | A1 | 4/2015 | Gossain et al. |
| 2015/0104037 | A1 | 4/2015 | Lee et al. |
| 2015/0106085 | A1 | 4/2015 | Lindahl |
| 2015/0110294 | A1 | 4/2015 | Chen et al. |
| 2015/0112672 | A1 | 4/2015 | Giacobello et al. |
| 2015/0112689 | A1 | 4/2015 | Nandy et al. |
| 2015/0124975 | A1 | 5/2015 | Pontoppidan |
| 2015/0126255 | A1 | 5/2015 | Yang et al. |
| 2015/0128065 | A1 | 5/2015 | Torii et al. |
| 2015/0134456 | A1 | 5/2015 | Baldwin |
| 2015/0154953 | A1 | 6/2015 | Bapat et al. |
| 2015/0154954 | A1 | 6/2015 | Sharifi |
| 2015/0154976 | A1 | 6/2015 | Mutagi |
| 2015/0161990 | A1 | 6/2015 | Sharifi |
| 2015/0169279 | A1 | 6/2015 | Duga |
| 2015/0170645 | A1 | 6/2015 | Di Censo et al. |
| 2015/0170665 | A1 | 6/2015 | Gundeti et al. |
| 2015/0172843 | A1 | 6/2015 | Quan |
| 2015/0179181 | A1 | 6/2015 | Morris et al. |
| 2015/0180432 | A1 | 6/2015 | Gao et al. |
| 2015/0181318 | A1 | 6/2015 | Gautama et al. |
| 2015/0189438 | A1 | 7/2015 | Hampiholi et al. |
| 2015/0200454 | A1 | 7/2015 | Heusdens et al. |
| 2015/0200923 | A1 | 7/2015 | Triplett |
| 2015/0201271 | A1 | 7/2015 | Diethorn et al. |
| 2015/0215382 | A1 | 7/2015 | Arora et al. |
| 2015/0221307 | A1 | 8/2015 | Shah et al. |
| 2015/0221678 | A1 | 8/2015 | Yamazaki et al. |
| 2015/0222563 | A1 | 8/2015 | Burns et al. |
| 2015/0222987 | A1 | 8/2015 | Angel, Jr. et al. |
| 2015/0228274 | A1 | 8/2015 | Leppanen et al. |
| 2015/0228803 | A1 | 8/2015 | Koezuka et al. |
| 2015/0237406 | A1 | 8/2015 | Ochoa et al. |
| 2015/0243287 | A1 | 8/2015 | Nakano et al. |
| 2015/0245152 | A1 | 8/2015 | Ding et al. |
| 2015/0245154 | A1 | 8/2015 | Dadu et al. |
| 2015/0248885 | A1 | 9/2015 | Koulomzin |
| 2015/0249889 | A1 | 9/2015 | Iyer et al. |
| 2015/0253292 | A1 | 9/2015 | Larkin et al. |
| 2015/0253960 | A1 | 9/2015 | Lin et al. |
| 2015/0254057 | A1 | 9/2015 | Klein et al. |
| 2015/0263174 | A1 | 9/2015 | Yamazaki et al. |
| 2015/0271593 | A1 | 9/2015 | Sun et al. |
| 2015/0277846 | A1 | 10/2015 | Yen et al. |
| 2015/0279351 | A1 | 10/2015 | Nguyen et al. |
| 2015/0280676 | A1 | 10/2015 | Holman et al. |
| 2015/0296299 | A1 | 10/2015 | Klippel et al. |
| 2015/0302856 | A1 | 10/2015 | Kim et al. |
| 2015/0319529 | A1 | 11/2015 | Klippel |
| 2015/0325267 | A1 | 11/2015 | Lee et al. |
| 2015/0331663 | A1 | 11/2015 | Beckhardt et al. |
| 2015/0334471 | A1 | 11/2015 | Innes et al. |
| 2015/0338917 | A1 | 11/2015 | Steiner et al. |
| 2015/0341406 | A1 | 11/2015 | Rockefeller et al. |
| 2015/0346845 | A1 | 12/2015 | Di Censo et al. |
| 2015/0348548 | A1 | 12/2015 | Piernot et al. |
| 2015/0348551 | A1 | 12/2015 | Gruber et al. |
| 2015/0355878 | A1 | 12/2015 | Corbin |
| 2015/0356968 | A1 | 12/2015 | Rice et al. |
| 2015/0363061 | A1 | 12/2015 | De Nigris, III et al. |
| 2015/0363401 | A1 | 12/2015 | Chen et al. |
| 2015/0370531 | A1 | 12/2015 | Faaborg |
| 2015/0371657 | A1 | 12/2015 | Gao |
| 2015/0371659 | A1 | 12/2015 | Gao |
| 2015/0371664 | A1 | 12/2015 | Bar-Or et al. |
| 2015/0373100 | A1 | 12/2015 | Kravets et al. |
| 2015/0380010 | A1 | 12/2015 | Srinivasan |
| 2015/0382047 | A1 | 12/2015 | Van Os et al. |
| 2015/0382128 | A1 | 12/2015 | Ridihalgh et al. |
| 2016/0007116 | A1 | 1/2016 | Holman |
| 2016/0014536 | A1 | 1/2016 | Sheen |
| 2016/0018873 | A1 | 1/2016 | Fernald et al. |
| 2016/0021458 | A1 | 1/2016 | Johnson et al. |
| 2016/0026428 | A1 | 1/2016 | Morganstern et al. |
| 2016/0027440 | A1 | 1/2016 | Gelfenbeyn et al. |
| 2016/0029142 | A1 | 1/2016 | Isaac et al. |
| 2016/0034448 | A1 | 2/2016 | Tran |
| 2016/0035321 | A1 | 2/2016 | Cho et al. |
| 2016/0035337 | A1 | 2/2016 | Aggarwal et al. |
| 2016/0036962 | A1 | 2/2016 | Rand et al. |
| 2016/0042748 | A1 | 2/2016 | Jain et al. |
| 2016/0044151 | A1 | 2/2016 | Shoemaker et al. |
| 2016/0050488 | A1 | 2/2016 | Matheja et al. |
| 2016/0055847 | A1 | 2/2016 | Dahan |
| 2016/0055850 | A1 | 2/2016 | Nakadai et al. |
| 2016/0057522 | A1 | 2/2016 | Choisel et al. |
| 2016/0066087 | A1 | 3/2016 | Solbach et al. |
| 2016/0070526 | A1 | 3/2016 | Sheen |
| 2016/0072804 | A1 | 3/2016 | Chien et al. |
| 2016/0077710 | A1 | 3/2016 | Lewis et al. |
| 2016/0077794 | A1 | 3/2016 | Kim et al. |
| 2016/0078864 | A1 | 3/2016 | Palanisamy et al. |
| 2016/0086609 | A1 | 3/2016 | Yue et al. |
| 2016/0088036 | A1 | 3/2016 | Corbin et al. |
| 2016/0088392 | A1 | 3/2016 | Huttunen et al. |
| 2016/0093281 | A1 | 3/2016 | Kuo et al. |
| 2016/0093304 | A1 | 3/2016 | Kim et al. |

(56) References Cited

U.S. PATENT DOCUMENTS

| | | | |
|---|---|---|---|
| 2016/0094718 | A1 | 3/2016 | Mani et al. |
| 2016/0094917 | A1 | 3/2016 | Wilk et al. |
| 2016/0098393 | A1 | 4/2016 | Hebert |
| 2016/0098992 | A1 | 4/2016 | Renard et al. |
| 2016/0103653 | A1 | 4/2016 | Jang |
| 2016/0104480 | A1 | 4/2016 | Sharifi |
| 2016/0111110 | A1 | 4/2016 | Gautama et al. |
| 2016/0118048 | A1 | 4/2016 | Heide |
| 2016/0125876 | A1 | 5/2016 | Schroeter et al. |
| 2016/0127780 | A1 | 5/2016 | Roberts et al. |
| 2016/0133259 | A1 | 5/2016 | Rubin et al. |
| 2016/0134924 | A1 | 5/2016 | Bush et al. |
| 2016/0134966 | A1 | 5/2016 | Fitzgerald et al. |
| 2016/0134982 | A1 | 5/2016 | Iyer |
| 2016/0140957 | A1 | 5/2016 | Duta et al. |
| 2016/0148612 | A1 | 5/2016 | Guo et al. |
| 2016/0148615 | A1 | 5/2016 | Lee et al. |
| 2016/0154089 | A1 | 6/2016 | Altman |
| 2016/0155442 | A1 | 6/2016 | Kannan et al. |
| 2016/0155443 | A1 | 6/2016 | Khan et al. |
| 2016/0157035 | A1 | 6/2016 | Russell et al. |
| 2016/0162469 | A1 | 6/2016 | Santos |
| 2016/0171976 | A1 | 6/2016 | Sun et al. |
| 2016/0173578 | A1 | 6/2016 | Sharma et al. |
| 2016/0173983 | A1 | 6/2016 | Berthelsen et al. |
| 2016/0180853 | A1 | 6/2016 | Vanlund et al. |
| 2016/0189716 | A1 | 6/2016 | Lindahl et al. |
| 2016/0192099 | A1 | 6/2016 | Oishi et al. |
| 2016/0196499 | A1 | 7/2016 | Khan et al. |
| 2016/0203331 | A1 | 7/2016 | Khan et al. |
| 2016/0210110 | A1 | 7/2016 | Feldman |
| 2016/0212488 | A1 | 7/2016 | Os et al. |
| 2016/0212538 | A1 | 7/2016 | Fullam et al. |
| 2016/0216938 | A1 | 7/2016 | Millington |
| 2016/0217789 | A1 | 7/2016 | Lee et al. |
| 2016/0225385 | A1 | 8/2016 | Hammarqvist |
| 2016/0232451 | A1 | 8/2016 | Scherzer |
| 2016/0234204 | A1 | 8/2016 | Rishi et al. |
| 2016/0239255 | A1 | 8/2016 | Chavez et al. |
| 2016/0240192 | A1 | 8/2016 | Raghuvir |
| 2016/0241976 | A1 | 8/2016 | Pearson |
| 2016/0253050 | A1 | 9/2016 | Mishra et al. |
| 2016/0260431 | A1 | 9/2016 | Newendorp et al. |
| 2016/0283841 | A1 | 9/2016 | Sainath et al. |
| 2016/0299737 | A1 | 10/2016 | Clayton et al. |
| 2016/0302018 | A1 | 10/2016 | Russell et al. |
| 2016/0314782 | A1 | 10/2016 | Klimanis |
| 2016/0316293 | A1 | 10/2016 | Klimanis |
| 2016/0322045 | A1 | 11/2016 | Hatfield et al. |
| 2016/0335485 | A1 | 11/2016 | Kim |
| 2016/0336519 | A1 | 11/2016 | Seo et al. |
| 2016/0343866 | A1 | 11/2016 | Koezuka et al. |
| 2016/0343949 | A1 | 11/2016 | Seo et al. |
| 2016/0343954 | A1 | 11/2016 | Seo et al. |
| 2016/0345114 | A1 | 11/2016 | Hanna et al. |
| 2016/0352915 | A1 | 12/2016 | Gautama |
| 2016/0353217 | A1 | 12/2016 | Starobin et al. |
| 2016/0353218 | A1 | 12/2016 | Starobin et al. |
| 2016/0357503 | A1 | 12/2016 | Triplett et al. |
| 2016/0364206 | A1 | 12/2016 | Keyser-Allen et al. |
| 2016/0366515 | A1 | 12/2016 | Mendes et al. |
| 2016/0372113 | A1 | 12/2016 | David et al. |
| 2016/0372688 | A1 | 12/2016 | Seo et al. |
| 2016/0373269 | A1 | 12/2016 | Okubo et al. |
| 2016/0373909 | A1 | 12/2016 | Rasmussen et al. |
| 2016/0379634 | A1 | 12/2016 | Yamamoto et al. |
| 2016/0379635 | A1 | 12/2016 | Page |
| 2017/0003931 | A1 | 1/2017 | Dvortsov et al. |
| 2017/0012207 | A1 | 1/2017 | Seo et al. |
| 2017/0012232 | A1 | 1/2017 | Kataishi et al. |
| 2017/0019732 | A1 | 1/2017 | Mendes et al. |
| 2017/0025124 | A1 | 1/2017 | Mixter et al. |
| 2017/0025615 | A1 | 1/2017 | Seo et al. |
| 2017/0025630 | A1 | 1/2017 | Seo et al. |
| 2017/0026769 | A1 | 1/2017 | Patel |
| 2017/0032244 | A1 | 2/2017 | Kurata |
| 2017/0034263 | A1 | 2/2017 | Archambault et al. |
| 2017/0039025 | A1 | 2/2017 | Kielak |
| 2017/0040002 | A1 | 2/2017 | Basson et al. |
| 2017/0040018 | A1 | 2/2017 | Tormey |
| 2017/0041724 | A1 | 2/2017 | Master et al. |
| 2017/0053648 | A1 | 2/2017 | Chi |
| 2017/0053650 | A1 | 2/2017 | Ogawa |
| 2017/0060526 | A1 | 3/2017 | Barton et al. |
| 2017/0062734 | A1 | 3/2017 | Suzuki et al. |
| 2017/0070478 | A1 | 3/2017 | Park et al. |
| 2017/0076212 | A1 | 3/2017 | Shams et al. |
| 2017/0076720 | A1 | 3/2017 | Gopalan et al. |
| 2017/0076726 | A1 | 3/2017 | Bae |
| 2017/0078824 | A1 | 3/2017 | Heo |
| 2017/0083285 | A1 | 3/2017 | Meyers et al. |
| 2017/0083606 | A1 | 3/2017 | Mohan |
| 2017/0084277 | A1 | 3/2017 | Sharifi |
| 2017/0084278 | A1 | 3/2017 | Jung |
| 2017/0084292 | A1 | 3/2017 | Yoo |
| 2017/0084295 | A1 | 3/2017 | Tsiartas et al. |
| 2017/0090864 | A1 | 3/2017 | Jorgovanovic |
| 2017/0092278 | A1 | 3/2017 | Evermann et al. |
| 2017/0092297 | A1 | 3/2017 | Sainath et al. |
| 2017/0092299 | A1 | 3/2017 | Matsuo |
| 2017/0092889 | A1 | 3/2017 | Seo et al. |
| 2017/0092890 | A1 | 3/2017 | Seo et al. |
| 2017/0094215 | A1 | 3/2017 | Western |
| 2017/0103748 | A1 | 4/2017 | Weissberg et al. |
| 2017/0103754 | A1 | 4/2017 | Higbie et al. |
| 2017/0103755 | A1 | 4/2017 | Jeon et al. |
| 2017/0110124 | A1 | 4/2017 | Boesen et al. |
| 2017/0110130 | A1 | 4/2017 | Sharifi et al. |
| 2017/0110144 | A1 | 4/2017 | Sharifi et al. |
| 2017/0117497 | A1 | 4/2017 | Seo et al. |
| 2017/0123251 | A1 | 5/2017 | Nakada et al. |
| 2017/0125037 | A1 | 5/2017 | Shin |
| 2017/0125456 | A1 | 5/2017 | Kasahara |
| 2017/0133007 | A1 | 5/2017 | Drewes |
| 2017/0133011 | A1 | 5/2017 | Chen et al. |
| 2017/0134872 | A1 | 5/2017 | Silva et al. |
| 2017/0139720 | A1 | 5/2017 | Stein |
| 2017/0140449 | A1 | 5/2017 | Kannan |
| 2017/0140748 | A1 | 5/2017 | Roberts et al. |
| 2017/0140750 | A1 | 5/2017 | Wang et al. |
| 2017/0140757 | A1 | 5/2017 | Penilla et al. |
| 2017/0140759 | A1 | 5/2017 | Kumar et al. |
| 2017/0151930 | A1 | 6/2017 | Boesen |
| 2017/0164139 | A1 | 6/2017 | Deselaers et al. |
| 2017/0177585 | A1 | 6/2017 | Rodger et al. |
| 2017/0178662 | A1 | 6/2017 | Ayrapetian et al. |
| 2017/0180561 | A1 | 6/2017 | Kadiwala et al. |
| 2017/0186425 | A1 | 6/2017 | Dawes et al. |
| 2017/0186427 | A1 | 6/2017 | Wang et al. |
| 2017/0188150 | A1 | 6/2017 | Brunet et al. |
| 2017/0188437 | A1 | 6/2017 | Banta |
| 2017/0193999 | A1 | 7/2017 | Aleksic et al. |
| 2017/0206896 | A1 | 7/2017 | Ko et al. |
| 2017/0206900 | A1 | 7/2017 | Lee et al. |
| 2017/0214996 | A1 | 7/2017 | Yeo |
| 2017/0236512 | A1 | 8/2017 | Williams et al. |
| 2017/0236515 | A1 | 8/2017 | Pinsky et al. |
| 2017/0242649 | A1 | 8/2017 | Jarvis et al. |
| 2017/0242651 | A1 | 8/2017 | Lang et al. |
| 2017/0242653 | A1 | 8/2017 | Lang et al. |
| 2017/0242656 | A1 | 8/2017 | Plagge et al. |
| 2017/0242657 | A1 | 8/2017 | Jarvis et al. |
| 2017/0243576 | A1 | 8/2017 | Millington et al. |
| 2017/0243587 | A1 | 8/2017 | Plagge et al. |
| 2017/0245076 | A1 | 8/2017 | Kusano et al. |
| 2017/0255612 | A1 | 9/2017 | Sarikaya et al. |
| 2017/0257686 | A1 | 9/2017 | Gautama et al. |
| 2017/0269900 | A1 | 9/2017 | Triplett |
| 2017/0269975 | A1 | 9/2017 | Wood et al. |
| 2017/0270919 | A1 | 9/2017 | Parthasarathi et al. |
| 2017/0278512 | A1 | 9/2017 | Pandya et al. |
| 2017/0287485 | A1 | 10/2017 | Civelli et al. |
| 2017/0287496 | A1 | 10/2017 | Heitkamp et al. |
| 2017/0300289 | A1 | 10/2017 | Gattis |

(56) References Cited

U.S. PATENT DOCUMENTS

2017/0300990 A1 10/2017 Tanaka et al.
2017/0329397 A1 11/2017 Lin
2017/0330565 A1 11/2017 Daley et al.
2017/0331869 A1 11/2017 Bendahan et al.
2017/0332035 A1 11/2017 Shah et al.
2017/0332168 A1 11/2017 Moghimi et al.
2017/0337932 A1 11/2017 Iyengar et al.
2017/0346872 A1 11/2017 Naik et al.
2017/0352357 A1 12/2017 Fink
2017/0353789 A1 12/2017 Kim et al.
2017/0357390 A1 12/2017 Alonso Ruiz et al.
2017/0357475 A1 12/2017 Lee et al.
2017/0357478 A1 12/2017 Piersol et al.
2017/0364371 A1 12/2017 Nandi et al.
2017/0365247 A1 12/2017 Ushakov
2017/0366393 A1 12/2017 Shaker et al.
2017/0374454 A1 12/2017 Bernardini et al.
2017/0374552 A1 12/2017 Xia et al.
2018/0012077 A1 1/2018 Laska et al.
2018/0018964 A1 1/2018 Reilly et al.
2018/0018965 A1 1/2018 Daley
2018/0018967 A1 1/2018 Lang et al.
2018/0020306 A1 1/2018 Sheen
2018/0025733 A1 1/2018 Qian et al.
2018/0033428 A1 2/2018 Kim et al.
2018/0033429 A1 2/2018 Makke et al.
2018/0033438 A1 2/2018 Toma et al.
2018/0040324 A1 2/2018 Wilberding
2018/0047394 A1 2/2018 Tian et al.
2018/0053504 A1 2/2018 Wang et al.
2018/0054506 A1 2/2018 Hart et al.
2018/0061396 A1 3/2018 Srinivasan et al.
2018/0061402 A1 3/2018 Devaraj et al.
2018/0061404 A1 3/2018 Devaraj et al.
2018/0061409 A1 3/2018 Valentine et al.
2018/0061419 A1 3/2018 Melendo Casado et al.
2018/0061420 A1 3/2018 Patil et al.
2018/0062871 A1 3/2018 Jones et al.
2018/0084367 A1 3/2018 Greff et al.
2018/0088900 A1 3/2018 Glaser et al.
2018/0091898 A1 3/2018 Yoon et al.
2018/0091913 A1 3/2018 Hartung et al.
2018/0096678 A1 4/2018 Zhou et al.
2018/0096683 A1 4/2018 James et al.
2018/0096696 A1 4/2018 Mixter
2018/0107446 A1 4/2018 Wilberding et al.
2018/0108351 A1 4/2018 Beckhardt et al.
2018/0120947 A1 5/2018 Wells et al.
2018/0122372 A1 5/2018 Wanderlust
2018/0122378 A1 5/2018 Mixter et al.
2018/0130469 A1 5/2018 Gruenstein et al.
2018/0132217 A1 5/2018 Stirling-Gallacher
2018/0132298 A1 5/2018 Birnam et al.
2018/0137857 A1 5/2018 Zhou et al.
2018/0137861 A1 5/2018 Ogawa
2018/0139512 A1 5/2018 Moran et al.
2018/0152557 A1 5/2018 White et al.
2018/0158454 A1 6/2018 Campbell et al.
2018/0165055 A1 6/2018 Yu et al.
2018/0167981 A1 6/2018 Jonna et al.
2018/0174597 A1 6/2018 Lee et al.
2018/0182383 A1 6/2018 Kim et al.
2018/0182390 A1 6/2018 Hughes et al.
2018/0182397 A1 6/2018 Carbune et al.
2018/0182410 A1 6/2018 Kaskari et al.
2018/0188948 A1 7/2018 Ouyang et al.
2018/0190274 A1 7/2018 Kirazci et al.
2018/0190285 A1 7/2018 Heckmann et al.
2018/0196776 A1 7/2018 Hershko et al.
2018/0197533 A1 7/2018 Lyon et al.
2018/0199130 A1 7/2018 Jaffe et al.
2018/0199146 A1 7/2018 Sheen
2018/0204569 A1 7/2018 Nadkar et al.
2018/0205963 A1 7/2018 Matei et al.
2018/0210698 A1 7/2018 Park et al.
2018/0211665 A1 7/2018 Park et al.
2018/0218747 A1 8/2018 Moghimi et al.
2018/0219976 A1 8/2018 Decenzo et al.
2018/0225933 A1 8/2018 Park et al.
2018/0228006 A1 8/2018 Baker et al.
2018/0233130 A1 8/2018 Kaskari et al.
2018/0233136 A1 8/2018 Torok et al.
2018/0233137 A1 8/2018 Torok et al.
2018/0233139 A1 8/2018 Finkelstein et al.
2018/0233141 A1 8/2018 Solomon et al.
2018/0233142 A1 8/2018 Koishida et al.
2018/0233150 A1 8/2018 Gruenstein et al.
2018/0234765 A1 8/2018 Torok et al.
2018/0260680 A1 9/2018 Finkelstein et al.
2018/0261213 A1 9/2018 Arik et al.
2018/0262793 A1 9/2018 Lau et al.
2018/0262831 A1 9/2018 Matheja et al.
2018/0270565 A1 9/2018 Ganeshkumar
2018/0270573 A1 9/2018 Lang et al.
2018/0270575 A1 9/2018 Akutagawa
2018/0277107 A1 9/2018 Kim
2018/0277113 A1 9/2018 Hartung et al.
2018/0277119 A1 9/2018 Baba et al.
2018/0277133 A1 9/2018 Deetz et al.
2018/0286394 A1 10/2018 Li et al.
2018/0286414 A1 10/2018 Ravindran et al.
2018/0293221 A1 10/2018 Finkelstein et al.
2018/0293484 A1 10/2018 Wang et al.
2018/0301147 A1 10/2018 Kim
2018/0308470 A1 10/2018 Park et al.
2018/0314552 A1 11/2018 Kim et al.
2018/0322891 A1 11/2018 Van Den Oord et al.
2018/0324756 A1 11/2018 Ryu et al.
2018/0330589 A1 11/2018 Horling
2018/0330727 A1 11/2018 Tulli
2018/0335903 A1 11/2018 Coffman et al.
2018/0336274 A1 11/2018 Choudhury et al.
2018/0336892 A1 11/2018 Kim et al.
2018/0349093 A1 12/2018 McCarty et al.
2018/0350356 A1 12/2018 Garcia
2018/0350379 A1 12/2018 Wung et al.
2018/0352014 A1 12/2018 Alsina et al.
2018/0352334 A1 12/2018 Family et al.
2018/0356962 A1 12/2018 Corbin
2018/0358009 A1 12/2018 Daley et al.
2018/0358019 A1 12/2018 Mont-Reynaud
2018/0365567 A1 12/2018 Kolavennu et al.
2018/0367944 A1 12/2018 Heo et al.
2019/0012141 A1 1/2019 Piersol et al.
2019/0013019 A1 1/2019 Lawrence
2019/0014592 A1 1/2019 Hampel et al.
2019/0019112 A1 1/2019 Gelfenbeyn et al.
2019/0033446 A1 1/2019 Bultan et al.
2019/0035404 A1 1/2019 Gabel et al.
2019/0037173 A1 1/2019 Lee
2019/0042187 A1 2/2019 Truong et al.
2019/0043488 A1 2/2019 Bocklet et al.
2019/0043492 A1 2/2019 Lang
2019/0044745 A1 2/2019 Knudson et al.
2019/0051298 A1 2/2019 Lee et al.
2019/0051299 A1 2/2019 Ossowski et al.
2019/0066672 A1 2/2019 Wood et al.
2019/0066680 A1 2/2019 Woo et al.
2019/0066687 A1 2/2019 Wood et al.
2019/0066710 A1 2/2019 Bryan et al.
2019/0073999 A1 3/2019 Prémont et al.
2019/0074025 A1 3/2019 Lashkari et al.
2019/0079724 A1 3/2019 Feuz et al.
2019/0081507 A1 3/2019 Ide
2019/0081810 A1 3/2019 Jung
2019/0082255 A1 3/2019 Tajiri et al.
2019/0087455 A1 3/2019 He et al.
2019/0088261 A1 3/2019 Lang et al.
2019/0090056 A1 3/2019 Rexach et al.
2019/0096408 A1 3/2019 Li et al.
2019/0098400 A1 3/2019 Buoni et al.
2019/0104119 A1 4/2019 Giorgi et al.
2019/0104373 A1 4/2019 Wodrich et al.
2019/0108839 A1 4/2019 Reilly et al.

(56) References Cited

U.S. PATENT DOCUMENTS

2019/0115011 A1 4/2019 Khellah et al.
2019/0122662 A1 4/2019 Chang et al.
2019/0130906 A1 5/2019 Kobayashi et al.
2019/0147860 A1 5/2019 Chen et al.
2019/0156847 A1 5/2019 Bryan et al.
2019/0163153 A1 5/2019 Price et al.
2019/0172452 A1 6/2019 Smith et al.
2019/0172467 A1 6/2019 Kim et al.
2019/0172476 A1 6/2019 Wung et al.
2019/0173687 A1 6/2019 Mackay et al.
2019/0179607 A1 6/2019 Thangarathnam et al.
2019/0179611 A1 6/2019 Wojogbe et al.
2019/0182072 A1 6/2019 Roe et al.
2019/0186937 A1 6/2019 Sharifi et al.
2019/0188328 A1 6/2019 Oyenan et al.
2019/0189117 A1 6/2019 Kumar
2019/0206391 A1 7/2019 Busch et al.
2019/0206405 A1 7/2019 Gillespie et al.
2019/0206412 A1 7/2019 Li et al.
2019/0219976 A1 7/2019 Giorgi et al.
2019/0220246 A1 7/2019 Orr et al.
2019/0221206 A1 7/2019 Chen et al.
2019/0237067 A1 8/2019 Friedman et al.
2019/0237089 A1 8/2019 Shin
2019/0239008 A1 8/2019 Lambourne
2019/0239009 A1 8/2019 Lambourne
2019/0243603 A1 8/2019 Keyser-Allen et al.
2019/0243606 A1 8/2019 Jayakumar et al.
2019/0244608 A1 8/2019 Choi et al.
2019/0251960 A1 8/2019 Maker et al.
2019/0259408 A1 8/2019 Freeman et al.
2019/0281387 A1 9/2019 Woo et al.
2019/0281397 A1 9/2019 Lambourne
2019/0287536 A1 9/2019 Sharifi et al.
2019/0287546 A1 9/2019 Ganeshkumar
2019/0288970 A1 9/2019 Siddiq
2019/0289367 A1 9/2019 Siddiq
2019/0295542 A1 9/2019 Huang et al.
2019/0295555 A1 9/2019 Wilberding
2019/0295556 A1 9/2019 Wilberding
2019/0295563 A1 9/2019 Kamdar et al.
2019/0297388 A1 9/2019 Panchaksharaiah et al.
2019/0304443 A1 10/2019 Bhagwan
2019/0311710 A1 10/2019 Eraslan et al.
2019/0311712 A1 10/2019 Firik et al.
2019/0311715 A1 10/2019 Pfeffinger et al.
2019/0311718 A1 10/2019 Huber et al.
2019/0311720 A1 10/2019 Pasko
2019/0311722 A1 10/2019 Caldwell
2019/0317606 A1 10/2019 Jain et al.
2019/0318729 A1 10/2019 Chao et al.
2019/0325870 A1 10/2019 Mitic
2019/0325888 A1 10/2019 Geng
2019/0341037 A1 11/2019 Bromand et al.
2019/0341038 A1 11/2019 Bromand et al.
2019/0342962 A1 11/2019 Chang et al.
2019/0347063 A1 11/2019 Liu et al.
2019/0348044 A1 11/2019 Chun et al.
2019/0362714 A1 11/2019 Mori et al.
2019/0364375 A1 11/2019 Soto et al.
2019/0364422 A1 11/2019 Zhuo
2019/0371310 A1 12/2019 Fox et al.
2019/0371324 A1 12/2019 Powell et al.
2019/0371329 A1 12/2019 D'Souza et al.
2019/0371342 A1 12/2019 Tukka et al.
2019/0392832 A1 12/2019 Mitsui et al.
2020/0007987 A1 1/2020 Woo et al.
2020/0034492 A1 1/2020 Verbeke et al.
2020/0043489 A1 2/2020 Bradley et al.
2020/0043494 A1 2/2020 Maeng
2020/0051554 A1 2/2020 Kim et al.
2020/0066279 A1 2/2020 Kang et al.
2020/0074990 A1 3/2020 Kim et al.
2020/0075018 A1 3/2020 Chen
2020/0089469 A1 3/2020 Wilberding et al.
2020/0090647 A1 3/2020 Kurtz
2020/0092687 A1 3/2020 Devaraj et al.
2020/0098354 A1 3/2020 Lin et al.
2020/0098379 A1 3/2020 Tai et al.
2020/0105245 A1 4/2020 Gupta et al.
2020/0105256 A1 4/2020 Fainberg et al.
2020/0105264 A1 4/2020 Jang et al.
2020/0110571 A1 4/2020 Liu et al.
2020/0125162 A1 4/2020 D'Amato et al.
2020/0135194 A1 4/2020 Jeong
2020/0135224 A1 4/2020 Bromand et al.
2020/0152206 A1 5/2020 Shen et al.
2020/0167597 A1 5/2020 Nguyen et al.
2020/0175989 A1 6/2020 Lockhart et al.
2020/0184964 A1 6/2020 Myers et al.
2020/0184980 A1 6/2020 Wilberding
2020/0193973 A1 6/2020 Tolomei et al.
2020/0211539 A1 7/2020 Lee
2020/0211550 A1 7/2020 Pan et al.
2020/0211556 A1 7/2020 Mixter et al.
2020/0213729 A1 7/2020 Soto
2020/0216089 A1 7/2020 Garcia et al.
2020/0234709 A1 7/2020 Kunitake
2020/0244650 A1 7/2020 Burris et al.
2020/0251107 A1 8/2020 Wang et al.
2020/0265838 A1 8/2020 Lee et al.
2020/0265842 A1 8/2020 Singh
2020/0310751 A1 10/2020 Anand et al.
2020/0336846 A1 10/2020 Rohde et al.
2020/0342869 A1 10/2020 Lee et al.
2020/0364026 A1 11/2020 Lee et al.
2020/0366477 A1 11/2020 Brown et al.
2020/0395006 A1 12/2020 Smith et al.
2020/0395010 A1 12/2020 Smith et al.
2020/0395013 A1 12/2020 Smith et al.
2020/0409652 A1 12/2020 Wilberding et al.
2020/0409926 A1 12/2020 Srinivasan et al.
2021/0029452 A1 1/2021 Tsoi et al.
2021/0035561 A1 2/2021 D'Amato et al.
2021/0035572 A1 2/2021 D'Amato et al.
2021/0067867 A1 3/2021 Kagoshima
2021/0118429 A1 4/2021 Shan
2021/0118439 A1 4/2021 Schillmoeller et al.
2021/0134280 A1 5/2021 Kurtz
2021/0157542 A1 5/2021 De Assis et al.
2021/0166680 A1 6/2021 Jung et al.
2021/0183366 A1 6/2021 Reinspach et al.
2021/0239831 A1 8/2021 Shin et al.
2021/0249004 A1 8/2021 Smith
2021/0280185 A1 9/2021 Tan et al.
2021/0287670 A1 9/2021 Regan et al.
2021/0295849 A1 9/2021 Van Der Ven et al.
2021/0358481 A1 11/2021 D'Amato et al.
2022/0035514 A1 2/2022 Shin et al.
2022/0036882 A1 2/2022 Ahn et al.
2022/0050585 A1 2/2022 Fettes et al.
2022/0083136 A1 3/2022 DeLeeuw
2022/0256676 A1* 8/2022 Lang ........................ G06F 3/165
2022/0301561 A1 9/2022 Robert Jose et al.
2023/0019595 A1 1/2023 Smith
2023/0215433 A1 7/2023 Myers et al.
2023/0237998 A1 7/2023 Smith et al.
2023/0274738 A1 8/2023 Smith et al.
2023/0382349 A1 11/2023 Ham

FOREIGN PATENT DOCUMENTS

CN 1323435 A 11/2001
CN 1748250 A 3/2006
CN 1781291 A 5/2006
CN 101310558 A 11/2008
CN 101427154 A 5/2009
CN 101480039 A 7/2009
CN 101569093 A 10/2009
CN 101661753 A 3/2010
CN 101686282 A 3/2010
CN 101907983 A 12/2010
CN 102123188 A 7/2011
CN 102256098 A 11/2011

(56) References Cited

FOREIGN PATENT DOCUMENTS

| | | | |
|---|---|---|---|
| CN | 102567468 | A | 7/2012 |
| CN | 102999161 | A | 3/2013 |
| CN | 103052001 | A | 4/2013 |
| CN | 103181192 | A | 6/2013 |
| CN | 103210663 | A | 7/2013 |
| CN | 103546616 | A | 1/2014 |
| CN | 103811007 | A | 5/2014 |
| CN | 104010251 | A | 8/2014 |
| CN | 104035743 | A | 9/2014 |
| CN | 104053088 | A | 9/2014 |
| CN | 104092936 | A | 10/2014 |
| CN | 104104769 | A | 10/2014 |
| CN | 104115224 | A | 10/2014 |
| CN | 104155938 | A | 11/2014 |
| CN | 104282305 | A | 1/2015 |
| CN | 104520927 | A | 4/2015 |
| CN | 104538030 | A | 4/2015 |
| CN | 104572009 | A | 4/2015 |
| CN | 104575504 | A | 4/2015 |
| CN | 104581510 | A | 4/2015 |
| CN | 104635539 | A | 5/2015 |
| CN | 104865550 | A | 8/2015 |
| CN | 104885406 | A | 9/2015 |
| CN | 104885438 | A | 9/2015 |
| CN | 105101083 | A | 11/2015 |
| CN | 105162886 | A | 12/2015 |
| CN | 105187907 | A | 12/2015 |
| CN | 105204357 | A | 12/2015 |
| CN | 105206281 | A | 12/2015 |
| CN | 105284076 | A | 1/2016 |
| CN | 105284168 | A | 1/2016 |
| CN | 105389099 | A | 3/2016 |
| CN | 105427861 | A | 3/2016 |
| CN | 105453179 | A | 3/2016 |
| CN | 105472191 | A | 4/2016 |
| CN | 105493179 | A | 4/2016 |
| CN | 105493442 | A | 4/2016 |
| CN | 105632486 | A | 6/2016 |
| CN | 105679318 | A | 6/2016 |
| CN | 106028223 | A | 10/2016 |
| CN | 106030699 | A | 10/2016 |
| CN | 106375902 | A | 2/2017 |
| CN | 106531165 | A | 3/2017 |
| CN | 106708403 | A | 5/2017 |
| CN | 106796784 | A | 5/2017 |
| CN | 106910500 | A | 6/2017 |
| CN | 107004410 | A | 8/2017 |
| CN | 107122158 | A | 9/2017 |
| CN | 107465974 | A | 12/2017 |
| CN | 107644313 | A | 1/2018 |
| CN | 107767863 | A | 3/2018 |
| CN | 107832837 | A | 3/2018 |
| CN | 107919116 | A | 4/2018 |
| CN | 107919123 | A | 4/2018 |
| CN | 108028047 | A | 5/2018 |
| CN | 108028048 | A | 5/2018 |
| CN | 108198548 | A | 6/2018 |
| CN | 109712626 | A | 5/2019 |
| EP | 1349146 | A1 | 10/2003 |
| EP | 1389853 | A1 | 2/2004 |
| EP | 2051542 | A1 | 4/2009 |
| EP | 2166737 | A1 | 3/2010 |
| EP | 2683147 | A1 | 1/2014 |
| EP | 2986034 | A1 | 2/2016 |
| EP | 3128767 | A2 | 2/2017 |
| EP | 3133595 | A1 | 2/2017 |
| EP | 3142107 | A1 | 3/2017 |
| EP | 2351021 | B1 | 9/2017 |
| EP | 3270377 | A1 | 1/2018 |
| EP | 3285502 | A1 | 2/2018 |
| GB | 2501367 | A | 10/2013 |
| JP | S63301998 | A | 12/1988 |
| JP | H0883091 | A | 3/1996 |
| JP | 2001236093 | A | 8/2001 |
| JP | 2003223188 | A | 8/2003 |
| JP | 2004096520 | A | 3/2004 |
| JP | 2004109361 | A | 4/2004 |
| JP | 2004163590 | A | 6/2004 |
| JP | 2004347943 | A | 12/2004 |
| JP | 2004354721 | A | 12/2004 |
| JP | 2005242134 | A | 9/2005 |
| JP | 2005250867 | A | 9/2005 |
| JP | 2005284492 | A | 10/2005 |
| JP | 2006092482 | A | 4/2006 |
| JP | 2007013400 | A | 1/2007 |
| JP | 2007142595 | A | 6/2007 |
| JP | 2007235875 | A | 9/2007 |
| JP | 2008079256 | A | 4/2008 |
| JP | 2008158868 | A | 7/2008 |
| JP | 2008217444 | A | 9/2008 |
| JP | 2010141748 | A | 6/2010 |
| JP | 2013037148 | A | 2/2013 |
| JP | 2014071138 | A | 4/2014 |
| JP | 2014510481 | A | 4/2014 |
| JP | 2014137590 | A | 7/2014 |
| JP | 2015161551 | A | 9/2015 |
| JP | 2015527768 | A | 9/2015 |
| JP | 2016009193 | A | 1/2016 |
| JP | 2016095383 | A | 5/2016 |
| JP | 2017072857 | A | 4/2017 |
| JP | 2017129860 | A | 7/2017 |
| JP | 2017227912 | A | 12/2017 |
| JP | 2018055259 | A | 4/2018 |
| JP | 2019109510 | A | 7/2019 |
| KR | 20100036351 | A | 4/2010 |
| KR | 100966415 | B1 | 6/2010 |
| KR | 20100111071 | A | 10/2010 |
| KR | 20130050987 | A | 5/2013 |
| KR | 101284134 | B1 | 7/2013 |
| KR | 20140005410 | A | 1/2014 |
| KR | 20140035310 | A | 3/2014 |
| KR | 20140054643 | A | 5/2014 |
| KR | 20140111859 | A | 9/2014 |
| KR | 20140112900 | A | 9/2014 |
| TW | 201629950 | A | 8/2016 |
| WO | 9731437 | A1 | 8/1997 |
| WO | 200153994 | | 7/2001 |
| WO | 03054854 | A2 | 7/2003 |
| WO | 2003093950 | A2 | 11/2003 |
| WO | 2008048599 | A1 | 4/2008 |
| WO | 2008096414 | A1 | 8/2008 |
| WO | 2012166386 | A2 | 12/2012 |
| WO | 2013184792 | A1 | 12/2013 |
| WO | 2014064531 | A1 | 5/2014 |
| WO | 2014159581 | A1 | 10/2014 |
| WO | 2015017303 | A1 | 2/2015 |
| WO | 2015037396 | A1 | 3/2015 |
| WO | 2015105788 | A1 | 7/2015 |
| WO | 2015131024 | A1 | 9/2015 |
| WO | 2015133022 | A1 | 9/2015 |
| WO | 2015178950 | A1 | 11/2015 |
| WO | 2015195216 | A1 | 12/2015 |
| WO | 2016003509 | A1 | 1/2016 |
| WO | 2016014142 | A1 | 1/2016 |
| WO | 2016014686 | | 1/2016 |
| WO | 2016014686 | A1 | 1/2016 |
| WO | 2016022926 | A1 | 2/2016 |
| WO | 2016033364 | A1 | 3/2016 |
| WO | 2016057268 | A1 | 4/2016 |
| WO | 2016085775 | A2 | 6/2016 |
| WO | 2016136062 | A1 | 9/2016 |
| WO | 2016165067 | A1 | 10/2016 |
| WO | 2016171956 | A1 | 10/2016 |
| WO | 2016200593 | A1 | 12/2016 |
| WO | 2017039632 | A1 | 3/2017 |
| WO | 2017058654 | A1 | 4/2017 |
| WO | 2017138934 | A1 | 8/2017 |
| WO | 2017147075 | A1 | 8/2017 |
| WO | 2017147936 | A1 | 9/2017 |
| WO | 2018027142 | A1 | 2/2018 |
| WO | 2018064362 | A1 | 4/2018 |
| WO | 2018067404 | A1 | 4/2018 |
| WO | 2018140777 | A1 | 8/2018 |
| WO | 2019005772 | A1 | 1/2019 |

(56) References Cited

FOREIGN PATENT DOCUMENTS

| | | |
|---|---|---|
| WO | 2020061439 A1 | 3/2020 |
| WO | 2020068795 A1 | 4/2020 |
| WO | 2020132298 A1 | 6/2020 |

OTHER PUBLICATIONS

Tweet: "How to start using Google app voice commands to make your life easier Share This Story shop @Bullet", Jan. 21, 2016, https://bgr.com/2016/01/21/best-ok-google-voice-commands/, 3 page.
Ullrich et al. "Soft Weight-Sharing for Neural Network Compression." ICLR 2017, 16 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.
"S Voice or Google Now?"; https://web.archive.org/web/20160807040123/lowdown.carphonewarehouse.com/news/s-voice-or-google-now/ . . . , Apr. 28, 2015; 4 pages.
Wen et al. A Network-based End-to-End Trainable Task-oriented Dialogue System, CORR (ARXIV), Apr. 15, 2016, 11 pages.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. Interspeech, TALP Research Center, Jan. 2010, 5 pages.
Wölfel et al. Multi-source far-distance microphone selection and combination for automatic transcription of lectures, Interspeech 2006—ICSLP, Jan. 2006, 5 pages.
Wu et al. End-to-End Recurrent Entity Network for Entity-Value Independent Goal-Oriented Dialog Learning. DSTC6—Dialog System Technology Challenges, Dec. 10, 2017, 5 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.
Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Xiaoguang et al. "Robust Small-Footprint Keyword Spotting Using Sequence-To-Sequence Model with Connectionist Temporal Classifier", 2019 IEEE, Sep. 28, 2019, 5 pages.
Xu et al. An End-to-end Approach for Handling Unknown Slot Values in Dialogue State Tracking. ARXIV.org, Cornell University Library, May 3, 2018, 10 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
Zaykovskiy, Dmitry. Survey of the Speech Recognition Techniques for Mobile Devices. Proceedings of Specom 2006, Jun. 25, 2006, 6 pages.
Zhang et al. Noise Robust Speech Recognition Using Multi-Channel Based Channel Selection And Channel Weighting. The Institute of Electronics, Information and Communication Engineers, arXiv:1604.03276v1 [cs.SD] Jan. 1, 2010, 8 pages.
European Patent Office, Summons to Attend Oral Proceedings mailed on Jul. 15, 2022, issued in connection with European Application No. 17792272.1, 11 pages.
European Patent Office, Summons to Attend Oral Proceedings mailed on Dec. 20, 2019, issued in connection with European Application No. 17174435.2, 13 pages.
European Patent Office, Summons to Attend Oral Proceedings mailed on Feb. 4, 2022, issued in connection with European Application No. 17757075.1, 10 pages.
European Patent Office, Summons to Attend Oral Proceedings mailed on Dec. 9, 2021, issued in connection with European Application No. 17200837.7, 10 pages.
Fadilpasic,"Cortana can now be the default PDA on your Android", IT Pro Portal: Accessed via WayBack Machine; http://web.archive.org/web/20171129124915/https://www.itproportal.com/2015/08/11/cortana-can-now-be- . . . , Aug. 11, 2015, 6 pages.
Final Office Action mailed Jul. 23, 2021, issued in connection with U.S. Appl. No. 16/439,046, filed Jun. 12, 2019, 12 pages.
Final Office Action mailed on Oct. 6, 2017, issued in connection with U.S. Appl. No. 15/098,760, filed Apr. 14, 2016, 25 pages.
Final Office Action mailed on Jun. 1, 2022, issued in connection with U.S. Appl. No. 16/806,747, filed Mar. 2, 2020, 20 pages.
Final Office Action mailed on Feb. 10, 2021, issued in connection with U.S. Appl. No. 16/219,702, filed Dec. 13, 2018, 9 pages.
Final Office Action mailed on Feb. 10, 2021, issued in connection with U.S. Appl. No. 16/402,617, filed May 3, 2019, 13 pages.
Final Office Action mailed on Nov. 10, 2020, issued in connection with U.S. Appl. No. 16/600,644, filed Oct. 14, 2019, 19 pages.
Final Office Action mailed on Apr. 11, 2019, issued in connection with U.S. Appl. No. 15/131,254, filed Apr. 18, 2016, 17 pages.
Final Office Action mailed on Aug. 11, 2017, issued in connection with U.S. Appl. No. 15/131,776, filed Apr. 18, 2016, 7 pages.
Final Office Action mailed on Dec. 11, 2019, issued in connection with U.S. Appl. No. 16/227,308, filed Dec. 20, 2018, 10 pages.
Final Office Action mailed on Sep. 11, 2019, issued in connection with U.S. Appl. No. 16/178,122, filed Nov. 1, 2018, 13 pages.
Final Office Action mailed on Apr. 13, 2018, issued in connection with U.S. Appl. No. 15/131,254, filed Apr. 18, 2016, 18 pages.
Final Office Action mailed on Apr. 13, 2018, issued in connection with U.S. Appl. No. 15/438,744, filed Feb. 21, 2017, 20 pages.
Final Office Action mailed on May 13, 2020, issued in connection with U.S. Appl. No. 16/153,530, filed Oct. 5, 2018, 20 pages.
Final Office Action mailed on Jul. 15, 2021, issued in connection with U.S. Appl. No. 16/153,530, filed Oct. 5, 2018, 22 pages.
Final Office Action mailed on Jun. 15, 2017, issued in connection with U.S. Appl. No. 15/098,718, filed Apr. 14, 2016, 15 pages.
Final Office Action mailed on Jun. 15, 2021, issued in connection with U.S. Appl. No. 16/819,755, filed Mar. 16, 2020, 12 pages.
Final Office Action mailed on Oct. 15, 2018, issued in connection with U.S. Appl. No. 15/804,776, filed Nov. 6, 2017, 18 pages.
Final Office Action mailed on Oct. 15, 2020, issued in connection with U.S. Appl. No. 16/109,375, filed Aug. 22, 2018, 9 pages.
Final Office Action mailed on Oct. 16, 2018, issued in connection with U.S. Appl. No. 15/438,725, filed Feb. 21, 2017, 10 pages.
Final Office Action mailed on Aug. 17, 2022, issued in connection with U.S. Appl. No. 16/179,779, filed Nov. 2, 2018, 26 pages.
Final Office Action mailed on Dec. 17, 2021, issued in connection with U.S. Appl. No. 16/813,643, filed Mar. 9, 2020, 12 pages.
Final Office Action mailed on May 17, 2023, issued in connection with U.S. Appl. No. 16/168,389, filed Oct. 23, 2018, 44 pages.
Final Office Action mailed on May 18, 2020, issued in connection with U.S. Appl. No. 16/177,185, filed Oct. 31, 2018, 16 pages.
Final Office Action mailed on Feb. 21, 2018, issued in connection with U.S. Appl. No. 15/297,627, filed Oct. 19, 2016, 12 pages.
Final Office Action mailed on Mar. 21, 2022, issued in connection with U.S. Appl. No. 16/153,530, filed Oct. 5, 2018, 23 pages.

(56) References Cited

OTHER PUBLICATIONS

Final Office Action mailed on May 21, 2020, issued in connection with U.S. Appl. No. 15/989,715, filed May 25, 2018, 21 pages.
Final Office Action mailed on Aug. 22, 2022, issued in connection with U.S. Appl. No. 16/168,389, filed Oct. 23, 2018, 37 pages.
Final Office Action mailed on Aug. 22, 2023, issued in connection with U.S. Appl. No. 18/061,570, filed Dec. 5, 2022, 12 pages.
Final Office Action mailed on Feb. 22, 2021, issued in connection with U.S. Appl. No. 15/936,177, filed Mar. 26, 2018, 20 pages.
Final Office Action mailed on Feb. 22, 2021, issued in connection with U.S. Appl. No. 16/213,570, filed Dec. 7, 2018, 12 pages.
Final Office Action mailed on Jun. 22, 2020, issued in connection with U.S. Appl. No. 16/179,779, filed Nov. 2, 2018, 16 pages.
Final Office Action mailed on Mar. 23, 2020, issued in connection with U.S. Appl. No. 16/145,275, filed Sep. 28, 2018, 11 pages.
Final Office Action mailed on Feb. 24, 2020, issued in connection with U.S. Appl. No. 15/936,177, filed Mar. 26, 2018, 20 pages.
Final Office Action mailed on Aug. 25, 2023, issued in connection with U.S. Appl. No. 16/989,350, filed Aug. 10, 2020, 21 pages.
Final Office Action mailed on Apr. 26, 2019, issued in connection with U.S. Appl. No. 15/721,141, filed Sep. 29, 2017, 20 pages.
Final Office Action mailed on Feb. 27, 2024, issued in connection with U.S. Appl. No. 17/340,590, filed Jun. 7, 2021, 28 pages.
Final Office Action mailed on Jul. 27, 2022, issued in connection with U.S. Appl. No. 16/989,350, filed Aug. 10, 2020, 15 pages.
Final Office Action mailed on Sep. 27, 2023, issued in connection with U.S. Appl. No. 18/048,034, filed Oct. 20, 2022, 9 pages.
Final Office Action mailed on Mar. 29, 2023, issued in connection with U.S. Appl. No. 17/549,034, filed Dec. 13, 2021, 21 pages.
Final Office Action mailed on Nov. 29, 2021, issued in connection with U.S. Appl. No. 17/236,559, filed Apr. 21, 2021, 11 pages.
Final Office Action mailed on Apr. 30, 2019, issued in connection with U.S. Appl. No. 15/098,760, filed Apr. 14, 2016, 6 pages.
Final Office Action mailed on Jun. 4, 2021, issued in connection with U.S. Appl. No. 16/168,389, filed Oct. 23, 2018, 38 pages.
Final Office Action mailed on Oct. 4, 2021, issued in connection with U.S. Appl. No. 16/806,747, filed Mar. 2, 2020, 17 pages.
Final Office Action mailed on Feb. 5, 2019, issued in connection with U.S. Appl. No. 15/438,749, filed Feb. 21, 2017, 17 pages.
Final Office Action mailed on Oct. 6, 2023, issued in connection with U.S. Appl. No. 17/532,744, filed Nov. 22, 2021, 21 pages.
International Bureau, International Preliminary Report on Patentability, mailed on Feb. 20, 2020, issued in connection with International Application No. PCT/US2018/045397, filed on Aug. 6, 2018, 8 pages.
International Bureau, International Preliminary Report on Patentability, mailed on Jul. 21, 2022, issued in connection with International Application No. PCT/US2021/070007, filed on Jan. 6, 2021, 8 pages.
International Bureau, International Preliminary Report on Patentability, mailed on Apr. 23, 2019, issued in connection with International Application No. PCT/US2017/057220, filed on Oct. 18, 2017, 7 pages.
International Bureau, International Preliminary Report on Patentability, mailed on Apr. 26, 2022, issued in connection with International Application No. PCT/US2020/056632, filed on Oct. 21, 2020, 7 pages.
International Bureau, International Preliminary Report on Patentability, mailed on Mar. 31, 2020, issued in connection with International Application No. PCT/US2018053123, filed on Sep. 27, 2018, 12 pages.
International Bureau, International Preliminary Report on Patentability, mailed on Mar. 31, 2020, issued in connection with International Application No. PCT/US2018053472, filed on Sep. 28, 2018, 8 pages.
International Bureau, International Preliminary Report on Patentability, mailed on Mar. 31, 2020, issued in connection with International Application No. PCT/US2018053517, filed on Sep. 28, 2018, 10 pages.
International Bureau, International Preliminary Report on Patentability, mailed on Sep. 7, 2018, issued in connection with International Application No. PCT/US2017/018728, filed on Feb. 21, 2017, 8 pages.
International Bureau, International Preliminary Report on Patentability, mailed on Sep. 7, 2018, issued in connection with International Application No. PCT/US2017/018739, filed on Feb. 21, 2017, 7 pages.
International Bureau, International Search Report and Written Opinion mailed on Nov. 10, 2020, issued in connection with International Application No. PCT/US2020/044250, filed on Jul. 30, 2020, 15 pages.
International Bureau, International Search Report and Written Opinion mailed on Dec. 11, 2019, issued in connection with International Application No. PCT/US2019/052129, filed on Sep. 20, 2019, 18 pages.
International Bureau, International Search Report and Written Opinion mailed on Nov. 13, 2018, issued in connection with International Application No. PCT/US2018/045397, filed on Aug. 6, 2018, 11 pages.
International Bureau, International Search Report and Written Opinion mailed on Jan. 14, 2019, issued in connection with International Application No. PCT/US2018053472, filed on Sep. 28, 2018, 10 pages.
International Bureau, International Search Report and Written Opinion mailed on Jul. 14, 2020, issued in connection with International Application No. PCT/US2020/017150, filed on Feb. 7, 2020, 27 pages.
International Bureau, International Search Report and Written Opinion mailed on Nov. 14, 2017, issued in connection with International Application No. PCT/US2017/045521, filed on Aug. 4, 2017, 10 pages.
International Bureau, International Search Report and Written Opinion mailed on Jul. 17, 2019, issued in connection with International Application No. PCT/US2019/032934, filed on May 17, 2019, 17 pages.
International Bureau, International Search Report and Written Opinion mailed on Nov. 18, 2019, issued in connection with International Application No. PCT/US2019/048558, filed on Aug. 28, 2019, 11 pages.
International Bureau, International Search Report and Written Opinion mailed on Nov. 18, 2019, issued in connection with International Application No. PCT/US2019052841, filed on Sep. 25, 2019, 12 pages.
International Bureau, International Search Report and Written Opinion mailed on Mar. 2, 2020, issued in connection with International Application No. PCT/US2019064907, filed on Dec. 6, 2019, 11 pages.
International Bureau, International Search Report and Written Opinion mailed on Mar. 2, 2020, issued in connection with International Application No. PCT/US2019/064907, filed on Dec. 6, 2019, 9 pages.
International Bureau, International Search Report and Written Opinion mailed on Dec. 20, 2019, issued in connection with International Application No. PCT/US2019052654, filed on Sep. 24, 2019, 11 pages.
International Bureau, International Search Report and Written Opinion mailed on Mar. 20, 2023, issued in connection with International Application No. PCT/US2022/045399, filed on Sep. 30, 2022, 25 pages.
International Bureau, International Search Report and Written Opinion mailed on Sep. 21, 2020, issued in connection with International Application No. PCT/US2020/037229, filed on Jun. 11, 2020, 17 pages.
International Bureau, International Search Report and Written Opinion mailed on Oct. 22, 2020, issued in connection with International Application No. PCT/US2020/044282, filed on Jul. 30, 2020, 15 pages.
International Bureau, International Search Report and Written Opinion mailed on Apr. 23, 2021, issued in connection with International Application No. PCT/US2021/070007, filed on Jan. 6, 2021, 11 pages.

(56) References Cited

OTHER PUBLICATIONS

International Bureau, International Search Report and Written Opinion mailed on Jul. 24, 2018, issued in connection with International Application No. PCT/US2018/019010, filed on Feb. 21, 2018, 12 pages.
International Bureau, International Search Report and Written Opinion, mailed on Feb. 27, 2019, issued in connection with International Application No. PCT/US2018/053123, filed on Sep. 27, 2018, 16 pages.
International Bureau, International Search Report and Written Opinion mailed on Sep. 27, 2019, issued in connection with International Application No. PCT/US2019/039828, filed on Jun. 28, 2019, 13 pages.
International Bureau, International Search Report and Written Opinion mailed on Nov. 29, 2019, issued in connection with International Application No. PCT/US2019/053253, filed on Sep. 29, 2019, 14 pages.
International Bureau, International Search Report and Written Opinion mailed on Sep. 4, 2019, issued in connection with International Application No. PCT/US2019/033945, filed on May 24, 2019, 8 pages.
International Bureau, International Search Report and Written Opinion mailed on Aug. 6, 2020, issued in connection with International Application No. PCT/FR2019/000081, filed on May 24, 2019, 12 pages.
International Bureau, International Search Report and Written Opinion mailed on Dec. 6, 2018, issued in connection with International Application No. PCT/US2018/050050, filed on Sep. 7, 2018, 9 pages.
International Bureau, International Search Report and Written Opinion mailed on Dec. 6, 2019, issued in connection with International Application No. PCT/US2019050852, filed on Sep. 12, 2019, 10 pages.
International Bureau, International Search Report and Written Opinion mailed on Oct. 6, 2017, issued in connection with International Application No. PCT/US2017/045551, filed on Aug. 4, 2017, 12 pages.
International Bureau, International Search Report and Written Opinion mailed on Apr. 8, 2020, issued in connection with International Application No. PCT/US2019/067576, filed on Dec. 19, 2019, 12 pages.
International Searching Authority, International Search Report and Written Opinion mailed on Feb. 8, 2021, issued in connection with International Application No. PCT/EP2020/082243, filed on Nov. 16, 2020, 10 pages.
International Searching Authority, International Search Report and Written Opinion mailed on Feb. 12, 2021, issued in connection with International Application No. PCT/US2020/056632, filed on Oct. 21, 2020, 10 pages.
International Searching Authority, International Search Report and Written Opinion mailed on Dec. 19, 2018, in connection with International Application No. PCT/US2018/053517, 13 pages.
International Searching Authority, International Search Report and Written Opinion mailed on Nov. 22, 2017, issued in connection with International Application No. PCT/US2017/054063, filed on Sep. 28, 2017, 11 pages.
International Searching Authority, International Search Report and Written Opinion mailed on Apr. 23, 2021, issued in connection with International Application No. PCT/US2020/066231, filed on Dec. 18, 2020, 9 pages.
International Searching Authority, International Search Report and Written Opinion mailed on Jan. 23, 2018, issued in connection with International Application No. PCT/US2017/57220, filed on Oct. 18, 2017, 8 pages.
International Searching Authority, International Search Report and Written Opinion mailed on May 23, 2017, issued in connection with International Application No. PCT/US2017/018739, Filed on Feb. 21, 2017, 10 pages.
International Searching Authority, International Search Report and Written Opinion mailed on Oct. 23, 2017, issued in connection with International Application No. PCT/US2017/042170, filed on Jul. 14, 2017, 15 pages.
International Searching Authority, International Search Report and Written Opinion mailed on Oct. 24, 2017, issued in connection with International Application No. PCT/US2017/042227, filed on Jul. 14, 2017, 16 pages.
International Searching Authority, International Search Report and Written Opinion mailed on May 30, 2017, issued in connection with International Application No. PCT/US2017/018728, Filed on Feb. 21, 2017, 11 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on Oct. 4, 2022, issued in connection with Japanese Patent Application No. 2021-535871, 6 pages.
Japanese Patent Office, Decision of Refusal and Translation mailed on May 23, 2023, issued in connection with Japanese Patent Application No. 2021-163622, 13 pages.
Japanese Patent Office, Decision of Refusal and Translation mailed on Jul. 26, 2022, issued in connection with Japanese Patent Application No. 2020-513852, 10 pages.
Japanese Patent Office, Decision of Refusal and Translation mailed on Jun. 8, 2021, issued in connection with Japanese Patent Application No. 2019-073348, 5 pages.
Non-Final Office Action mailed on Jul. 11, 2024, issued in connection with U.S. Appl. No. 18/313,013, filed May 5, 2023, 18 pages.
Non-Final Office Action mailed on Mar. 11, 2021, issued in connection with U.S. Appl. No. 16/834,483, filed Mar. 30, 2020, 11 pages.
Non-Final Office Action mailed on Oct. 11, 2019, issued in connection with U.S. Appl. No. 16/177,185, filed Oct. 31, 2018, 14 pages.
Non-Final Office Action mailed on Sep. 11, 2020, issued in connection with U.S. Appl. No. 15/989,715, filed May 25, 2018, 8 pages.
Non-Final Office Action mailed on Sep. 11, 2020, issued in connection with U.S. Appl. No. 16/219,702, filed Dec. 13, 2018, 9 pages.
Non-Final Office Action mailed on Apr. 12, 2021, issued in connection with U.S. Appl. No. 16/528,224, filed Jul. 31, 2019, 9 pages.
Non-Final Office Action mailed on Apr. 12, 2023, issued in connection with U.S. Appl. No. 17/878,649, filed Aug. 1, 2022, 16 pages.
Non-Final Office Action mailed on Dec. 12, 2016, issued in connection with U.S. Appl. No. 15/098,718, filed Apr. 14, 2016, 11 pages.
Non-Final Office Action mailed on Feb. 12, 2019, issued in connection with U.S. Appl. No. 15/670,361, filed Aug. 7, 2017, 13 pages.
Non-Final Office Action mailed on Dec. 13, 2023, issued in connection with U.S. Appl. No. 18/316,400, filed May 12, 2023, 6 pages.
Non-Final Office Action mailed on Dec. 13, 2023, issued in connection with U.S. Appl. No. 18/316,434, filed May 12, 2023, 29 pages.
Non-Final Office Action mailed on Jan. 13, 2017, issued in connection with U.S. Appl. No. 15/098,805, filed Apr. 14, 2016, 11 pages.
Non-Final Office Action mailed on Mar. 13, 2024, issued in connection with U.S. Appl. No. 18/309,939, filed May 1, 2023, 15 pages.
Non-Final Office Action mailed on Nov. 13, 2018, issued in connection with U.S. Appl. No. 15/717,621, filed Sep. 27, 2017, 23 pages.
Non-Final Office Action mailed on Nov. 13, 2018, issued in connection with U.S. Appl. No. 16/160,107, filed Oct. 15, 2018, 8 pages.
Non-Final Office Action mailed on Nov. 13, 2019, issued in connection with U.S. Appl. No. 15/984,073, filed May 18, 2018, 18 pages.

(56) References Cited

OTHER PUBLICATIONS

Non-Final Office Action mailed on Oct. 13, 2021, issued in connection with U.S. Appl. No. 16/679,538, filed Nov. 11, 2019, 8 pages.
Non-Final Office Action mailed on May 14, 2020, issued in connection with U.S. Appl. No. 15/948,541, filed Apr. 9, 2018, 8 pages.
Non-Final Office Action mailed on Nov. 14, 2022, issued in connection with U.S. Appl. No. 17/077,974, filed Oct. 22, 2020, 6 pages.
Non-Final Office Action mailed on Sep. 14, 2017, issued in connection with U.S. Appl. No. 15/178,180, filed Jun. 9, 2016, 16 pages.
Non-Final Office Action mailed on Sep. 14, 2018, issued in connection with U.S. Appl. No. 15/959,907, filed Apr. 23, 2018, 15 pages.
Non-Final Office Action mailed on Sep. 14, 2022, issued in connection with U.S. Appl. No. 17/446,690, filed Sep. 1, 2021, 10 pages.
Non-Final Office Action mailed on Sep. 14, 2023, issued in connection with U.S. Appl. No. 17/528,843, filed Nov. 17, 2021, 20 pages.
Non-Final Office Action mailed on Apr. 15, 2020, issued in connection with U.S. Appl. No. 16/138,111, filed Sep. 21, 2018, 15 pages.
Non-Final Office Action mailed on Aug. 15, 2022, issued in connection with U.S. Appl. No. 17/448,015, filed Sep. 17, 2021, 12 pages.
Non-Final Office Action mailed on Dec. 15, 2020, issued in connection with U.S. Appl. No. 17/087,423, filed Nov. 2, 2020, 7 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.
Non-Final Office Action mailed on Jan. 15, 2019, issued in connection with U.S. Appl. No. 16/173,797, filed Oct. 29, 2018, 6 pages.
Non-Final Office Action mailed on Nov. 15, 2019, issued in connection with U.S. Appl. No. 16/153,530, filed Oct. 5, 2018, 17 pages.
Non-Final Office Action mailed on Sep. 15, 2022, issued in connection with U.S. Appl. No. 17/247,507, filed Dec. 14, 2020, 9 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Mar. 16, 2018, issued in connection with U.S. Appl. No. 15/681,937, filed Aug. 21, 2017, 5 pages.
Non-Final Office Action mailed on Oct. 16, 2018, issued in connection with U.S. Appl. No. 15/131,254, filed Apr. 18, 2016, 16 pages.
Non-Final Office Action mailed on Sep. 16, 2021, issued in connection with U.S. Appl. No. 16/879,553, filed May 20, 2020, 24 pages.
Non-Final Office Action mailed on Aug. 17, 2021, issued in connection with U.S. Appl. No. 17/236,559, filed Apr. 21, 2021, 10 pages.
Non-Final Office Action mailed on Sep. 17, 2020, issued in connection with U.S. Appl. No. 16/600,949, filed Oct. 14, 2019, 29 pages.
Non-Final Office Action mailed on Apr. 18, 2018, issued in connection with U.S. Appl. No. 15/811,468, filed Nov. 13, 2017, 14 pages.
Non-Final Office Action mailed on Aug. 18, 2021, issued in connection with U.S. Appl. No. 16/845,946, filed Apr. 10, 2020, 14 pages.
Non-Final Office Action mailed on Jan. 18, 2019, issued in connection with U.S. Appl. No. 15/721,141, filed Sep. 29, 2017, 18 pages.
Non-Final Office Action mailed on Jan. 18, 2024, issued in connection with U.S. Appl. No. 18/048,034, filed Oct. 20, 2022, 10 pages.
Non-Final Office Action mailed on Jul. 18, 2023, issued in connection with U.S. Appl. No. 18/066,093, filed Dec. 14, 2022, 12 pages.
Non-Final Office Action mailed on Mar. 18, 2024, issued in connection with U.S. Appl. No. 17/532,744, filed Nov. 22, 2021, 20 pages.
Non-Final Office Action mailed on Oct. 18, 2019, issued in connection with U.S. Appl. No. 15/098,760, filed Apr. 14, 2016, 27 pages.
Non-Final Office Action mailed on Oct. 18, 2022, issued in connection with U.S. Appl. No. 16/949,973, filed Nov. 23, 2020, 31 pages.
Non-Final Office Action mailed on Sep. 18, 2019, issued in connection with U.S. Appl. No. 16/179,779, filed Nov. 2, 2018, 14 pages.
Non-Final Office Action mailed on Apr. 19, 2017, issued in connection with U.S. Appl. No. 15/131,776, filed Apr. 18, 2016, 12 pages.
Non-Final Office Action mailed on Dec. 19, 2019, issued in connection with U.S. Appl. No. 16/147,710, filed Sep. 29, 2018, 10 pages.
Non-Final Office Action mailed on Feb. 19, 2020, issued in connection with U.S. Appl. No. 16/148,879, filed Oct. 1, 2018, 15 pages.
Final Office Action mailed on Feb. 7, 2020, issued in connection with U.S. Appl. No. 15/948,541, filed Apr. 9, 2018, 8 pages.
Final Office Action mailed on Jun. 7, 2022, issued in connection with U.S. Appl. No. 16/736,725, filed Jan. 7, 2020, 14 pages.
Final Office Action mailed on Jul. 8, 2024, issued in connection with U.S. Appl. No. 17/222,950, filed Apr. 5, 2021, 10 pages.
Final Office Action mailed on Jun. 8, 2021, issued in connection with U.S. Appl. No. 16/271,550, filed Feb. 8, 2019, 41 pages.
Final Office Action mailed on Sep. 8, 2020, issued in connection with U.S. Appl. No. 16/213,570, filed Dec. 7, 2018, 12 pages.
Final Office Action mailed on Aug. 9, 2023, issued in connection with U.S. Appl. No. 17/493,430, filed Oct. 4, 2021, 19 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
First Action Interview Office Action mailed on Mar. 8, 2021, issued in connection with U.S. Appl. No. 16/798,967, filed Feb. 24, 2020, 4 pages.
First Action Interview Office Action mailed on Aug. 14, 2019, issued in connection with U.S. Appl. No. 16/227,308, filed Dec. 20, 2018, 4 pages.
First Action Interview Office Action mailed on Jun. 15, 2020, issued in connection with U.S. Appl. No. 16/213,570, filed Dec. 7, 2018, 4 pages.
First Action Interview Office Action mailed on Jun. 2, 2020, issued in connection with U.S. Appl. No. 16/109,375, filed Aug. 22, 2018, 10 pages.
First Action Interview Office Action mailed on Jan. 22, 2020, issued in connection with U.S. Appl. No. 15/989,715, filed May 25, 2018, 3 pages.
First Action Interview Office Action mailed on Jul. 5, 2019, issued in connection with U.S. Appl. No. 16/227,308, filed Dec. 20, 2018, 4 pages.
Freiberger, Karl, "Development and Evaluation of Source Localization Algorithms for Coincident Microphone Arrays," Diploma Thesis, Apr. 1, 2010, 106 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.

(56) References Cited

OTHER PUBLICATIONS

Giacobello et al. "Tuning Methodology for Speech Enhancement Algorithms using a Simulated Conversational Database and Perceptual Objective Measures," 2014, 4th Joint Workshop on Hands-free Speech Communication and Microphone Arrays HSCMA, 2014, 5 pages.
*Google LLC* v. *Sonos, Inc*., International Trade Commission Case No. 337-TA-1330, Order No. 25: Regarding Respondent Sonos, Inc.'s Omnibus Motion for Summary Determination; dated May 16, 2023, 7 pages.
*Google LLC* v. *Sonos, Inc*., International Trade Commission Case No. 337-TA-1330, Order No. 28: Regarding Respondent Sonos, Inc.'s Omnibus Motion for Summary Determination; dated May 22, 2023, 3 pages.
*Google LLC* v. *Sonos, Inc*., International Trade Commission Case No. 337-TA-1330, Order No. 37: Regarding Complainant Google LLC's Motions in Limine; dated Jul. 7, 2023, 10 pages.
*Google LLC* v. *Sonos, Inc*., International Trade Commission Case No. 337-TA-1330, Respondent Sonos, Inc.'s Motion in Limine No. 4. Motion to Exclude Untimely Validity Arguments Regarding Claim 11 of U.S. Pat. No. 11,024,311; dated Jun. 13, 2023, 34 pages.
*Google LLC* v. *Sonos, Inc*., International Trade Commission Case No. 337-TA-1330, Respondent Sonos, Inc.'s Response to Google's Motion in Limine No. 3 Preclude Sonos from Presenting Evidence or Argument that Claim 3 of the '748 Patent is Indefinite for Lack of Antecedent Basis; dated Jun. 12, 2023, 26 pages.
Han et al. "Deep Compression: Compressing Deep Neural Networks with Pruning, Trained Quantization and Huffman Coding." ICLR 2016, Feb. 15, 2016, 14 pages.
Hans Speidel: "Chatbot Training: How to use training data to provide fully automated customer support", Jun. 29, 2017, pp. 1-3, XP055473185, Retrieved from the Internet: URL:https://www.crowdguru.de/wp-content/uploads/Case-Study-Chatbot-training-How-to-use-training-data-to-provide-fully-automated-customer-support.pdf [retrieved on May 7, 2018].
Helwani et al."Source-domain adaptive filtering for MIMO systems with application to acoustic echo cancellation", Acoustics Speech and Signal Processing, 2010 IEEE International Conference, Mar. 14, 2010, 4 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO +ACOUSTIC+ECHO+CANCELLATION&btnG=.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
Indian Patent Office, Examination Report mailed on May 24, 2021, issued in connection with Indian Patent Application No. 201847035595, 6 pages.
Indian Patent Office, Examination Report mailed on Feb. 25, 2021, issued in connection with Indian Patent Application No. 201847035625, 6 pages.
Indian Patent Office, Examination Report mailed on Feb. 28, 2024, issued in connection with Indian Patent Application No. 201847035625, 3 pages.
Indian Patent Office, Examination Report mailed on Dec. 5, 2023, issued in connection with Indian Patent Application No. 201847035625, 3 pages.
International Bureau, International Preliminary Report on Patentability and Written Opinion, mailed on Apr. 1, 2021, issued in connection with International Application No. PCT/US2019/052129, filed on Sep. 20, 2019, 13 pages.
International Bureau, International Preliminary Report on Patentability and Written Opinion, mailed on Jul. 1, 2021, issued in connection with International Application No. PCT/US2019/067576, filed on Dec. 19, 2019, 8 pages.
International Bureau, International Preliminary Report on Patentability and Written Opinion, mailed on Aug. 10, 2021, issued in connection with International Application No. PCT/US2020/017150, filed on Feb. 7, 2020, 20 pages.
International Bureau, International Preliminary Report on Patentability and Written Opinion, mailed on Dec. 10, 2020, issued in connection with International Application No. PCT/US2019/033945, filed on May 25, 2018, 7 pages.
International Bureau, International Preliminary Report on Patentability and Written Opinion, mailed on Mar. 10, 2020, issued in connection with International Application No. PCT/US2018/050050, filed on Sep. 7, 2018, 7 pages.
International Bureau, International Preliminary Report on Patentability and Written Opinion, mailed on Apr. 15, 2021, issued in connection with International Application No. PCT/US2019/054332, filed on Oct. 2, 2019, 9 pages.
International Bureau, International Preliminary Report on Patentability and Written Opinion, mailed on Jan. 15, 2019, issued in connection with International Application No. PCT/US2017/042170, filed on Jul. 14, 2017, 7 pages.
International Bureau, International Preliminary Report on Patentability and Written Opinion, mailed on Jan. 15, 2019, issued in connection with International Application No. PCT/US2017/042227, filed on Jul. 14, 2017, 7 pages.
International Bureau, International Preliminary Report on Patentability and Written Opinion, mailed on Mar. 25, 2021, issued in connection with International Application No. PCT/US2019/050852, filed on Sep. 12, 2019, 8 pages.
International Bureau, International Preliminary Report on Patentability and Written Opinion, mailed on Aug. 27, 2019, issued in connection with International Application No. PCT/US2018/019010, filed on Feb. 21, 2018, 9 pages.
International Bureau, International Preliminary Report on Patentability and Written Opinion, mailed on Mar. 31, 2020, issued in connection with International Application No. PCT/US2018/053517, filed on Sep. 28, 2018, 10 pages.
International Bureau, International Preliminary Report on Patentability and Written Opinion, mailed on Feb. 5, 2019, issued in connection with International Application No. PCT/US2017/045521, filed on Aug. 4, 2017, 7 pages.
International Bureau, International Preliminary Report on Patentability and Written Opinion, mailed on Feb. 5, 2019, issued in connection with International Application No. PCT/US2017/045551, filed on Aug. 4, 2017, 9 pages.
International Bureau, International Preliminary Report on Patentability and Written Opinion, mailed on Jan. 7, 2021, issued in connection with International Application No. PCT/US2019/039828, filed on Jun. 28, 2019, 11 pages.
International Bureau, International Preliminary Report on Patentability and Written Opinion, mailed on Apr. 8, 2021, issued in connection with International Application No. PCT/US2019/052654, filed on Sep. 24, 2019, 7 pages.
International Bureau, International Preliminary Report on Patentability and Written Opinion, mailed on Apr. 8, 2021, issued in connection with International Application No. PCT/US2019/052841, filed on Sep. 25, 2019, 8 pages.
International Bureau, International Preliminary Report on Patentability and Written Opinion, mailed on Apr. 8, 2021, issued in connection with International Application No. PCT/US2019/053253, filed on Sep. 26, 2019, 10 pages.
International Bureau, International Preliminary Report on Patentability, mailed on Apr. 11, 2019, issued in connection with International Application No. PCT/US2017/0054063, filed on Sep. 28, 2017, 9 pages.
International Bureau, International Preliminary Report on Patentability, mailed on Jun. 17, 2021, issued in connection with International Application No. PCT/US2019/064907, filed on Dec. 6, 2019, 8 pages.

(56) References Cited

OTHER PUBLICATIONS

International Bureau, International Preliminary Report on Patentability, mailed on Mar. 2, 2021, issued in connection with International Application No. PCT/US2019/048558, filed on Aug. 28, 2019, 8 pages.
Notice of Allowance mailed on Dec. 12, 2018, issued in connection with U.S. Appl. No. 15/811,468, filed Nov. 13, 2017, 9 pages.
Notice of Allowance mailed on Jul. 12, 2017, issued in connection with U.S. Appl. No. 15/098,805, filed Apr. 14, 2016, 8 pages.
Notice of Allowance mailed on Jul. 12, 2022, issued in connection with U.S. Appl. No. 16/907,953, filed Jun. 22, 2020, 8 pages.
Notice of Allowance mailed on Jul. 12, 2022, issued in connection with U.S. Appl. No. 17/391,404, filed Aug. 2, 2021, 13 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2019, issued in connection with U.S. Appl. No. 15/670,361, filed Aug. 7, 2017, 7 pages.
Notice of Allowance mailed on Jun. 12, 2023, issued in connection with U.S. Appl. No. 17/453,632, filed Nov. 4, 2021, 9 pages.
Notice of Allowance mailed on May 12, 2021, issued in connection with U.S. Appl. No. 16/402,617, filed May 3, 2019, 8 pages.
Notice of Allowance mailed on Sep. 12, 2018, issued in connection with U.S. Appl. No. 15/438,744, filed Feb. 21, 2017, 15 pages.
Notice of Allowance mailed on Apr. 13, 2022, issued in connection with U.S. Appl. No. 17/236,559, filed Apr. 21, 2021, 7 pages.
Notice of Allowance mailed on Dec. 13, 2017, issued in connection with U.S. Appl. No. 15/784,952, filed Oct. 16, 2017, 9 pages.
Notice of Allowance mailed on Dec. 13, 2021, issued in connection with U.S. Appl. No. 16/879,553, filed May 20, 2020, 15 pages.
Notice of Allowance mailed on Feb. 13, 2019, issued in connection with U.S. Appl. No. 15/959,907, filed Apr. 23, 2018, 10 pages.
Notice of Allowance mailed on Feb. 13, 2023, issued in connection with U.S. Appl. No. 18/045,360, filed Oct. 10, 2022, 9 pages.
Notice of Allowance mailed on Jan. 13, 2020, issued in connection with U.S. Appl. No. 16/192,126, filed Nov. 15, 2018, 6 pages.
Notice of Allowance mailed on Jan. 13, 2021, issued in connection with U.S. Appl. No. 16/539,843, filed Aug. 13, 2019, 5 pages.
Notice of Allowance mailed on Jul. 13, 2023, issued in connection with U.S. Appl. No. 18/145,501, filed Dec. 22, 2022, 9 pages.
Notice of Allowance mailed on Jun. 13, 2023, issued in connection with U.S. Appl. No. 17/249,776, filed Mar. 12, 2021, 10 pages.
Notice of Allowance mailed on Mar. 13, 2024, issued in connection with U.S. Appl. No. 18/449,254, filed Aug. 14, 2023, 10 pages.
Notice of Allowance mailed on Nov. 13, 2020, issued in connection with U.S. Appl. No. 16/131,409, filed Sep. 14, 2018, 11 pages.
Notice of Allowance mailed on Aug. 14, 2017, issued in connection with U.S. Appl. No. 15/098,867, filed Apr. 14, 2016, 10 pages.
Notice of Allowance mailed on Aug. 14, 2020, issued in connection with U.S. Appl. No. 16/598,125, filed Oct. 10, 2019, 5 pages.
Notice of Allowance mailed on Aug. 14, 2023, issued in connection with U.S. Appl. No. 17/549,034, filed Dec. 13, 2021, 9 pages.
Notice of Allowance mailed on Dec. 14, 2023, issued in connection with U.S. Appl. No. 17/722,661, filed Apr. 18, 2022, 12 pages.
Notice of Allowance mailed on Feb. 14, 2017, issued in connection with U.S. Appl. No. 15/229,855, filed Aug. 5, 2016, 11 pages.
Notice of Allowance mailed on Jan. 14, 2021, issued in connection with U.S. Appl. No. 17/087,423, filed Nov. 2, 2020, 8 pages.
Notice of Allowance mailed on Jan. 14, 2022, issued in connection with U.S. Appl. No. 16/966,397, filed Jul. 30, 2020, 5 pages.
Notice of Allowance mailed on Jun. 14, 2017, issued in connection with U.S. Appl. No. 15/282,554, filed Sep. 30, 2016, 11 pages.
Notice of Allowance mailed on Nov. 14, 2018, issued in connection with U.S. Appl. No. 15/297,627, filed Oct. 19, 2016, 5 pages.
Notice of Allowance mailed on Sep. 14, 2023, issued in connection with U.S. Appl. No. 18/061,579, filed Dec. 5, 2022, 7 pages.
Notice of Allowance mailed on Aug. 15, 2022, issued in connection with U.S. Appl. No. 17/101,949, filed Nov. 23, 2020, 11 pages.
Notice of Allowance mailed on Dec. 15, 2017, issued in connection with U.S. Appl. No. 15/223,218, filed Jul. 29, 2016, 7 pages.
Notice of Allowance mailed on Dec. 15, 2023, issued in connection with U.S. Appl. No. 18/157,937, filed Jan. 23, 2023, 8 pages.
Notice of Allowance mailed on Feb. 15, 2023, issued in connection with U.S. Appl. No. 17/659,613, filed Apr. 18, 2022, 21 pages.
Notice of Allowance mailed on Jan. 15, 2020, issued in connection with U.S. Appl. No. 16/439,009, filed Jun. 12, 2019, 9 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Mar. 15, 2019, issued in connection with U.S. Appl. No. 15/804,776, filed Nov. 6, 2017, 9 pages.
Notice of Allowance mailed on Oct. 15, 2019, issued in connection with U.S. Appl. No. 16/437,437, filed Jun. 11, 2019, 9 pages.
Notice of Allowance mailed on Oct. 15, 2020, issued in connection with U.S. Appl. No. 16/715,713, filed Dec. 16, 2019, 9 pages.
Notice of Allowance mailed on Oct. 15, 2021, issued in connection with U.S. Appl. No. 16/213,570, filed Dec. 7, 2018, 8 pages.
Notice of Allowance mailed on Sep. 15, 2021, issued in connection with U.S. Appl. No. 16/685,135, filed Nov. 15, 2019, 10 pages.
Notice of Allowance mailed on Sep. 15, 2022, issued in connection with U.S. Appl. No. 16/736,725 , filed on Jan. 1, 2020, 11 pages.
Notice of Allowance mailed on Apr. 16, 2021, issued in connection with U.S. Appl. No. 16/798,967, filed Feb. 24, 2020, 16 pages.
Notice of Allowance mailed on Aug. 16, 2017, issued in connection with U.S. Appl. No. 15/098,892, filed Apr. 14, 2016, 9 pages.
Notice of Allowance mailed on Aug. 16, 2023, issued in connection with U.S. Appl. No. 17/536,572, filed Nov. 29, 2021, 7 pages.
Notice of Allowance mailed on Apr. 17, 2024, issued in connection with U.S. Appl. No. 18/088,976, filed Dec. 27, 2022, 7 pages.
Notice of Allowance mailed on Apr. 17, 2024, issued in connection with U.S. Appl. No. 18/471,693, filed Sep. 21, 2023, 12 pages.
Notice of Allowance mailed on Aug. 17, 2017, issued in connection with U.S. Appl. No. 15/131,244, filed Apr. 18, 2016, 9 pages.
Notice of Allowance mailed on Aug. 17, 2022, issued in connection with U.S. Appl. No. 17/135,347, filed Dec. 28, 2020, 14 pages.
Non-Final Office Action mailed on Sep. 7, 2023, issued in connection with U.S. Appl. No. 17/340,590, filed Jun. 7, 2021, 18 pages.
Non-Final Office Action mailed on Feb. 8, 2022, issued in connection with U.S. Appl. No. 16/806,747, filed Mar. 2, 2020, 17 pages.
Non-Final Office Action mailed on Jul. 8, 2024, issued in connection with U.S. Appl. No. 18/520,531, filed Nov. 27, 2023, 63 pages.
Non-Final Office Action mailed on Jun. 8, 2023, issued in connection with U.S. Appl. No. 18/048,034, filed Oct. 20, 2022, 8 pages.
Non-Final Office Action mailed on Jun. 8, 2023, issued in connection with U.S. Appl. No. 18/061,243, filed Dec. 2, 2022, 10 pages.
Non-Final Office Action mailed on Sep. 8, 2020, issued in connection with U.S. Appl. No. 15/936,177, filed Mar. 26, 2018, 19 pages.
Non-Final Office Action mailed on Apr. 9, 2018, issued in connection with U.S. Appl. No. 15/804,776, filed Nov. 6, 2017, 18 pages.
Non-Final Office Action mailed on Apr. 9, 2021, issued in connection with U.S. Appl. No. 16/780,483, filed Feb. 3, 2020, 45 pages.
Non-Final Office Action mailed on Feb. 9, 2021, issued in connection with U.S. Appl. No. 16/806,747, filed Mar. 2, 2020, 16 pages.
Non-Final Office Action mailed on May 9, 2018, issued in connection with U.S. Appl. No. 15/818,051, filed Nov. 20, 2017, 22 pages.
Non-Final Office Action mailed on Sep. 9, 2020, issued in connection with U.S. Appl. No. 16/168,389, filed Oct. 23, 2018, 29 pages.
Notice of Allowance mailed Aug. 10, 2021, issued in connection with U.S. Appl. No. 17/157,686, filed Jan. 25, 2021, 9 pages.
Notice of Allowance mailed Aug. 2, 2021, issued in connection with U.S. Appl. No. 16/660,197, filed Oct. 22, 2019, 7 pages.
Notice of Allowance mailed Mar. 31, 2021, issued in connection with U.S. Appl. No. 16/813,643, filed Mar. 9, 2020, 11 pages.
Notice of Allowance mailed Aug. 4, 2021, issued in connection with U.S. Appl. No. 16/780,483, filed Feb. 3, 2020, 5 pages.
Notice of Allowance mailed on Dec. 2, 2019, issued in connection with U.S. Appl. No. 15/718,521, filed Sep. 28, 2017, 15 pages.
Notice of Allowance mailed on Nov. 2, 2022, issued in connection with U.S. Appl. No. 16/989,805, filed Aug. 10, 2020, 5 pages.
Notice of Allowance mailed on Nov. 3, 2022, issued in connection with U.S. Appl. No. 17/448,015, filed Sep. 17, 2021, 7 pages.

(56) References Cited

OTHER PUBLICATIONS

Notice of Allowance mailed on Dec. 4, 2017, issued in connection with U.S. Appl. No. 15/277,810, filed Sep. 27, 2016, 5 pages.
Notice of Allowance mailed on Jul. 5, 2018, issued in connection with U.S. Appl. No. 15/237,133, filed Aug. 15, 2016, 5 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
Notice of Allowance mailed on Jan. 9, 2023, issued in connection with U.S. Appl. No. 17/247,507, filed Dec. 14, 2020, 8 pages.
Notice of Allowance mailed on Jul. 9, 2018, issued in connection with U.S. Appl. No. 15/438,741, filed Feb. 21, 2017, 5 pages.
Notice of Allowance mailed on Jun. 9, 2023, issued in connection with U.S. Appl. No. 17/532,674, filed Nov. 22, 2021, 13 pages.
Notice of Allowance mailed on Mar. 9, 2023, issued in connection with U.S. Appl. No. 17/662,302, filed May 6, 2022, 7 pages.
Notice of Allowance mailed on Nov. 9, 2022, issued in connection with U.S. Appl. No. 17/385,542, filed Jul. 26, 2021, 8 pages.
Notice of Allowance mailed on Apr. 1, 2019, issued in connection with U.S. Appl. No. 15/935,966, filed Mar. 26, 2018, 5 pages.
Notice of Allowance mailed on Aug. 1, 2018, issued in connection with U.S. Appl. No. 15/297,627, filed Oct. 19, 2016, 9 pages.
Notice of Allowance mailed on Feb. 1, 2022, issued in connection with U.S. Appl. No. 16/439,046, filed Jun. 12, 2019, 9 pages.
Notice of Allowance mailed on Jun. 1, 2021, issued in connection with U.S. Appl. No. 16/219,702, filed Dec. 13, 2018, 8 pages.
Notice of Allowance mailed on Jun. 1, 2021, issued in connection with U.S. Appl. No. 16/685,135, filed Nov. 15, 2019, 10 pages.
Notice of Allowance mailed on Mar. 1, 2022, issued in connection with U.S. Appl. No. 16/879,549, filed May 20, 2020, 9 pages.
Notice of Allowance mailed on Sep. 1, 2021, issued in connection with U.S. Appl. No. 15/936,177, filed Mar. 26, 2018, 22 pages.
Notice of Allowance mailed on Aug. 10, 2020, issued in connection with U.S. Appl. No. 16/424,825, filed May 29, 2019, 9 pages.
Notice of Allowance mailed on Feb. 10, 2021, issued in connection with U.S. Appl. No. 16/138,111, filed Sep. 21, 2018, 8 pages.
Notice of Allowance mailed on Jul. 10, 2023, issued in connection with U.S. Appl. No. 17/315,599, filed May 10, 2021, 2 pages.
Notice of Allowance mailed on Jul. 10, 2024, issued in connection with U.S. Appl. No. 18/309,939, filed May 1, 2023, 5 pages.
Notice of Allowance mailed on Jun. 10, 2022, issued in connection with U.S. Appl. No. 16/879,549, filed May 20, 2020, 8 pages.
Notice of Allowance mailed on Apr. 11, 2018, issued in connection with U.S. Appl. No. 15/719,454, filed Sep. 28, 2017, 15 pages.
Notice of Allowance mailed on Aug. 11, 2023, issued in connection with U.S. Appl. No. 17/878,649, filed Aug. 1, 2022, 7 pages.
Notice of Allowance mailed on May 11, 2022, issued in connection with U.S. Appl. No. 17/135,123, filed Dec. 28, 2020, 8 pages.
Notice of Allowance mailed on May 11, 2022, issued in connection with U.S. Appl. No. 17/145,667, filed Jan. 11, 2021, 7 pages.
Notice of Allowance mailed on May 11, 2023, issued in connection with U.S. Appl. No. 18/061,638, filed Dec. 5, 2022, 15 pages.
Notice of Allowance mailed on Oct. 11, 2019, issued in connection with U.S. Appl. No. 16/437,476, filed Jun. 11, 2019, 9 pages.
Notice of Allowance mailed on Sep. 11, 2019, issued in connection with U.S. Appl. No. 16/154,071, filed Oct. 8, 2018, 5 pages.
Notice of Allowance mailed on Aug. 12, 2021, issued in connection with U.S. Appl. No. 16/819,755, filed Mar. 16, 2020, 6 pages.
Notice of Allowance mailed on Apr. 24, 2019, issued in connection with U.S. Appl. No. 16/154,469, filed Oct. 8, 2018, 5 pages.
Notice of Allowance mailed on Mar. 24, 2022, issued in connection with U.S. Appl. No. 16/378,516, filed Apr. 8, 2019, 7 pages.
Notice of Allowance mailed on May 24, 2024, issued in connection with U.S. Appl. No. 18/154,228, filed Jan. 13, 2023, 8 pages.
Notice of Allowance mailed on Nov. 24, 2023, issued in connection with U.S. Appl. No. 18/070,024, filed Nov. 28, 2022, 7 pages.
Notice of Allowance mailed on Oct. 25, 2021, issued in connection with U.S. Appl. No. 16/723,909, filed Dec. 20, 2019, 11 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Aug. 26, 2020, issued in connection with U.S. Appl. No. 15/948,541, filed Apr. 9, 2018, 9 pages.
Notice of Allowance mailed on Aug. 26, 2022, issued in connection with U.S. Appl. No. 17/145,667, filed Jan. 11, 2021, 8 pages.
Notice of Allowance mailed on May 26, 2021, issued in connection with U.S. Appl. No. 16/927,670, filed Jul. 13, 2020, 10 pages.
Notice of Allowance mailed on Oct. 26, 2022, issued in connection with U.S. Appl. No. 17/486,574, filed Sep. 27, 2021, 11 pages.
Notice of Allowance mailed on Apr. 27, 2020, issued in connection with U.S. Appl. No. 16/700,607, filed Dec. 2, 2019, 10 pages.
Notice of Allowance mailed on Jun. 27, 2022, issued in connection with U.S. Appl. No. 16/812,758, filed Mar. 9, 2020, 16 pages.
Notice of Allowance mailed on Mar. 27, 2019, issued in connection with U.S. Appl. No. 16/214,666, filed Dec. 10, 2018, 6 pages.
Notice of Allowance mailed on Mar. 27, 2024, issued in connection with U.S. Appl. No. 18/061,570, filed Dec. 5, 2022, 8 pages.
Notice of Allowance mailed on Sep. 27, 2023, issued in connection with U.S. Appl. No. 17/656,794, filed Mar. 28, 2022, 11 pages.
Notice of Allowance mailed on Sep. 27, 2023, issued in connection with U.S. Appl. No. 18/048,945, filed Oct. 24, 2022, 9 pages.
Notice of Allowance mailed on Sep. 27, 2023, issued in connection with U.S. Appl. No. 18/061,243, filed Dec. 2, 2022, 8 pages.
Notice of Allowance mailed on Feb. 28, 2024, issued in connection with U.S. Appl. No. 16/989,350, filed Aug. 10, 2020, 9 pages.
Notice of Allowance mailed on Mar. 28, 2018, issued in connection with U.S. Appl. No. 15/699,982, filed Sep. 8, 2017, 17 pages.
Notice of Allowance mailed on Mar. 28, 2024, issued in connection with U.S. Appl. No. 18/316,400, filed May 12, 2023, 8 pages.
Notice of Allowance mailed on May 28, 2021, issued in connection with U.S. Appl. No. 16/524,306, filed Jul. 29, 2019, 9 pages.
Notice of Allowance mailed on Sep. 28, 2022, issued in connection with U.S. Appl. No. 17/444,043, filed Jul. 29, 2021, 17 pages.
Notice of Allowance mailed on Dec. 29, 2017, issued in connection with U.S. Appl. No. 15/131,776, filed Apr. 18, 2016, 13 pages.
Notice of Allowance mailed on Dec. 29, 2022, issued in connection with U.S. Appl. No. 17/327,911, filed May 24, 2021, 14 pages.
Notice of Allowance mailed on Jan. 29, 2021, issued in connection with U.S. Appl. No. 16/290,599, filed Mar. 1, 2019, 9 pages.
Notice of Allowance mailed on Jul. 29, 2022, issued in connection with U.S. Appl. No. 17/236,559, filed Apr. 21, 2021, 6 pages.
Notice of Allowance mailed on Jun. 29, 2020, issued in connection with U.S. Appl. No. 16/216,357, filed Dec. 11, 2018, 8 pages.
Notice of Allowance mailed on Mar. 29, 2021, issued in connection with U.S. Appl. No. 16/600,949, filed Oct. 14, 2019, 9 pages.
Notice of Allowance mailed on Mar. 29, 2023, issued in connection with U.S. Appl. No. 17/722,438, filed Apr. 18, 2022, 7 pages.
Notice of Allowance mailed on May 29, 2020, issued in connection with U.S. Appl. No. 16/148,879, filed Oct. 1, 2018, 6 pages.
Notice of Allowance mailed on Sep. 29, 2021, issued in connection with U.S. Appl. No. 16/876,493, filed May 18, 2020, 5 pages.
Notice of Allowance mailed on Sep. 29, 2023, issued in connection with U.S. Appl. No. 16/168,389, filed Oct. 23, 2018, 11 pages.
Notice of Allowance mailed on Apr. 3, 2019, issued in connection with U.S. Appl. No. 16/160,107, filed Oct. 15, 2018, 7 pages.
Notice of Allowance mailed on Jul. 3, 2024, issued in connection with U.S. Appl. No. 18/507,713, filed Nov. 13, 2023, 11 pages.
Notice of Allowance mailed on Jun. 3, 2021, issued in connection with U.S. Appl. No. 16/876,493, filed May 18, 2020, 7 pages.
Notice of Allowance mailed on Mar. 3, 2022, issued in connection with U.S. Appl. No. 16/679,538, filed Nov. 11, 2019, 7 pages.
Notice of Allowance mailed on May 3, 2024, issued in connection with U.S. Appl. No. 18/331,580, filed Jun. 8, 2023, 7 pages.
Notice of Allowance mailed on Jul. 30, 2018, issued in connection with U.S. Appl. No. 15/098,718, filed Apr. 14, 2016, 5 pages.

(56) References Cited

OTHER PUBLICATIONS

Notice of Allowance mailed on Jul. 30, 2019, issued in connection with U.S. Appl. No. 15/131,254, filed Apr. 18, 2016, 9 pages.
Notice of Allowance mailed on Jun. 30, 2023, issued in connection with U.S. Appl. No. 17/303,001, filed May 18, 2021, 8 pages.
Notice of Allowance mailed on Mar. 30, 2020, issued in connection with U.S. Appl. No. 15/973,413, filed May 7, 2018, 5 pages.
Notice of Allowance mailed on Mar. 30, 2023, issued in connection with U.S. Appl. No. 17/303,066, filed May 19, 2021, 7 pages.
Notice of Allowance mailed on Nov. 30, 2018, issued in connection with U.S. Appl. No. 15/438,725, filed Feb. 21, 2017, 5 pages.
Notice of Allowance mailed on Oct. 30, 2019, issued in connection with U.S. Appl. No. 16/131,392, filed Sep. 14, 2018, 9 pages.
Notice of Allowance mailed on Oct. 30, 2020, issued in connection with U.S. Appl. No. 16/528,016, filed Jul. 31, 2019, 10 pages.
Notice of Allowance mailed on Aug. 31, 2023, issued in connection with U.S. Appl. No. 18/145,520, filed Dec. 22, 2022, 2 pages.
Notice of Allowance mailed on Mar. 31, 2023, issued in connection with U.S. Appl. No. 17/303,735, filed Jun. 7, 2021, 19 pages.
Notice of Allowance mailed on May 31, 2019, issued in connection with U.S. Appl. No. 15/717,621, filed Sep. 27, 2017, 9 pages.
Notice of Allowance mailed on Aug. 4, 2023, issued in connection with U.S. Appl. No. 18/145,520, filed Dec. 22, 2022, 10 pages.
European Patent Office, European EPC Article 94.3 mailed on Jun. 21, 2022, issued in connection with European Application No. 19780508.8, 5 pages.
European Patent Office, European EPC Article 94.3 mailed on Feb. 23, 2021, issued in connection with European Application No. 17200837.7, 8 pages.
European Patent Office, European EPC Article 94.3 mailed on Feb. 23, 2023, issued in connection with European Application No. 19839734.1, 8 pages.
European Patent Office, European EPC Article 94.3 mailed on Jan. 24, 2024, issued in connection with European Application No. 21180778.9, 8 pages.
European Patent Office, European EPC Article 94.3 mailed on Feb. 26, 2021, issued in connection with European Application No. 18789515.6, 8 pages.
European Patent Office, European EPC Article 94.3 mailed on Jun. 27, 2023, issued in connection with European Application No. 21195031.6, 4 pages.
European Patent Office, European EPC Article 94.3 mailed on Nov. 27, 2023, issued in connection with European Application No. 19780508.8, 7 pages.
European Patent Office, European EPC Article 94.3 mailed on Feb. 28, 2024, issued in connection with European Application No. 18306501, 7 pages.
European Patent Office, European EPC Article 94.3 mailed on Nov. 28, 2022, issued in connection with European Application No. 18789515.6, 7 pages.
European Patent Office, European EPC Article 94.3 mailed on Nov. 28, 2023, issued in connection with European Application No. 19731415.6, 9 pages.
European Patent Office, European EPC Article 94.3 mailed on Apr. 29, 2024, issued in connection with European Application No. 21195031.6, 4 pages.
European Patent Office, European EPC Article 94.3 mailed on Mar. 29, 2023, issued in connection with European Application No. 22182193.7, 4 pages.
European Patent Office, European EPC Article 94.3 mailed on Mar. 3, 2022, issued in connection with European Application No. 19740292.8, 10 pages.
European Patent Office, European EPC Article 94.3 mailed on Jun. 30, 2022, issued in connection with European Application No. 19765953.5, 4 pages.
European Patent Office, European EPC Article 94.3 mailed on Aug. 31, 2023, issued in connection with European Application No. 19773326.4, 5 pages.
European Patent Office, European EPC Article 94.3 mailed on Jul. 31, 2023, issued in connection with European Application No. 21164130.3, 5 pages.
European Patent Office, European EPC Article 94.3 mailed on Jun. 4, 2024, issued in connection with European Application No. 21180778.9, 5 pages.
European Patent Office, European EPC Article 94.3 mailed on Apr. 6, 2023, issued in connection with European Application No. 21193616.6, 7 pages.
European Patent Office, European EPC Article 94.3 mailed on Sep. 6, 2023, issued in connection with European Application No. 19197116.7, 4 pages.
European Patent Office, European EPC Article 94.3 mailed on Sep. 7, 2023, issued in connection with European Application No. 20185599.6, 6 pages.
European Patent Office, European Extended Search Report mailed on Oct. 7, 2021, issued in connection with European Application No. 21193616.6, 9 pages.
European Patent Office, European Extended Search Report mailed on Oct. 7, 2022, issued in connection with European Application No. 22182193.7, 8 pages.
European Patent Office, European Extended Search Report mailed on Jan. 2, 2024, issued in connection with European Application No. 23188226.7, 10 pages.
European Patent Office, European Extended Search Report mailed on Apr. 22, 2022, issued in connection with European Application No. 21195031.6, 14 pages.
European Patent Office, European Extended Search Report mailed on Jun. 23, 2022, issued in connection with European Application No. 22153180.9, 6 pages.
European Patent Office, European Extended Search Report mailed on Nov. 25, 2020, issued in connection with European Application No. 20185599.6, 9 pages.
European Patent Office, European Extended Search Report mailed on Feb. 3, 2020, issued in connection with European Application No. 19197116.7, 9 pages.
European Patent Office, European Extended Search Report mailed on Jan. 3, 2019, issued in connection with European Application No. 177570702, 8 pages.
European Patent Office, European Extended Search Report mailed on Jan. 3, 2019, issued in connection with European Application No. 17757075.1, 9 pages.
European Patent Office, European Extended Search Report mailed on Jun. 30, 2022, issued in connection with European Application No. 21212763.3, 9 pages.
European Patent Office, European Extended Search Report mailed on Oct. 30, 2017, issued in connection with EP Application No. 17174435.2, 11 pages.
European Patent Office, European Extended Search Report mailed on Aug. 6, 2020, issued in connection with European Application No. 20166332.5, 10 pages.
European Patent Office, European Extended Search Report mailed on Jul. 8, 2022, issued in connection with European Application No. 22153523.0, 9 pages.
European Patent Office, European Office Action mailed on Jul. 1, 2020, issued in connection with European Application No. 17757075.1, 7 pages.
European Patent Office, European Office Action mailed on Jan. 14, 2020, issued in connection with European Application No. 17757070.2, 7 pages.
European Patent Office, European Office Action mailed on Jan. 21, 2021, issued in connection with European Application No. 17792272.1, 7 pages.
European Patent Office, European Office Action mailed on Jan. 22, 2019, issued in connection with European Application No. 17174435.2, 9 pages.
European Patent Office, European Office Action mailed on Sep. 23, 2020, issued in connection with European Application No. 18788976.1, 7 pages.
European Patent Office, European Office Action mailed on Oct. 26, 2020, issued in connection with European Application No. 18760101.8, 4 pages.

(56) References Cited

OTHER PUBLICATIONS

European Patent Office, European Office Action mailed on Aug. 30, 2019, issued in connection with European Application No. 17781608.9, 6 pages.
European Patent Office, European Office Action mailed on Sep. 9, 2020, issued in connection with European Application No. 18792656.3, 10 pages.
European Patent Office, European Search Report mailed on Mar. 1, 2022, issued in connection with European Application No. 21180778.9, 9 pages.
European Patent Office, European Search Report mailed on Feb. 2, 2024, issued in connection with European Application No. 23200723.7, 5 pages.
European Patent Office, European Search Report mailed on Oct. 4, 2022, issued in connection with European Application No. 22180226.7, 6 pages.
European Patent Office, European Search Report mailed on Sep. 21, 2023, issued in connection with European Application No. 23172783.5, 8 pages.
European Patent Office, Examination Report mailed on Jul. 15, 2021, issued in connection with European Patent Application No. 19729968.8, 7 pages.
European Patent Office, Extended Search Report mailed on Aug. 13, 2021, issued in connection with European Patent Application No. 21164130.3, 11 pages.
European Patent Office, Extended Search Report mailed on May 16, 2018, issued in connection with European Patent Application No. 17200837.7, 11 pages.
European Patent Office, Extended Search Report mailed on Jul. 25, 2019, issued in connection with European Patent Application No. 18306501.0, 14 pages.
European Patent Office, Extended Search Report mailed on May 29, 2020, issued in connection with European Patent Application No. 19209389.6, 8 pages.
Non-Final Office Action mailed on Jan. 19, 2024, issued in connection with U.S. Appl. No. 18/331,580, filed Jun. 8, 2023, 11 pages.
Non-Final Office Action mailed on Sep. 19, 2022, issued in connection with U.S. Appl. No. 17/385,542, filed Jul. 26, 2021, 9 pages.
Non-Final Office Action mailed on Sep. 2, 2020, issued in connection with U.S. Appl. No. 16/290,599, filed Mar. 1, 2019, 17 pages.
Non-Final Office Action mailed on Sep. 2, 2021, issued in connection with U.S. Appl. No. 16/947,895, filed Aug. 24, 2020, 16 pages.
Non-Final Office Action mailed on Apr. 20, 2023, issued in connection with U.S. Appl. No. 18/061,570, filed Dec. 5, 2022, 12 pages.
Non-Final Office Action mailed on Feb. 20, 2018, issued in connection with U.S. Appl. No. 15/211,748, filed Jul. 15, 2016, 31 pages.
Non-Final Office Action mailed on Jun. 20, 2019, issued in connection with U.S. Appl. No. 15/946,585, filed Apr. 5, 2018, 10 pages.
Non-Final Office Action mailed on Jun. 20, 2024, issued in connection with U.S. Appl. No. 18/007,415, filed Jan. 30, 2023, 12 pages.
Non-Final Office Action mailed on Jun. 20, 2024, issued in connection with U.S. Appl. No. 18/520,336, filed Nov. 27, 2023, 20 pages.
Non-Final Office Action mailed on May 20, 2024, issued in connection with U.S. Appl. No. 18/600,044, filed Mar. 8, 2024, 24 pages.
Non-Final Office Action mailed on Oct. 20, 2022, issued in connection with U.S. Appl. No. 17/532,674, filed Nov. 22, 2021, 52 pages.
Non-Final Office Action mailed on Apr. 21, 2021, issued in connection with U.S. Appl. No. 16/109,375, filed Aug. 22, 2018, 9 pages.
Non-Final Office Action mailed on Aug. 21, 2019, issued in connection with U.S. Appl. No. 16/192,126, filed Nov. 15, 2018, 8 pages.
Non-Final Office Action mailed on Feb. 21, 2019, issued in connection with U.S. Appl. No. 16/214,666, filed Dec. 10, 2018, 12 pages.
Non-Final Office Action mailed on Jan. 21, 2020, issued in connection with U.S. Appl. No. 16/214,711, filed Dec. 10, 2018, 9 pages.
Non-Final Office Action mailed on Jan. 21, 2020, issued in connection with U.S. Appl. No. 16/598,125, filed Oct. 10, 2019, 25 pages.
Non-Final Office Action mailed on Nov. 21, 2023, issued in connection with U.S. Appl. No. 18/088,976, filed Dec. 27, 2022, 9 pages.
Non-Final Office Action mailed on Oct. 21, 2019, issued in connection with U.S. Appl. No. 15/973,413, filed May 7, 2018, 10 pages.
Non-Final Office Action mailed on Dec. 22, 2022, issued in connection with U.S. Appl. No. 16/168,389, filed Oct. 23, 2018, 39 pages.
Non-Final Office Action mailed on Jul. 22, 2020, issued in connection with U.S. Appl. No. 16/145,275, filed Sep. 28, 2018, 11 pages.
Non-Final Office Action mailed on May 22, 2018, issued in connection with U.S. Appl. No. 15/946,599, filed Apr. 5, 2018, 19 pages.
Non-Final Office Action mailed on Sep. 22, 2020, issued in connection with U.S. Appl. No. 16/539,843, filed Aug. 13, 2019, 7 pages.
Non-Final Office Action mailed on Jun. 23, 2021, issued in connection with U.S. Appl. No. 16/439,032, filed Jun. 12, 2019, 13 pages.
Non-Final Office Action mailed on Jun. 23, 2023, issued in connection with U.S. Appl. No. 18/048,945, filed Oct. 24, 2022, 10 pages.
Non-Final Office Action mailed on Mar. 23, 2022, issued in connection with U.S. Appl. No. 16/907,953, filed Jun. 22, 2020, 7 pages.
Non-Final Office Action mailed on May 23, 2019, issued in connection with U.S. Appl. No. 16/154,071, filed Oct. 8, 2018, 36 pages.
Non-Final Office Action mailed on Nov. 23, 2020, issued in connection with U.S. Appl. No. 16/524,306, filed Jul. 29, 2019, 14 pages.
Non-Final Office Action mailed on Oct. 23, 2023, issued in connection with U.S. Appl. No. 17/932,715, filed Sep. 16, 2022, 14 pages.
Non-Final Office Action mailed on Sep. 23, 2020, issued in connection with U.S. Appl. No. 16/177,185, filed Oct. 31, 2018, 17 pages.
Non-Final Office Action mailed on Sep. 23, 2022, issued in connection with U.S. Appl. No. 16/153,530, filed Oct. 5, 2018, 25 pages.
Non-Final Office Action mailed on Apr. 24, 2023, issued in connection with U.S. Appl. No. 17/532,744, filed Nov. 22, 2021, 18 pages.
Non-Final Office Action mailed on Apr. 24, 2024, issued in connection with U.S. Appl. No. 18/461,430, filed Sep. 5, 2023, 22 pages.
Non-Final Office Action mailed on Aug. 24, 2017, issued in connection with U.S. Appl. No. 15/297,627, filed Oct. 19, 2016, 13 pages.
Non-Final Office Action mailed on Jul. 24, 2019, issued in connection with U.S. Appl. No. 16/439,009, filed Jun. 12, 2019, 26 pages.
Non-Final Office Action mailed on May 24, 2022, issued in connection with U.S. Appl. No. 17/101,949, filed Nov. 23, 2020, 10 pages.
Non-Final Office Action mailed on Apr. 25, 2023, issued in connection with U.S. Appl. No. 17/536,572, filed Nov. 29, 2021, 8 pages.
Non-Final Office Action mailed on Apr. 25, 2023, issued in connection with U.S. Appl. No. 17/656,794, filed Mar. 28, 2022, 22 pages.
Non-Final Office Action mailed on Jul. 25, 2017, issued in connection with U.S. Appl. No. 15/273,679, filed Jul. 22, 2016, 11 pages.

(56) References Cited

OTHER PUBLICATIONS

Non-Final Office Action mailed on May 25, 2023, issued in connection with U.S. Appl. No. 18/157,937, filed Jan. 23, 2023, 9 pages.
Non-Final Office Action mailed on Oct. 25, 2022, issued in connection with U.S. Appl. No. 17/549,034, filed Dec. 13, 2021, 20 pages.
Non-Final Office Action mailed on Apr. 26, 2024, issued in connection with U.S. Appl. No. 18/310,025, filed May 1, 2023, 9 pages.
Non-Final Office Action mailed on Dec. 26, 2018, issued in connection with U.S. Appl. No. 16/154,469, filed Oct. 8, 2018, 7 pages.
Non-Final Office Action mailed on Jan. 26, 2017, issued in connection with U.S. Appl. No. 15/098,867, filed Apr. 14, 2016, 16 pages.
Non-Final Office Action mailed on Jan. 26, 2024, issued in connection with U.S. Appl. No. 17/450,925, filed Oct. 14, 2021, 9 pages.
Non-Final Office Action mailed on May 26, 2022, issued in connection with U.S. Appl. No. 16/989,805, filed Aug. 10, 2020, 14 pages.
Non-Final Office Action mailed on Oct. 26, 2017, issued in connection with U.S. Appl. No. 15/438,744, filed Feb. 21, 2017, 12 pages.
Non-Final Office Action mailed on Oct. 26, 2021, issued in connection with U.S. Appl. No. 16/736,725, filed Jan. 7, 2020, 12 pages.
Non-Final Office Action mailed on Feb. 27, 2023, issued in connection with U.S. Appl. No. 17/493,430, filed Oct. 4, 2021, 17 pages.
Non-Final Office Action mailed on Jun. 27, 2018, issued in connection with U.S. Appl. No. 15/438,749, filed Feb. 21, 2017, 16 pages.
Non-Final Office Action mailed on Jun. 27, 2019, issued in connection with U.S. Appl. No. 16/437,437, filed Jun. 11, 2019, 8 pages.
Notice of Allowance mailed on Feb. 17, 2021, issued in connection with U.S. Appl. No. 16/715,984, filed Dec. 16, 2019, 8 pages.
Notice of Allowance mailed on Jul. 17, 2019, issued in connection with U.S. Appl. No. 15/718,911, filed Sep. 28, 2017, 5 pages.
Notice of Allowance mailed on Jun. 17, 2020, issued in connection with U.S. Appl. No. 16/141,875, filed Sep. 25, 2018, 6 pages.
Notice of Allowance mailed on Nov. 17, 2022, issued in connection with U.S. Appl. No. 17/486,222, filed Sep. 27, 2021, 10 pages.
Notice of Allowance mailed on Sep. 17, 2018, issued in connection with U.S. Appl. No. 15/211,689, filed Jul. 15, 2016, 6 pages.
Notice of Allowance mailed on Apr. 18, 2019, issued in connection with U.S. Appl. No. 16/173,797, filed Oct. 29, 2018, 9 pages.
Notice of Allowance mailed on Dec. 18, 2019, issued in connection with U.S. Appl. No. 16/434,426, filed Jun. 7, 2019, 13 pages.
Notice of Allowance mailed on Feb. 18, 2020, issued in connection with U.S. Appl. No. 16/022,662, filed Jun. 28, 2018, 8 pages.
Notice of Allowance mailed on Jul. 18, 2019, issued in connection with U.S. Appl. No. 15/438,749, filed Feb. 21, 2017, 9 pages.
Notice of Allowance mailed on Jul. 18, 2019, issued in connection with U.S. Appl. No. 15/721,141, filed Sep. 29, 2017, 8 pages.
Notice of Allowance mailed on Jul. 18, 2022, issued in connection with U.S. Appl. No. 17/222,151, filed Apr. 5, 2021, 5 pages.
Notice of Allowance mailed on Mar. 18, 2021, issued in connection with U.S. Appl. No. 16/177,185, filed Oct. 31, 2018, 8 pages.
Notice of Allowance mailed on Aug. 19, 2020, issued in connection with U.S. Appl. No. 16/271,560, filed Feb. 8, 2019, 9 pages.
Notice of Allowance mailed on Dec. 19, 2018, issued in connection with U.S. Appl. No. 15/818,051, filed Nov. 20, 2017, 9 pages.
Notice of Allowance mailed on Jul. 19, 2018, issued in connection with U.S. Appl. No. 15/681,937, filed Aug. 21, 2017, 7 pages.
Notice of Allowance mailed on Mar. 19, 2021, issued in connection with U.S. Appl. No. 17/157,686, filed Jan. 25, 2021, 11 pages.
Notice of Allowance mailed on Aug. 2, 2019, issued in connection with U.S. Appl. No. 16/102,650, filed Aug. 13, 2018, 5 pages.
Notice of Allowance mailed on Dec. 2, 2020, issued in connection with U.S. Appl. No. 15/989,715, filed May 25, 2018, 11 pages.
Notice of Allowance mailed on Dec. 2, 2021, issued in connection with U.S. Appl. No. 16/841,116, filed Apr. 6, 2020, 5 pages.
Notice of Allowance mailed on Oct. 2, 2023, issued in connection with U.S. Appl. No. 17/810,533, filed Jul. 1, 2022, 8 pages.
Notice of Allowance mailed on Sep. 2, 2020, issued in connection with U.S. Appl. No. 16/214,711, filed Dec. 10, 2018, 9 pages.
Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Jul. 20, 2020, issued in connection with U.S. Appl. No. 15/984,073, filed May 18, 2018, 12 pages.
Notice of Allowance mailed on Jun. 20, 2022, issued in connection with U.S. Appl. No. 16/947,895, filed Aug. 24, 2020, 7 pages.
Notice of Allowance mailed on Mar. 20, 2018, issued in connection with U.S. Appl. No. 15/784,952, filed Oct. 16, 2017, 7 pages.
Notice of Allowance mailed on Mar. 20, 2023, issued in connection with U.S. Appl. No. 17/562,412, filed Dec. 27, 2021, 9 pages.
Notice of Allowance mailed on Oct. 20, 2021, issued in connection with U.S. Appl. No. 16/439,032, filed Jun. 12, 2019, 8 pages.
Notice of Allowance mailed on Sep. 20, 2018, issued in connection with U.S. Appl. No. 15/946,599, filed Apr. 5, 2018, 7 pages.
Notice of Allowance mailed on Apr. 21, 2021, issued in connection with U.S. Appl. No. 16/145,275, filed Sep. 28, 2018, 8 pages.
Notice of Allowance mailed on Aug. 21, 2023, issued in connection with U.S. Appl. No. 17/548,921, filed Dec. 13, 2021, 10 pages.
Notice of Allowance mailed on Dec. 21, 2021, issued in connection with U.S. Appl. No. 16/271,550, filed Feb. 8, 2019, 11 pages.
Notice of Allowance mailed on Feb. 21, 2020, issued in connection with U.S. Appl. No. 16/416,752, filed May 20, 2019, 6 pages.
Notice of Allowance mailed on Jan. 21, 2020, issued in connection with U.S. Appl. No. 16/672,764, filed Nov. 4, 2019, 10 pages.
Notice of Allowance mailed on Jan. 21, 2021, issued in connection with U.S. Appl. No. 16/600,644, filed Oct. 14, 2019, 7 pages.
Notice of Allowance mailed on Jul. 21, 2023, issued in connection with U.S. Appl. No. 17/986,241, filed Nov. 14, 2022, 12 pages.
Notice of Allowance mailed on Mar. 21, 2023, issued in connection with U.S. Appl. No. 17/353,254, filed Jun. 21, 2021, 8 pages.
Notice of Allowance mailed on Nov. 21, 2022, issued in connection with U.S. Appl. No. 17/454,676, filed Nov. 12, 2021, 8 pages.
Notice of Allowance mailed on Oct. 21, 2019, issued in connection with U.S. Appl. No. 15/946,585, filed Apr. 5, 2018, 5 pages.
Notice of Allowance mailed on Sep. 21, 2022, issued in connection with U.S. Appl. No. 17/128,949, filed Dec. 21, 2020, 8 pages.
Notice of Allowance mailed on Aug. 22, 2017, issued in connection with U.S. Appl. No. 15/273,679, filed Sep. 22, 2016, 5 pages.
Notice of Allowance mailed on Jan. 22, 2018, issued in connection with U.S. Appl. No. 15/178,180, filed Jun. 9, 2016, 9 pages.
Notice of Allowance mailed on Jul. 22, 2020, issued in connection with U.S. Appl. No. 16/131,409, filed Sep. 14, 2018, 13 pages.
Notice of Allowance mailed on Jul. 22, 2020, issued in connection with U.S. Appl. No. 16/790,621, filed Feb. 13, 2020, 10 pages.
Notice of Allowance mailed on Nov. 22, 2021, issued in connection with U.S. Appl. No. 16/834,483, filed Mar. 30, 2020, 10 pages.
Notice of Allowance mailed on Sep. 22, 2022, issued in connection with U.S. Appl. No. 17/163,506, filed Jan. 31, 2021, 13 pages.
Notice of Allowance mailed on Sep. 22, 2022, issued in connection with U.S. Appl. No. 17/248,427, filed Jan. 25, 2021, 9 pages.
Notice of Allowance mailed on Aug. 23, 2021, issued in connection with U.S. Appl. No. 16/109,375, filed Aug. 22, 2018, 10 pages.
Notice of Allowance mailed on Feb. 23, 2023, issued in connection with U.S. Appl. No. 17/532,674, filed Nov. 22, 2021, 10 pages.
Notice of Allowance mailed on Jun. 23, 2021, issued in connection with U.S. Appl. No. 16/814,844, filed Mar. 10, 2020, 8 pages.
Advisory Action mailed on Nov. 7, 2022, issued in connection with U.S. Appl. No. 16/168,389, filed Oct. 23, 2018, 4 pages.
Advisory Action mailed on Jun. 10, 2020, issued in connection with U.S. Appl. No. 15/936,177, filed Mar. 26, 2018, 4 pages.
Advisory Action mailed on Aug. 13, 2021, issued in connection with U.S. Appl. No. 16/271,550, filed Feb. 8, 2019, 4 pages.

(56) References Cited

OTHER PUBLICATIONS

Advisory Action mailed on Dec. 13, 2023, issued in connection with U.S. Appl. No. 18/048,034, filed Oct. 20, 2022, 4 pages.
Advisory Action mailed on Apr. 23, 2021, issued in connection with U.S. Appl. No. 16/219,702, filed Dec. 13, 2018, 3 pages.
Advisory Action mailed on Apr. 24, 2020, issued in connection with U.S. Appl. No. 15/948,541, filed Apr. 9, 2018, 4 pages.
Advisory Action mailed on Feb. 26, 2024, issued in connection with U.S. Appl. No. 17/532,744, filed Nov. 22, 2021, 4 pages.
Advisory Action mailed on Feb. 28, 2022, issued in connection with U.S. Appl. No. 16/813,643, filed Mar. 9, 2020, 3 pages.
Advisory Action mailed on Jun. 28, 2018, issued in connection with U.S. Appl. No. 15/438,744, filed Feb. 21, 2017, 3 pages.
Advisory Action mailed on Dec. 31, 2018, issued in connection with U.S. Appl. No. 15/804,776, filed Nov. 6, 2017, 4 pages.
Advisory Action mailed on Sep. 8, 2021, issued in connection with U.S. Appl. No. 16/168,389, filed Oct. 23, 2018, 4 pages.
Advisory Action mailed on Jun. 9, 2020, issued in connection with U.S. Appl. No. 16/145,275, filed Sep. 28, 2018, 3 pages.
Andra et al. Contextual Keyword Spotting in Lecture Video With Deep Convolutional Neural Network. 2017 International Conference on Advanced Computer Science and Information Systems, IEEE, Oct. 28, 2017, 6 pages.
Anonymous,. S Voice or Google Now—The Lowdown. Apr. 28, 2015, 9 pages. [online], [retrieved on Nov. 29, 2017]. Retrieved from the Internet (URL: http://web.archive.org/web/20160807040123/http://lowdown.carphonewarehouse.com/news/s-voice-or-google-now/29958/).
Anonymous: "What are the function of 4 Microphones on iPhone 6S/6S+?", ETrade Supply, Dec. 24, 2015, XP055646381, Retrieved from the Internet: URL:https://www.etradesupply.com/blog/4-microphones-iphone-6s6s-for/ [retrieved on Nov. 26, 2019].
Audhkhasi Kartik et al. End-to-end ASR-free keyword search from speech. 2017 IEEE International Conference on Acoustics, Speech and Signal Processing, Mar. 5, 2017, 7 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Patent Office, Australian Examination Report Action mailed on Nov. 10, 2022, issued in connection with Australian Application No. 2018312989, 2 pages.
Australian Patent Office, Australian Examination Report Action mailed on Jul. 11, 2023, issued in connection with Australian Application No. 2022246446, 2 pages.
Australian Patent Office, Australian Examination Report Action mailed on Apr. 14, 2020, issued in connection with Australian Application No. 2019202257, 3 pages.
Australian Patent Office, Australian Examination Report Action mailed on Jun. 14, 2023, issued in connection with Australian Application No. 2019299865, 2 pages.
Australian Patent Office, Australian Examination Report Action mailed on May 19, 2022, issued in connection with Australian Application No. 2021212112, 2 pages.
Australian Patent Office, Australian Examination Report Action mailed on Sep. 25, 2023, issued in connection with Australian Application No. 2018338812, 3 pages.
Australian Patent Office, Australian Examination Report Action mailed on Sep. 28, 2022, issued in connection with Australian Application No. 2018338812, 3 pages.
Australian Patent Office, Australian Examination Report Action mailed on Oct. 3, 2019, issued in connection with Australian Application No. 2018230932, 3 pages.
Australian Patent Office, Australian Examination Report Action mailed on Oct. 31, 2023, issued in connection with Australian Application No. 2023203687, 2 pages.
Australian Patent Office, Australian Examination Report Action mailed on Mar. 4, 2022, issued in connection with Australian Application No. 2021202786, 2 pages.
Australian Patent Office, Australian Examination Report Action mailed on Apr. 7, 2021, issued in connection with Australian Application No. 2019333058, 2 pages.
Australian Patent Office, Australian Examination Report Action mailed on Aug. 7, 2020, issued in connection with Australian Application No. 2019236722, 4 pages.
Australian Patent Office, Examination Report mailed on Jun. 28, 2021, issued in connection with Australian Patent Application No. 2019395022, 2 pages.
Australian Patent Office, Examination Report mailed on Oct. 30, 2018, issued in connection with Australian Application No. 2017222436, 3 pages.
"Automatic Parameter Tying in Neural Networks" ICLR 2018, 14 pages.
Bertrand et al. "Adaptive Distributed Noise Reduction for Speech Enhancement in Wireless Acoustic Sensor Networks" Jan. 2010, 4 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Examination Report mailed on Dec. 1, 2021, issued in connection with Canadian Application No. 3096442, 4 pages.
Canadian Patent Office, Canadian Examination Report mailed on Oct. 12, 2023, issued in connection with Canadian Application No. 3084279, 4 pages.
Canadian Patent Office, Canadian Examination Report mailed on Sep. 14, 2022, issued in connection with Canadian Application No. 3067776, 4 pages.
Canadian Patent Office, Canadian Examination Report mailed on Jun. 18, 2024, issued in connection with Canadian Application No. 3084279, 4 pages.
Canadian Patent Office, Canadian Examination Report mailed on Dec. 19, 2023, issued in connection with Canadian Application No. 3067776, 3 pages.
Canadian Patent Office, Canadian Examination Report mailed on Oct. 19, 2022, issued in connection with Canadian Application No. 3123601, 5 pages.
Canadian Patent Office, Canadian Examination Report mailed on Nov. 2, 2021, issued in connection with Canadian Application No. 3067776, 4 pages.
Canadian Patent Office, Canadian Examination Report mailed on Oct. 26, 2021, issued in connection with Canadian Application No. 3072492, 3 pages.
Canadian Patent Office, Canadian Examination Report mailed on Apr. 29, 2024, issued in connection with Canadian Application No. 3164558, 4 pages.
Canadian Patent Office, Canadian Examination Report mailed on Mar. 29, 2022, issued in connection with Canadian Application No. 3111322, 3 pages.
Canadian Patent Office, Canadian Examination Report mailed on Jan. 3, 2024, issued in connection with Canadian Application No. 3123601, 3 pages.
Canadian Patent Office, Canadian Examination Report mailed on Jun. 7, 2022, issued in connection with Canadian Application No. 3105494, 5 pages.
Canadian Patent Office, Canadian Examination Report mailed on May 8, 2024, issued in connection with Canadian Application No. 3146914, 5 pages.
Canadian Patent Office, Canadian Examination Report mailed on Mar. 9, 2021, issued in connection with Canadian Application No. 3067776, 5 pages.
Canadian Patent Office, Canadian Office Action mailed on Nov. 14, 2018, issued in connection with Canadian Application No. 3015491, 3 pages.
Chinese Patent Office, Chinese Office Action and Translation mailed on Jul. 2, 2021, issued in connection with Chinese Application No. 201880077216.4, 22 pages.
Chinese Patent Office, Chinese Office Action and Translation mailed on Mar. 30, 2021, issued in connection with Chinese Application No. 202010302650.7, 15 pages.

(56) References Cited

OTHER PUBLICATIONS

Chinese Patent Office, First Office Action and Translation mailed on Jun. 1, 2021, issued in connection with Chinese Application No. 201980089721.5, 21 pages.
Chinese Patent Office, First Office Action and Translation mailed on Feb. 9, 2023, issued in connection with Chinese Application No. 201880076788.0, 13 pages.
Chinese Patent Office, First Office Action and Translation mailed on Oct. 9, 2022, issued in connection with Chinese Application No. 201780056695.7, 10 pages.
Chinese Patent Office, First Office Action and Translation mailed on Dec. 1, 2021, issued in connection with Chinese Application No. 201780077204.7, 11 pages.
Chinese Patent Office, First Office Action and Translation mailed on Nov. 10, 2022, issued in connection with Chinese Application No. 201980070006.7, 15 pages.
Chinese Patent Office, First Office Action and Translation mailed on Jan. 19, 2023, issued in connection with Chinese Application No. 201880064916.X, 10 pages.
Chinese Patent Office, First Office Action and Translation mailed on Sep. 19, 2022, issued in connection with Chinese Application No. 201980056604.9, 13 pages.
Chinese Patent Office, First Office Action and Translation mailed on Dec. 20, 2021, issued in connection with Chinese Application No. 202010302650.7, 10 pages.
Chinese Patent Office, First Office Action and Translation mailed on Mar. 20, 2019, issued in connection with Chinese Application No. 201780025028.2, 18 pages.
Chinese Patent Office, First Office Action and Translation mailed on Apr. 23, 2024, issued in connection with Chinese Application No. 202110542908.5, 10 pages.
Chinese Patent Office, First Office Action and Translation mailed on Nov. 25, 2022, issued in connection with Chinese Application No. 201780056321.5, 8 pages.
Chinese Patent Office, First Office Action and Translation mailed on Feb. 27, 2023, issued in connection with Chinese Application No. 201980003798.6, 12 pages.
Chinese Patent Office, First Office Action and Translation mailed on Mar. 27, 2019, issued in connection with Chinese Application No. 201780025029.7, 9 pages.
Chinese Patent Office, First Office Action and Translation mailed on May 27, 2021, issued in connection with Chinese Application No. 201880026360.5, 15 pages.
Chinese Patent Office, First Office Action and Translation mailed on Dec. 28, 2020, issued in connection with Chinese Application No. 201880072203.8, 11 pages.
Chinese Patent Office, First Office Action and Translation mailed on Dec. 30, 2022, issued in connection with Chinese Application No. 201880076775.3, 10 pages.
Chinese Patent Office, First Office Action and Translation mailed on Nov. 5, 2019, issued in connection with Chinese Application No. 201780072651.3, 19 pages.
Chinese Patent Office, First Office Action and Translation mailed on Sep. 6, 2023, issued in connection with Chinese Application No. 202010179593.8, 14 pages.
Chinese Patent Office, First Office Action mailed on Feb. 28, 2020, issued in connection with Chinese Application No. 201780061543.6, 29 pages.
Chinese Patent Office, Second Office Action and Translation mailed on Mar. 3, 2022, issued in connection with Chinese Application No. 201880077216.4, 11 pages.
Chinese Patent Office, Second Office Action and Translation mailed on Apr. 1, 2023, issued in connection with Chinese Application No. 201980056604.9, 11 pages.
Chinese Patent Office, Second Office Action and Translation mailed on May 11, 2020, issued in connection with Chinese Application No. 201780061543.6, 17 pages.
Chinese Patent Office, Second Office Action and Translation mailed on Jul. 18, 2019, issued in connection with Chinese Application No. 201780025029.7, 14 pages.
Chinese Patent Office, Second Office Action and Translation mailed on Sep. 23, 2019, issued in connection with Chinese Application No. 201780025028.2, 15 pages.
Chinese Patent Office, Second Office Action and Translation mailed on Mar. 31, 2020, issued in connection with Chinese Application No. 201780072651.3, 17 pages.
Chinese Patent Office, Second Office Action mailed on Dec. 21, 2022, issued in connection with Chinese Application No. 201980089721.5, 12 pages.
Chinese Patent Office, Second Office Action mailed on May 30, 2023, issued in connection with Chinese Application No. 201980070006.7, 9 pages.
Chinese Patent Office, Third Office Action and Translation mailed on Sep. 16, 2019, issued in connection with Chinese Application No. 201780025029.7, 14 pages.
Chinese Patent Office, Third Office Action and Translation mailed on Aug. 5, 2020, issued in connection with Chinese Application No. 201780072651.3, 10 pages.
Chinese Patent Office, Translation of Office Action mailed on Jul. 18, 2019, issued in connection with Chinese Application No. 201780025029.7, 8 pages.
Chung et al. Empirical Evaluation of Gated Recurrent Neural Network on Sequence Modeling. Dec. 11, 2014, 9 pages.
Cipriani,. The complete list of OK, Google commands—CNET. Jul. 1, 2016, 5 pages. [online], [retrieved on Jan. 15, 2020]. Retrieved from the Internet: (URL:https://web.archive.org/web/20160803230926/https://www.cnet.com/how-to/complete-list-of-ok-googl••-commands/).
Corrected Notice of Allowability mailed on Mar. 8, 2017, issued in connection with U.S. Appl. No. 15/229,855, filed Aug. 5, 2016, 6 pages.
Couke et al. Efficient Keyword Spotting using Dilated Convolutions and Gating, arXiv:1811.07684v2, Feb. 18, 2019, 5 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Decision to Refuse European Patent Application mailed on May 30, 2022, issued in connection with European Application No. 17200837.7, 4 pages.
European Patent Office, European EPC Article 94.3 mailed on Jun. 5, 2023, issued in connection with European Application No. 20710649.3, 8 pages.
European Patent Office, European EPC Article 94.3 mailed on Feb. 10, 2023, issued in connection with European Application No. 19729968.8, 7 pages.
European Patent Office, European EPC Article 94.3 mailed on Jan. 10, 2024, issued in connection with European Application No. 20757152.2, 6 pages.
European Patent Office, European EPC Article 94.3 mailed on Mar. 11, 2022, issued in connection with European Application No. 19731415.6, 7 pages.
European Patent Office, European EPC Article 94.3 mailed on Nov. 11, 2021, issued in connection with European Application No. 19784172.9, 5 pages.
European Patent Office, European EPC Article 94.3 mailed on Oct. 12, 2023, issued in connection with European Application No. 20736489.4, 8 pages.
European Patent Office, European EPC Article 94.3 mailed on Dec. 18, 2023, issued in connection with European Application No. 21703134.3, 7 pages.
European Patent Office, European EPC Article 94.3 mailed on May 2, 2022, issued in connection with European Application No. 20185599.6, 7 pages.
Japanese Patent Office, English Translation of Office Action mailed on Nov. 17, 2020, issued in connection with Japanese Application No. 2019-145039, 5 pages.
Japanese Patent Office, English Translation of Office Action mailed on Aug. 27, 2020, issued in connection with Japanese Application No. 2019-073349, 6 pages.
Japanese Patent Office, English Translation of Office Action mailed on Jul. 30, 2020, issued in connection with Japanese Application No. 2019-517281, 26 pages.

(56) References Cited

OTHER PUBLICATIONS

Japanese Patent Office, Non-Final Office Action and Translation mailed on Nov. 5, 2019, issued in connection with Japanese Patent Application No. 2019-517281, 6 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Sep. 13, 2022, issued in connection with Japanese Patent Application No. 2021-163622, 12 pages.
Japanese Patent Office, Notice of Reasons for Refusal and Translation mailed on Jun. 22, 2021, issued in connection with Japanese Patent Application No. 2020-517935, 4 pages.
Japanese Patent Office, Notice of Reasons for Refusal and Translation mailed on Nov. 28, 2021, issued in connection with Japanese Patent Application No. 2020-550102, 9 pages.
Japanese Patent Office, Notice of Reasons for Refusal and Translation mailed on Aug. 8, 2023, issued in connection with Japanese Patent Application No. 2022-101346, 6 pages.
Japanese Patent Office, Office Action and Translation mailed on Nov. 15, 2022, issued in connection with Japanese Patent Application No. 2021-146144, 9 pages.
Japanese Patent Office, Office Action and Translation mailed on Mar. 16, 2021, issued in connection with Japanese Patent Application No. 2020-506725, 7 pages.
Japanese Patent Office, Office Action and Translation mailed on Nov. 17, 2020, issued in connection with Japanese Patent Application No. 2019-145039, 7 pages.
Japanese Patent Office, Office Action and Translation mailed on Apr. 20, 2021, issued in connection with Japanese Patent Application No. 2020-513852, 9 pages.
Japanese Patent Office, Office Action and Translation mailed on Feb. 24, 2021, issued in connection with Japanese Patent Application No. 2019-517281, 4 pages.
Japanese Patent Office, Office Action and Translation mailed on Apr. 27, 2021, issued in connection with Japanese Patent Application No. 2020-518400, 10 pages.
Japanese Patent Office, Office Action and Translation mailed on Aug. 27, 2020, issued in connection with Japanese Patent Application No. 2019-073349, 6 pages.
Japanese Patent Office, Office Action and Translation mailed on Jul. 30, 2020, issued in connection with Japanese Patent Application No. 2019-517281, 6 pages.
Japanese Patent Office, Office Action and Translation mailed on Jul. 6, 2020, issued in connection with Japanese Patent Application No. 2019-073348, 10 pages.
Japanese Patent Office, Office Action and Translation mailed on Jul. 6, 2021, issued in connection with Japanese Patent Application No. 2019-073349, 6 pages.
Japanese Patent Office, Office Action and Translation mailed on Oct. 8, 2019, issued in connection with Japanese Patent Application No. 2019-521032, 5 pages.
Japanese Patent Office, Office Action mailed on Dec. 7, 2021, issued in connection with Japanese Patent Application No. 2020-513852, 6 pages.
Japanese Patent Office, Office Action mailed on Nov. 29, 2022, issued in connection with Japanese Patent Application No. 2021-181224, 6 pages.
Japanese Patent Office, Office Action Translation mailed on Nov. 5, 2019, issued in connection with Japanese Patent Application No. 2019-517281, 2 pages.
Japanese Patent Office, Office Action Translation mailed on Oct. 8, 2019, issued in connection with Japanese Patent Application No. 2019-521032, 8 pages.
Jo et al., "Synchronized One-to-many Media Streaming with Adaptive Playout Control," Proceedings of SPIE, 2002, pp. 71-82, vol. 4861.
Johnson, "Implementing Neural Networks into Modern Technology," IJCNN'99. International Joint Conference on Neural Networks . Proceedings [Cat. No. 99CH36339], Washington, DC, USA, 1999, pp. 1028-1032, vol. 2, doi: 10.1109/IJCNN.1999.831096. [retrieved on Jun. 22, 2020].
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Jose Alvarez and Mathieu Salzmann "Compression-aware Training of Deep Networks" 31st Conference on Neural Information Processing Systems, Nov. 13, 2017, 12pages.
Joseph Szurley et al, "Efficient computation of microphone utility in a wireless acoustic sensor network with multi-channel Wiener filter based noise reduction", 2012 IEEE International Conference on Acoustics, Speech and Signal Processing, Kyoto, Japan, Mar. 25-30, 2012, pp. 2657-2660, XP032227701, DOI: 10.1109/ICASSP .2012. 6288463 ISBN: 978-1-4673-0045-2.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Ketabdar et al. Detection of Out-of-Vocabulary Words in Posterior Based ASR. Proceedings of Interspeech 2007, Aug. 27, 2007, 4 pages.
Kim et al. Character-Aware Neural Language Models. Retrieved from the Internet: URL: https://arxiv.org/pdf/1508.06615v3.pdf, Oct. 16, 2015, 9 pages.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Oct. 13, 2022, issued in connection with Korean Application No. 10-2021-7030939, 4 pages.
Korean Patent Office, Korean Examination Report and Translation mailed on Apr. 19, 2022, issued in connection with Korean Application No. 10-2021-7008937, 14 pages.
Korean Patent Office, Korean Examination Report and Translation mailed on Jul. 19, 2023, issued in connection with Korean Application No. 10-2022-7024007, 9 pages.
Korean Patent Office, Korean Examination Report and Translation mailed on Nov. 25, 2021, issued in connection with Korean Application No. 10-2021-7008937, 14 pages.
Korean Patent Office, Korean Examination Report and Translation mailed on Apr. 26, 2021, issued in connection with Korean Application No. 10-2021-7008937, 15 pages.
Korean Patent Office, Korean Examination Report and Translation mailed on Jul. 26, 2022, issued in connection with Korean Application No. 10-2022-7016656, 17 pages.
Korean Patent Office, Korean Examination Report and Translation mailed on Dec. 27, 2021, issued in connection with Korean Application No. 10-2021-7008937, 22 pages.
Korean Patent Office, Korean Examination Report and Translation mailed on Mar. 31, 2023, issued in connection with Korean Application No. 10-2022-7016656, 7 pages.
Korean Patent Office, Korean Examination Report and Translation mailed on Oct. 31, 2021, issued in connection with Korean Application No. 10-2022-7024007, 10 pages.
Korean Patent Office, Korean Office Action and Translation mailed on Oct. 14, 2021, issued in connection with Korean Application No. 10-2020-7011843, 29 pages.
Korean Patent Office, Korean Office Action and Translation mailed on Aug. 16, 2019, issued in connection with Korean Application No. 10-2018-7027452, 14 pages.
Korean Patent Office, Korean Office Action and Translation mailed on Apr. 2, 2020, issued in connection with Korean Application No. 10-2020-7008486, 12 pages.
Korean Patent Office, Korean Office Action and Translation mailed on Mar. 25, 2020, issued in connection with Korean Application No. 10-2019-7012192, 14 pages.
Korean Patent Office, Korean Office Action and Translation mailed on Aug. 26, 2020, issued in connection with Korean Application No. 10-2019-7027640, 16 pages.

(56) References Cited

OTHER PUBLICATIONS

Korean Patent Office, Korean Office Action and Translation mailed on Mar. 30, 2020, issued in connection with Korean Application No. 10-2020-7004425, 5 pages.
Korean Patent Office, Korean Office Action and Translation mailed on Jan. 4, 2021, issued in connection with Korean Application No. 10-2020-7034425, 14 pages.
Korean Patent Office, Korean Office Action and Translation mailed on Sep. 9, 2019, issued in connection with Korean Application No. 10-2018-7027451, 21 pages.
Korean Patent Office, Korean Office Action mailed on May 8, 2019, issued in connection with Korean Application No. 10-2018-7027451, 7 pages.
Korean Patent Office, Korean Office Action mailed on May 8, 2019, issued in connection with Korean Application No. 10-2018-7027452, 5 pages.
Korean Patent Office, Korean Preliminary Rejection and Translation mailed on Dec. 26, 2023, issued in connection with Korean Application No. 10-2023-7031855, 4 pages.
Korean Patent Office, Korean Preliminary Rejection and Translation mailed on Dec. 5, 2023, issued in connection with Korean Application No. 10-2023-7032988, 11 pages.
Korean Patent Office, Office Action and Translation mailed on Feb. 27, 2023, issued in connection with Korean Application No. 10-2022-7021879, 5 pages.
Lei et al. Accurate and Compact Large Vocabulary Speech Recognition on Mobile Devices. Interspeech 2013, Aug. 25, 2013, 4 pages.
Lengerich et al. An End-to-End Architecture for Keyword Spotting and Voice Activity Detection, arXiv:1611.09405v1, Nov. 28, 2016, 5 pages.
Louderback, Jim, "Affordable Audio Receiver Furnishes Homes With MP3," TechTV Vault. Jun. 28, 2000 retrieved Jul. 10, 2014, 2 pages.
Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 4-6, 2012, 4pages.
Mathias Wolfel. Channel Selection by Class Separability Measures for Automatic Transcriptions on Distant Microphones, Interspeech 2007 10.21437/Interspeech.2007-255, 4 pages.
Matrix—The Ultimate Development Board Sep. 14, 2019 Matrix—The Ultimate Development Board Sep. 14, 2019 https-//web.archive.org/web/20190914035838/https-//www.matrix.one/ , 1 page.
Mesaros et al. Detection and Classification of Acoustic Scenes and Events: Outcome of the DCASE 2016 Challenge. IEEE/ACM Transactions on Audio, Speech, and Language Processing. Feb. 2018, 16 pages.
Molina et al., "Maximum Entropy-Based Reinforcement Learning Using a Confidence Measure in Speech Recognition for Telephone Speech," in IEEE Transactions on Audio, Speech, and Language Processing, vol. 18, No. 5, pp. 1041-1052, Jul. 2010, doi: 10.1109/TASL.2009.2032618. [Retrieved online] URLhttps://ieeexplore.ieee.org/document/5247099?partnum=5247099&searchProductType=IEEE%20Journals%20Transactions.
Morales-Cordovilla et al. "Room Localization for Distant Speech Recognition," Proceedings of Interspeech 2014, Sep. 14, 2014, 4 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Non-Final Office Action mailed Jul. 12, 2021, issued in connection with U.S. Appl. No. 17/008,104, filed Aug. 31, 2020, 6 pages.
Non-Final Office Action mailed Jun. 18, 2021, issued in connection with U.S. Appl. No. 17/236,559, filed Apr. 21, 2021, 9 pages.
Non-Final Office Action mailed Apr. 21, 2021, issued in connection with U.S. Appl. No. 16/109,375, filed Aug. 22, 2018, 9 pages.
Non-Final Office Action mailed Dec. 21, 2020, issued in connection with U.S. Appl. No. 16/153,530, filed Oct. 5, 2018, 22 pages.
Non-Final Office Action mailed Jul. 22, 2021, issued in connection with U.S. Appl. No. 16/179,779, filed Nov. 2, 2018, 19 pages.
Non-Final Office Action mailed Apr. 23, 2021, issued in connection with U.S. Appl. No. 16/660,197, filed Oct. 22, 2019, 9 pages.
Non-Final Office Action mailed Jun. 25, 2021, issued in connection with U.S. Appl. No. 16/213,570, filed Dec. 7, 2018, 11 pages.
Non-Final Office Action mailed Jul. 8, 2021, issued in connection with U.S. Appl. No. 16/813,643, filed Mar. 9, 2020, 12 pages.
Non-Final Office Action mailed Dec. 9, 2020, issued in connection with U.S. Appl. No. 16/271,550, filed Feb. 8, 2019, 35 pages.
Non-Final Office Action mailed Jul. 9, 2021, issued in connection with U.S. Appl. No. 16/806,747, filed Mar. 2, 2020, 18 pages.
Non-Final Office Action mailed on Jun. 1, 2017, issued in connection with U.S. Appl. No. 15/223,218, filed Jul. 29, 2016, 7 pages.
Non-Final Office Action mailed on Feb. 2, 2023, issued in connection with U.S. Appl. No. 17/305,698, filed Jul. 13, 2021, 16 pages.
Non-Final Office Action mailed on Nov. 2, 2017, issued in connection with U.S. Appl. No. 15/584,782, filed May 2, 2017, 11 pages.
Non-Final Office Action mailed on Nov. 3, 2017, issued in connection with U.S. Appl. No. 15/438,741, filed Feb. 21, 2017, 11 pages.
Non-Final Office Action mailed on Nov. 4, 2019, issued in connection with U.S. Appl. No. 16/022,662, filed Jun. 28, 2018, 16 pages.
Non-Final Office Action mailed on Dec. 5, 2022, issued in connection with U.S. Appl. No. 17/662,302, filed May 6, 2022, 12 pages.
Non-Final Office Action mailed on Oct. 5, 2022, issued in connection with U.S. Appl. No. 17/449,926, filed Oct. 4, 2021, 11 pages.
Non-Final Office Action mailed on Sep. 5, 2019, issued in connection with U.S. Appl. No. 16/416,752, filed May 20, 2019, 14 pages.
Non-Final Office Action mailed on Feb. 7, 2017, issued in connection with U.S. Appl. No. 15/131,244, filed Apr. 18, 2016, 12 pages.
Non-Final Office Action mailed on Feb. 8, 2017, issued in connection with U.S. Appl. No. 15/098,892, filed Apr. 14, 2016, 17 pages.
Non-Final Office Action mailed on Mar. 9, 2017, issued in connection with U.S. Appl. No. 15/098,760, filed Apr. 14, 2016, 13 pages.
Non-Final Office Action mailed on Oct. 9, 2019, issued in connection with U.S. Appl. No. 15/936,177, filed Mar. 26, 2018, 16 pages.
Non-Final Office Action mailed on Feb. 1, 2024, issued in connection with U.S. Appl. No. 18/313,013, filed May 5, 2023, 47 pages.
Non-Final Office Action mailed on Jul. 1, 2020, issued in connection with U.S. Appl. No. 16/138,111, filed Sep. 21, 2018, 14 pages.
Non-Final Office Action mailed on May 1, 2024, issued in connection with U.S. Appl. No. 17/650,441, filed Feb. 9, 2022, 12 pages.
Non-Final Office Action mailed on Aug. 10, 2023, issued in connection with U.S. Appl. No. 18/070,024, filed Nov. 28, 2022, 4 pages.
Non-Final Office Action mailed on Jan. 10, 2018, issued in connection with U.S. Appl. No. 15/098,718, filed Apr. 14, 2016, 15 pages.
Non-Final Office Action mailed on Jan. 10, 2018, issued in connection with U.S. Appl. No. 15/229,868, filed Aug. 5, 2016, 13 pages.
Non-Final Office Action mailed on Jan. 10, 2018, issued in connection with U.S. Appl. No. 15/438,725, filed Feb. 21, 2017, 15 pages.
Non-Final Office Action mailed on Sep. 10, 2018, issued in connection with U.S. Appl. No. 15/670,361, filed Aug. 7, 2017, 17 pages.
Non-Final Office Action mailed on Aug. 11, 2021, issued in connection with U.S. Appl. No. 16/841,116, filed Apr. 6, 2020, 9 pages.
Non-Final Office Action mailed on Feb. 11, 2021, issued in connection with U.S. Appl. No. 16/876,493, filed May 18, 2020, 16 pages.
Non-Final Office Action mailed on Feb. 11, 2022, issued in connection with U.S. Appl. No. 17/145,667, filed Jan. 11, 2021, 9 pages.
Notice of Allowance mailed on Jun. 4, 2021, issued in connection with U.S. Appl. No. 16/528,265, filed Jul. 31, 2019, 17 pages.
Notice of Allowance mailed on Mar. 4, 2020, issued in connection with U.S. Appl. No. 16/444,975, filed Jun. 18, 2019, 10 pages.

(56) References Cited

OTHER PUBLICATIONS

Notice of Allowance mailed on Apr. 5, 2023, issued in connection with U.S. Appl. No. 17/549,253, filed Dec. 13, 2021, 10 pages.
Notice of Allowance mailed on Feb. 5, 2020, issued in connection with U.S. Appl. No. 16/178,122, filed Nov. 1, 2018, 9 pages.
Notice of Allowance mailed on Oct. 5, 2018, issued in connection with U.S. Appl. No. 15/211,748, filed Jul. 15, 2018, 10 pages.
Notice of Allowance mailed on Feb. 6, 2019, issued in connection with U.S. Appl. No. 16/102,153, filed Aug. 13, 2018, 9 pages.
Notice of Allowance mailed on Feb. 6, 2020, issued in connection with U.S. Appl. No. 16/227,308, filed Dec. 20, 2018, 7 pages.
Notice of Allowance mailed on Mar. 6, 2023, issued in connection with U.S. Appl. No. 17/449,926, filed Oct. 4, 2021, 8 pages.
Notice of Allowance mailed on Apr. 7, 2020, issued in connection with U.S. Appl. No. 15/098,760, filed Apr. 14, 2016, 7 pages.
Notice of Allowance mailed on Apr. 7, 2020, issued in connection with U.S. Appl. No. 16/147,710, filed Sep. 29, 2018, 15 pages.
Notice of Allowance mailed on Jun. 7, 2019, issued in connection with U.S. Appl. No. 16/102,153, filed Aug. 13, 2018, 9 pages.
Notice of Allowance mailed on Jun. 7, 2021, issued in connection with U.S. Appl. No. 16/528,224, filed Jul. 31, 2019, 9 pages.
Notice of Allowance mailed on Jun. 7, 2024, issued in connection with U.S. Appl. No. 18/316,434, filed May 12, 2023, 9 pages.
Notice of Allowance mailed on Apr. 8, 2022, issued in connection with U.S. Appl. No. 16/813,643, filed Mar. 9, 2020, 7 pages.
Notice of Allowance mailed on Mar. 8, 2024, issued in connection with U.S. Appl. No. 17/135,173, filed Dec. 28, 2020, 9 pages.
Notice of Allowance mailed on Nov. 8, 2021, issued in connection with U.S. Appl. No. 17/008,104, filed Aug. 31, 2020, 9 pages.
Notice of Allowance mailed on Nov. 8, 2023, issued in connection with U.S. Appl. No. 18/066,093, filed Dec. 14, 2022, 11 pages.
Notice of Allowance mailed on Aug. 9, 2018, issued in connection with U.S. Appl. No. 15/229,868, filed Aug. 5, 2016, 11 pages.
Notice of Allowance mailed on Dec. 9, 2021, issued in connection with U.S. Appl. No. 16/845,946, filed Apr. 10, 2020, 10 pages.
Notice of Allowance mailed on Feb. 9, 2022, issued in connection with U.S. Appl. No. 17/247,736, filed Dec. 21, 2020, 8 pages.
Notice of Allowance mailed on Mar. 9, 2018, issued in connection with U.S. Appl. No. 15/584,782, filed May 2, 2017, 8 pages.
Oord et al. WaveNet: A Generative Model for Raw Audio. Arxiv. org, Cornell University Library, Sep. 12, 2016, 15 pages.
Optimizing Siri on HomePod in Far-Field Settings. Audio Software Engineering and Siri Speech Team, Machine Learning Journal vol. 1, Issue 12. https://machinelearning.apple.com/2018/12/03/optimizing-siri-on-homepod-in-far-field-settings.html. Dec. 2018, 18 pages.
Palm, Inc., "Handbook for the Palm VII Handheld," May 2000, 311 pages.
Parada et al. Contextual Information Improves OOV Detection in Speech. Proceedings of the 2010 Annual Conference of the North American Chapter of the Association for Computational Linguistics, Jun. 2, 2010, 9 pages.
Pre-Appeal Brief Decision mailed on Jan. 18, 2022, issued in connection with U.S. Appl. No. 16/806,747, filed Mar. 2, 2020, 2 pages.
Pre-Appeal Brief Decision mailed on Jun. 2, 2021, issued in connection with U.S. Appl. No. 16/213,570, filed Dec. 7, 2018, 2 pages.
Preinterview First Office Action mailed on Aug. 5, 2019, issued in connection with U.S. Appl. No. 16/434,426, filed Jun. 7, 2019, 4 pages.
Preinterview First Office Action mailed on Mar. 25, 2020, issued in connection with U.S. Appl. No. 16/109,375, filed Aug. 22, 2018, 6 pages.
Preinterview First Office Action mailed on Sep. 30, 2019, issued in connection with U.S. Appl. No. 15/989,715, filed May 25, 2018, 4 pages.
Preinterview First Office Action mailed on May 7, 2020, issued in connection with U.S. Appl. No. 16/213,570, filed Dec. 7, 2018, 5 pages.
Preinterview First Office Action mailed on Jan. 8, 2021, issued in connection with U.S. Appl. No. 16/798,967, filed Feb. 24, 2020, 4 pages.
Presentations at WinHEC 2000, May 2000, 138 pages.
Renato De Mori. Spoken Language Understanding: A Survey. Automatic Speech Recognition Understanding, 2007. IEEE, Dec. 1, 2007, 56 pages.
Restriction Requirement mailed on Aug. 14, 2019, issued in connection with U.S. Appl. No. 16/214,711, filed Dec. 10, 2018, 5 pages.
Restriction Requirement mailed on Aug. 9, 2018, issued in connection with U.S. Appl. No. 15/717,621, filed Sep. 27, 2017, 8 pages.
Rottondi et al., "An Overview on Networked Music Performance Technologies," IEEE Access, vol. 4, pp. 8823-8843, 2016, DOI: 10.1109/ACCESS.2016.2628440, 21 pages.
Rybakov et al. Streaming keyword spotting on mobile devices, arXiv:2005.06720v2, Jul. 29, 2020, 5 pages.
Shan et al. Attention-based End-to-End Models for Small-Footprint Keyword Spotting, arXiv:1803.10916v1, Mar. 29, 2018, 5 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE +REDUCTION+USING+GSVD-BASED+OPTIMAL+FILTERING&btnG=.
Snips: How to Snips—Assistant creation Installation, Jun. 26, 2017, 6 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Speidel, Hans. Chatbot Training: How to use training data to provide fully automated customer support. Retrieved from the Internet: URL: https://www.crowdguru.de/wp-content/uploads/Case-Study-Chatbox-training-How-to-use-training-data-to-provide-fully-automated-customer-support.pdf. Jun. 29, 2017, 4 pages.
Stemmer et al. Speech Recognition and Understanding on Hardware-Accelerated DSP. Proceedings of Interspeech 2017: Show & Tell Contribution, Aug. 20, 2017, 2 pages.
Steven J. Nowlan and Geoffrey E. Hinton "Simplifying Neural Networks by Soft Weight-Sharing" Neural Computation 4, 1992, 21 pages.
Tsiami et al. "Experiments in acoustic source localization using sparse arrays in adverse indoors environments", 2014 22nd European Signal Processing Conference, Sep. 1, 2014, 5 pages.
Tsung-Hsien Wen et al: "A Network-based End-to-End Trainable Task-oriented Dialogue System", CORR (ARXIV), vol. 1604. 04562v1, Apr. 15, 2016 (Apr. 15, 2016), pp. 1-11.
Tsung-Hsien Wen et al: "A Network-based End-to-End Trainable Task-oriented Dialogue System", CORR ARXIV, vol. 1604. 04562v1, Apr. 15, 2016, pp. 1-11, XP055396370, Stroudsburg, PA, USA.
Non-Final Office Action mailed on Jun. 27, 2019, issued in connection with U.S. Appl. No. 16/437,476, filed Jun. 11, 2019, 8 pages.
Non-Final Office Action mailed on Mar. 27, 2020, issued in connection with U.S. Appl. No. 16/790,621, filed Feb. 13, 2020, 8 pages.
Non-Final Office Action mailed on May 27, 2020, issued in connection with U.S. Appl. No. 16/715,713, filed Dec. 16, 2019, 14 pages.
Non-Final Office Action mailed on Oct. 27, 2020, issued in connection with U.S. Appl. No. 16/213,570, filed Dec. 7, 2018, 13 pages.

(56) References Cited

OTHER PUBLICATIONS

Non-Final Office Action mailed on Oct. 27, 2020, issued in connection with U.S. Appl. No. 16/715,984, filed Dec. 16, 2019, 14 pages.
Non-Final Office Action mailed on Oct. 27, 2020, issued in connection with U.S. Appl. No. 16/819,755, filed Mar. 16, 2020, 8 pages.
Non-Final Office Action mailed on Aug. 28, 2023, issued in connection with U.S. Appl. No. 17/722,661, filed Apr. 18, 2022, 16 pages.
Non-Final Office Action mailed on Feb. 28, 2023, issued in connection with U.S. Appl. No. 17/548,921, filed Dec. 13, 2021, 12 pages.
Non-Final Office Action mailed on Mar. 28, 2022, issued in connection with U.S. Appl. No. 17/222,151, filed Apr. 5, 2021, 5 pages.
Non-Final Office Action mailed on Mar. 28, 2024, issued in connection with U.S. Appl. No. 18/192,452, filed Mar. 29, 2023, 7 pages.
Non-Final Office Action mailed on Oct. 28, 2019, issued in connection with U.S. Appl. No. 16/145,275, filed Sep. 28, 2018, 11 pages.
Non-Final Office Action mailed on Oct. 28, 2021, issued in connection with U.S. Appl. No. 16/378,516, filed Apr. 8, 2019, 10 pages.
Non-Final Office Action mailed on Oct. 28, 2021, issued in connection with U.S. Appl. No. 17/247,736, filed Dec. 21, 2020, 12 pages.
Non-Final Office Action mailed on Feb. 29, 2024, issued in connection with U.S. Appl. No. 18/449,244, filed Aug. 14, 2023, 15 pages.
Non-Final Office Action mailed on Mar. 29, 2019, issued in connection with U.S. Appl. No. 16/102,650, filed Aug. 13, 2018, 11 pages.
Non-Final Office Action mailed on Mar. 29, 2021, issued in connection with U.S. Appl. No. 16/528,265, filed Jul. 31, 2019, 18 pages.
Non-Final Office Action mailed on Nov. 29, 2021, issued in connection with U.S. Appl. No. 16/989,350, filed Aug. 10, 2020, 15 pages.
Non-Final Office Action mailed on Sep. 29, 2020, issued in connection with U.S. Appl. No. 16/402,617, filed May 3, 2019, 12 pages.
Non-Final Office Action mailed on Dec. 3, 2020, issued in connection with U.S. Appl. No. 16/145,275, filed Sep. 28, 2018, 11 pages.
Non-Final Office Action mailed on Jul. 3, 2019, issued in connection with U.S. Appl. No. 15/948,541, filed Apr. 9, 2018, 7 pages.
Non-Final Office Action mailed on Jul. 3, 2023, issued in connection with U.S. Appl. No. 17/135,173, filed Dec. 28, 2020, 22 pages.
Non-Final Office Action mailed on May 3, 2019, issued in connection with U.S. Appl. No. 16/178,122, filed Nov. 1, 2018, 14 pages.
Non-Final Office Action mailed on Oct. 3, 2018, issued in connection with U.S. Appl. No. 16/102,153, filed Aug. 13, 2018, 20 pages.
Non-Final Office Action mailed on Apr. 30, 2019, issued in connection with U.S. Appl. No. 15/718,521, filed Sep. 28, 2017, 39 pages.
Non-Final Office Action mailed on Jun. 30, 2017, issued in connection with U.S. Appl. No. 15/277,810, filed Sep. 27, 2016, 13 pages.
Non-Final Office Action mailed on May 30, 2024, issued in connection with U.S. Appl. No. 18/503,971, filed Nov. 7, 2023, 8 pages.
Non-Final Office Action mailed on Sep. 30, 2022, issued in connection with U.S. Appl. No. 17/353,254, filed Jun. 21, 2021, 22 pages.
Non-Final Office Action mailed on Apr. 4, 2019, issued in connection with U.S. Appl. No. 15/718,911, filed Sep. 28, 2017, 21 pages.
Non-Final Office Action mailed on Aug. 4, 2020, issued in connection with U.S. Appl. No. 16/600,644, filed Oct. 14, 2019, 30 pages.
Non-Final Office Action mailed on Jan. 4, 2019, issued in connection with U.S. Appl. No. 15/948,541, filed Apr. 9, 2018, 6 pages.
Non-Final Office Action mailed on Jan. 4, 2022, issued in connection with U.S. Appl. No. 16/879,549, filed May 20, 2020, 14 pages.
Non-Final Office Action mailed on Nov. 4, 2022, issued in connection with U.S. Appl. No. 17/445,272, filed Aug. 17, 2021, 22 pages.
Non-Final Office Action mailed on Oct. 4, 2022, issued in connection with U.S. Appl. No. 16/915,234, filed Jun. 29, 2020, 16 pages.
Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Nov. 5, 2021, issued in connection with U.S. Appl. No. 16/153,530, filed Oct. 5, 2018, 21 pages.
Non-Final Office Action mailed on Apr. 6, 2020, issued in connection with U.S. Appl. No. 16/424,825, filed May 29, 2019, 22 pages.
Non-Final Office Action mailed on Feb. 6, 2018, issued in connection with U.S. Appl. No. 15/211,689, filed Jul. 15, 2016, 32 pages.
Non-Final Office Action mailed on Feb. 6, 2018, issued in connection with U.S. Appl. No. 15/237,133, filed Aug. 15, 2016, 6 pages.
Non-Final Office Action mailed on Jan. 6, 2021, issued in connection with U.S. Appl. No. 16/439,046, filed Jun. 12, 2019, 13 pages.
Non-Final Office Action mailed on Mar. 6, 2020, issued in connection with U.S. Appl. No. 16/141,875, filed Sep. 25, 2018, 8 pages.
Non-Final Office Action mailed on Oct. 6, 2023, issued in connection with U.S. Appl. No. 17/222,950, filed Apr. 5, 2021, 9 pages.
Non-Final Office Action mailed on Sep. 6, 2017, issued in connection with U.S. Appl. No. 15/131,254, filed Apr. 18, 2016, 13 pages.
Non-Final Office Action mailed on Sep. 6, 2018, issued in connection with U.S. Appl. No. 15/098,760, filed Apr. 14, 2016, 29 pages.
Non-Final Office Action mailed on Dec. 7, 2021, issued in connection with U.S. Appl. No. 16/168,389, filed Oct. 23, 2018, 36 pages.
Non-Final Office Action mailed on Feb. 7, 2023, issued in connection with U.S. Appl. No. 17/303,001, filed May 18, 2021, 8 pages.
Non-Final Office Action mailed on Jan. 7, 2022, issued in connection with U.S. Appl. No. 17/135,123, filed Dec. 28, 2020, 16 pages.
Non-Final Office Action mailed on Jun. 7, 2023, issued in connection with U.S. Appl. No. 16/179,779, filed Nov. 2, 2018, 29 pages.
Non-Final Office Action mailed on Mar. 7, 2022, issued in connection with U.S. Appl. No. 16/812,758, filed Mar. 9, 2020, 18 pages.

* cited by examiner

CONTEXTUALIZATION OF VOICE INPUTS

CROSS-REFERENCE TO RELATED APPLICATIONS

This application is a continuation of U.S. patent application Ser. No. 17/528,843, filed Nov. 17, 2021, issued as U.S. Pat. No. 11,979,960 on May 7, 2024, which is a continuation of U.S. patent application Ser. No. 16/819,755, filed on Mar. 16, 2020, issued as U.S. Pat. No. 11,184,969 on Nov. 23, 2021, which is a continuation of U.S. patent application Ser. No. 16/192,126, filed Nov. 15, 2018, issued as U.S. Pat. No. 10,593,331 on Mar. 17, 2020, which is a continuation of U.S. patent application Ser. No. 15/211,689, filed on Jul. 15, 2016, issued as U.S. Pat. No. 10,134,399 on Nov. 20, 2018, each of which is incorporated herein by reference in its entirety.

The present application incorporates herein by reference the entire contents of (i) U.S. patent application Ser. No. 15/098,867, filed Apr. 14, 2016, titled "Default Playback Device Designation"; and (ii) U.S. patent application Ser. No. 15/131,244, filed Apr. 18, 2016, titled "Metadata exchange involving a networked playback system and a networked microphone system."

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

I. OVERVIEW

Figure 1:
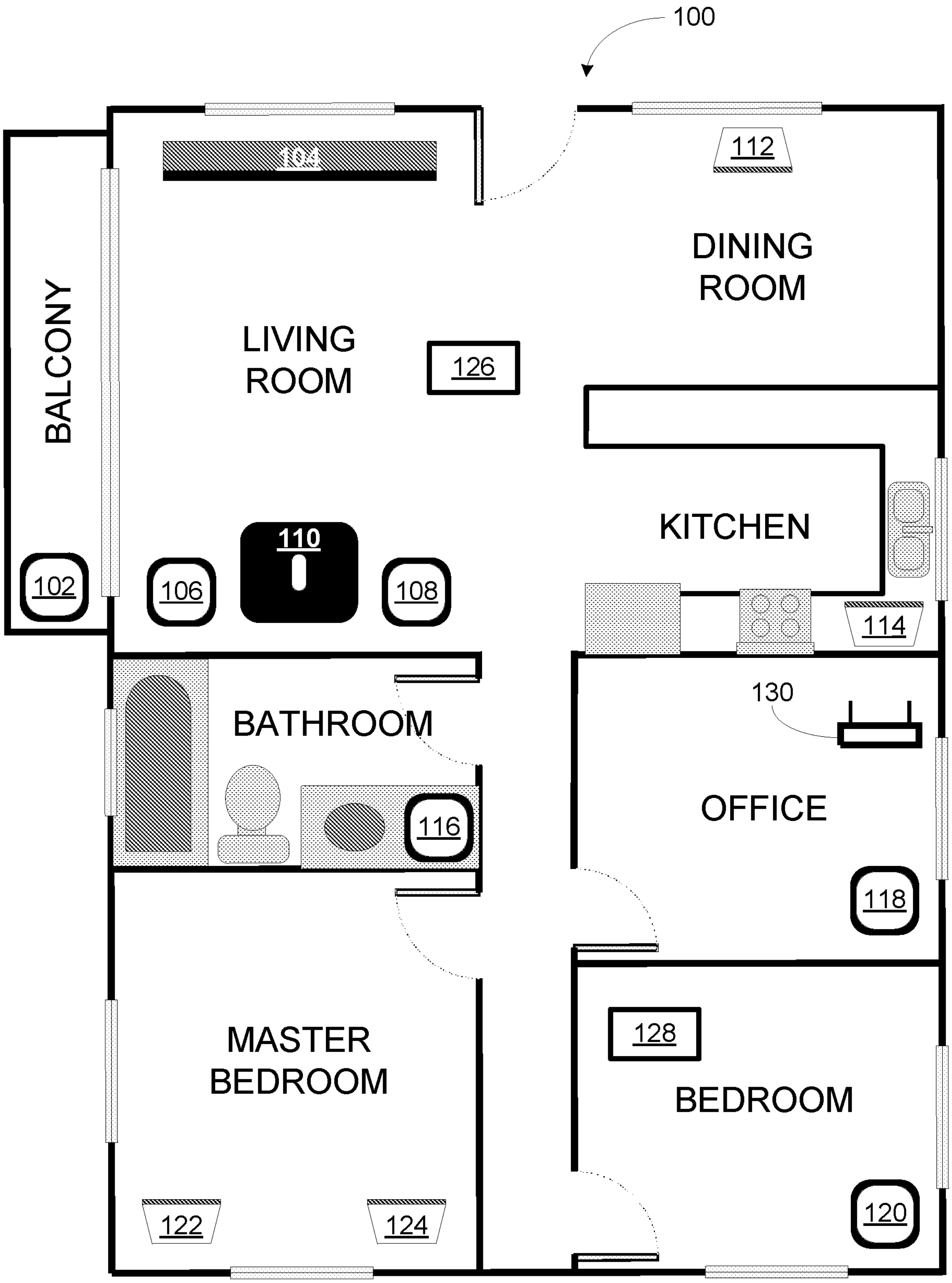
FIG. 1 shows an example media playback system configuration in which certain embodiments may be practiced.

Listening to media content out loud can be a social activity that involves family, friends, and guests. Media content may include, for instance, talk radio, books, audio from television, music stored on a local drive, music from media sources (e.g., Pandora® Radio, Spotify®, Slacker®, Radio, Google Play™, iTunes Radio), and other audible material. In a household, for example, people may play music out loud at parties and other social gatherings. In such an environment, people may wish to play the music in one listening zone or multiple listening zones simultaneously, such that the music in each listening zone may be synchronized, without audible echoes or glitches.

Such an experience may be enriched when voice commands are used to control an audio playback device or system, among other devices in a household (e.g., lights). For example, a user may wish to change the audio content, playlist, or listening zone, add a music track to a playlist or playback queue, or change a playback setting (e.g., play, pause, next track, previous track, playback volume, and EQ settings, among others) using various voice commands. Some example audio playback devices or systems may include a microphone to detect such voice commands.

In some cases, listening to media content out loud is an individual experience. For example, an individual may play music out loud for themselves in the morning before work, during a workout, in the evening during dinner, or at other times throughout the day at home or at work. For these individual experiences, the individual may choose to limit the playback of audio content to a single listening zone or area. Such an experience may be enriched when an individual can use a voice command to choose a listening zone, audio content, and playback settings, among other settings.

In some instances, multiple networked microphone devices (NMDs) may be used to control a household. An NMD may be, for example, a SONOS® playback device, server, or system capable of receiving voice inputs via a microphone. Additionally, an NMD may be a device other than a SONOS® playback device, server, or system (e.g., AMAZON® ECHO®, APPLE® IPHONE®) capable of receiving voice inputs via a microphone. U.S. application Ser. No. 15/098,867 entitled, "Default Playback Device Designation," which is hereby incorporated by reference, provides examples of voice-enabled household architectures.

In such a household in which multiple NMDs are present, contextualizing voice inputs received at a given NMD may further enhance a user's experience. In some examples, voice inputs may be received by one or more NMDs and then processed locally at the NMD or remotely on another device that is connected to the NMD by way of one or more networks. In one example, a single NMD may receive and process a particular voice input (e.g., a particular NMD to which the particular voice input was directed, and/or an NMD possessing the highest fidelity recording of the voice input). In further examples, multiple NMDs may receive and relay the voice inputs for processing. The one or more NMDs that receive and drive the actual voice processing are referred to herein as the "processing NMD(s)." In some instances, no actual processing may need to be performed by a processing NMD itself. Rather, a processing NMD may interact with one or more other devices or servers described herein to drive the voice processing.

In some embodiments, a processing NMD may be an NMD that might not have awareness of the zones within a household. For example, the processing NMD might not be able determine the actual or relative location (e.g., living room, bedroom, corner of a bedroom, etc) that a given voice input or command was recorded. Other NMDs present in the household may record, or otherwise be capable of recording, some aspect of a voice input and sending the recording to the processing NMD. The one or more NMD(s) that are not necessarily processing NMD(s) but that nonetheless are capable of recording some aspect of a voice input are referred to herein as "contextual NMD(s)." As further described herein, contextual NMDs may provide contextual information indicating a characteristic of a voice input that may improve the voice input received by processing NMDs.

In alternative embodiments, a processing NMD may have at least some zone awareness. According to this embodiment, the processing NMD may be a microphone-equipped playback device such as a Sonos® playback device. The processing NMD may be able to determine the actual or relative location of where a voice input or command was recorded. Additionally, the processing NMD may be capable of receiving voice data from contextual NMDs to help further determine and/or refine its conception of the actual or relative location of where a voice input or command was recorded. Example scenarios are further described herein.

Within examples, a processing NMD may receive voice data indicating a voice command. For instance, the processing NMD may receive voice data via a microphone of the processing NMD. In other examples, the processing NMD may receive voice data via a network interface of the processing NMD.

In further examples, the processing NMD may receive contextual information indicating a characteristic of the voice command. Example characteristics of a given voice command may include, among other examples, one or more of: the zone in which the voice command was recorded (e.g., a living room or bedroom), the actual location of where the voice command was received (e.g., a particular corner of the living room), or relative magnitudes of the voice command as perceived by one or more devices or servers, which the processing NMD may then use to infer a relative location.

Contextual information indicating a characteristic of the voice command provides, as one possible benefit, location of a user or a particular device within a household, which may supplement the voice data recorded by a processing NMD. The processing NMD may receive such contextual information via a network interface from any one or a combination of the devices and/or servers described herein.

In some implementations, the processing NMD may determine a device operation corresponding to a given voice command. Determining a device operation may include identifying a playback zone that corresponds to the characteristic of the voice command, and determining that the voice command corresponds to one or more particular devices that are associated with the identified zone. In some embodiments, the processing NMD may independently determine the device operation corresponding to the voice command. Alternatively, any one or a combination of the devices or servers described herein may determine the device operation corresponding to the voice command.

In further implementations, the processing NMD may cause one or more particular devices to perform the device operation. For example, the processing NMD may receive a voice command to play a particular song in the living room. In response, the processing NMD may cause one or more playback devices in the living room to play the particular song. In another example, the processing NMD may receive a voice command to turn the lights on in the kitchen. In response, the processing NMD may cause one or more illumination devices or components to turn on. As more household devices become "smart" (e.g., by incorporating a network interface), possible device operations may expand to control these household devices.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments. Moreover, the examples described herein may extend to a multitude of embodiments formed by combining the example features in any suitable manner.

II. EXAMPLE OPERATING ENVIRONMENT

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
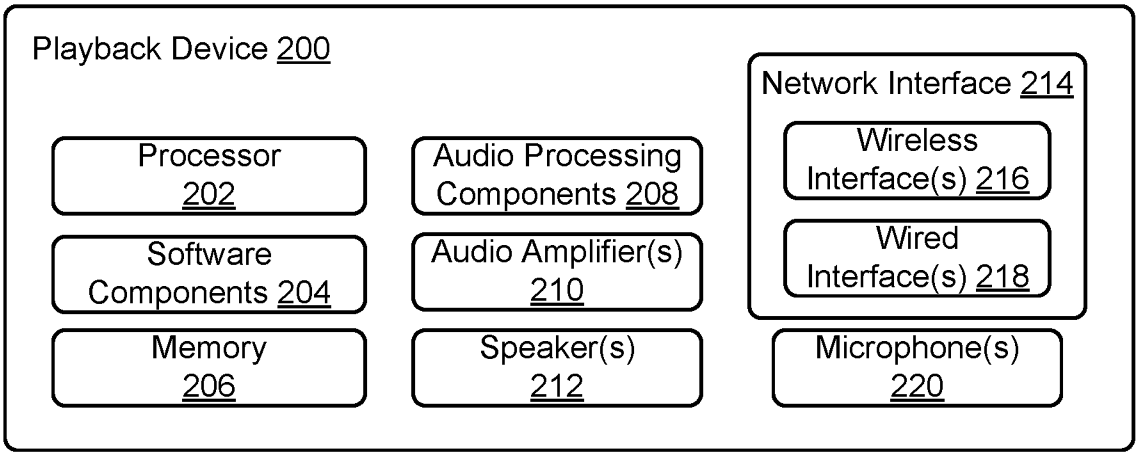
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not include the microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
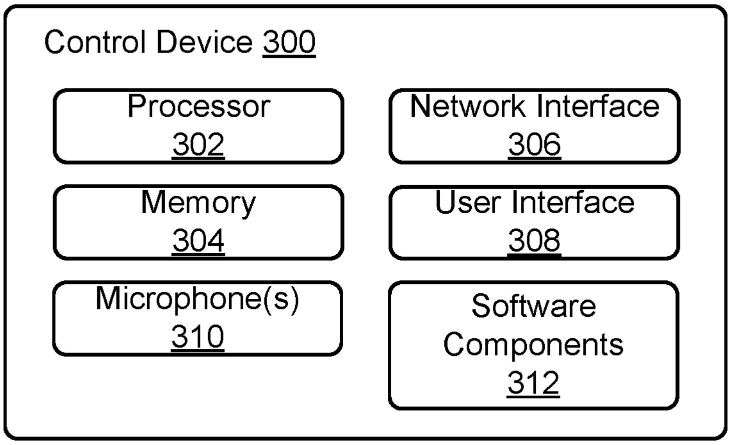
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
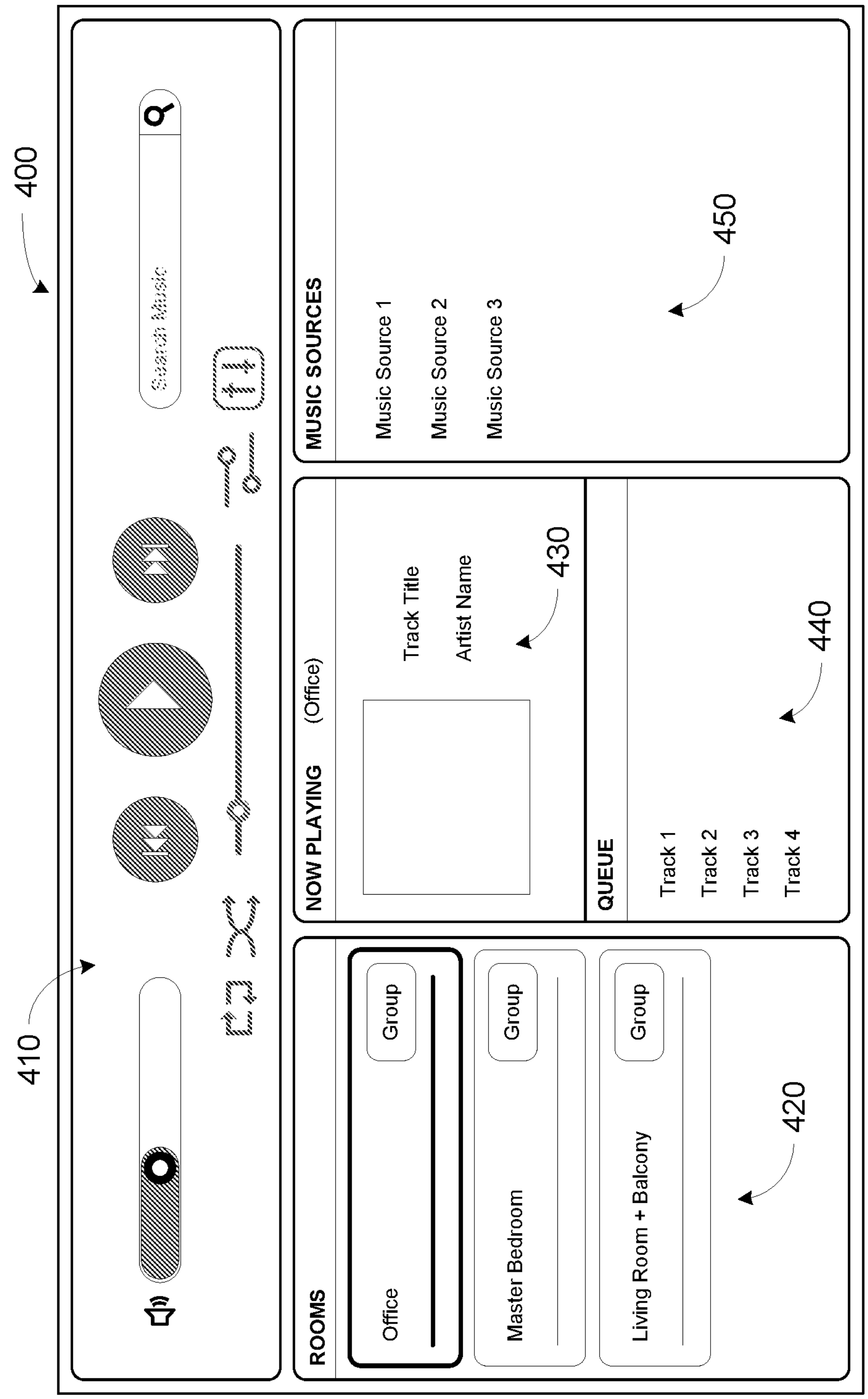
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

c. Example Plurality of Networked Devices

Figure 5:
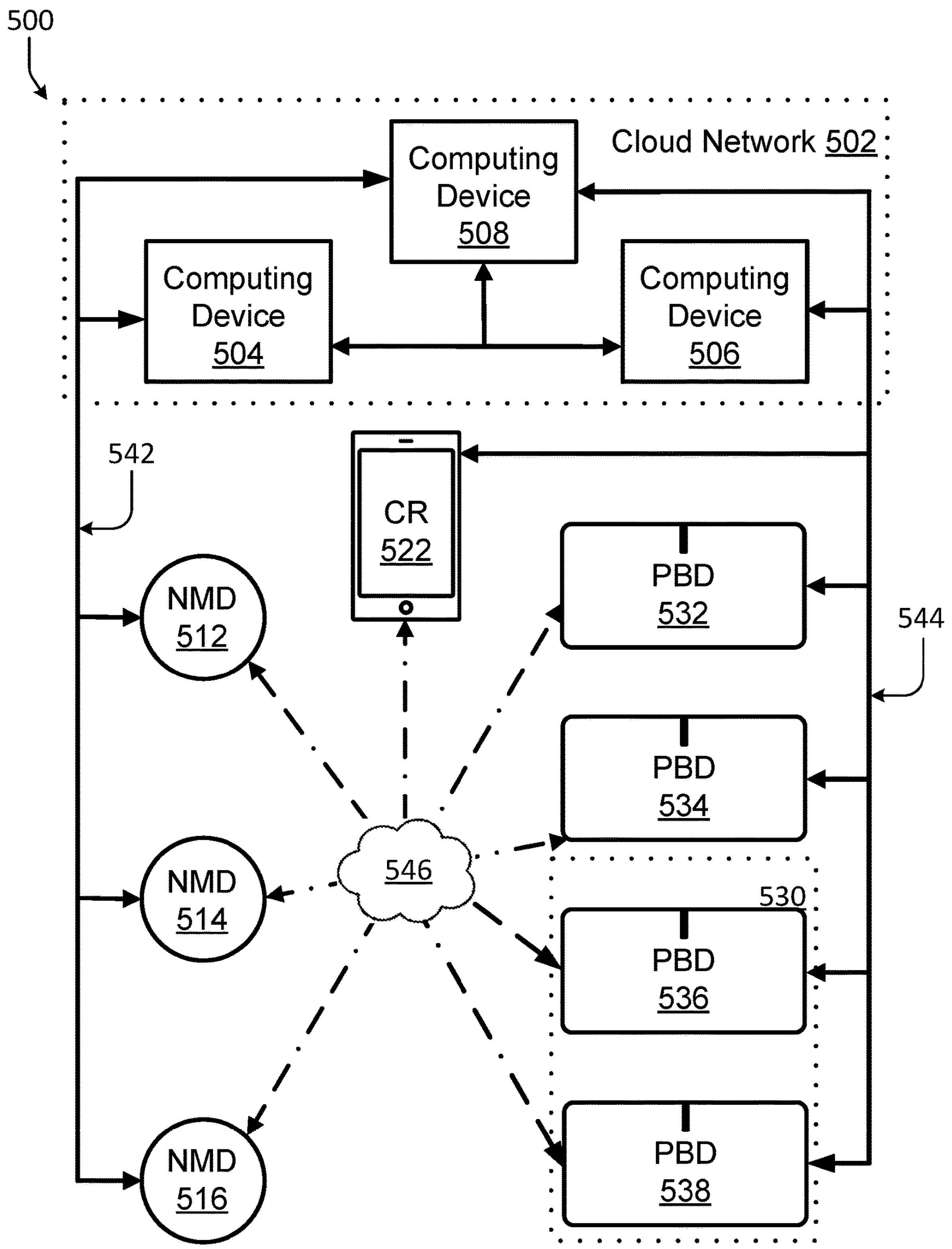
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing devices 504, 506, and 508 may include one or more modules or servers. For case of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, a single access point may include communication paths 542 and 544. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
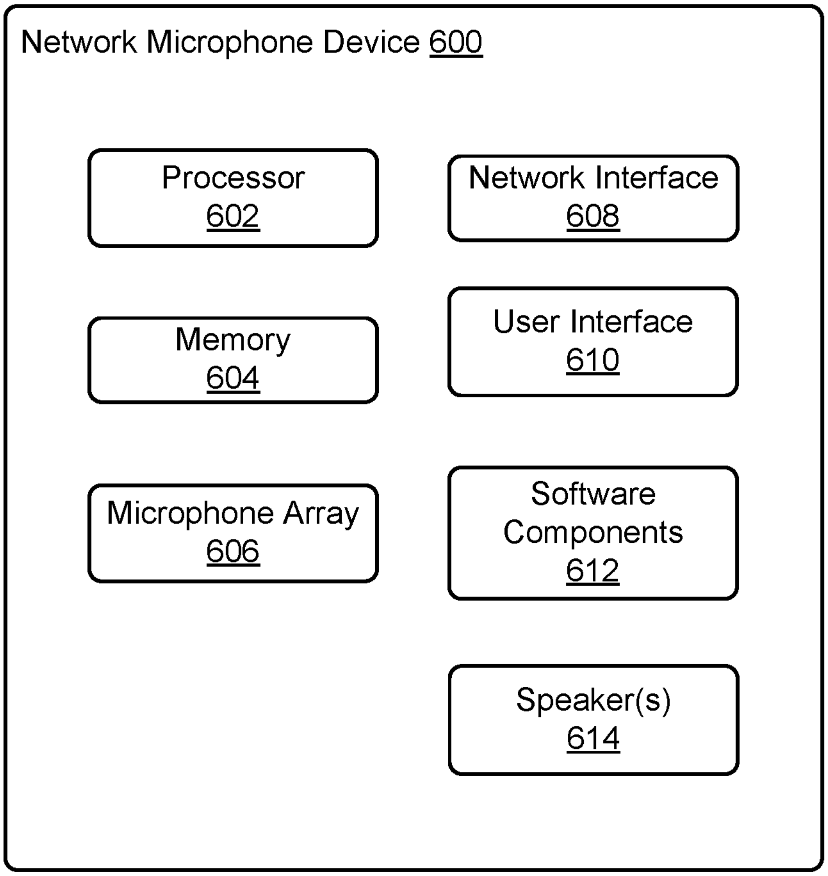
FIG. 6 shows a functional block diagram of an example network microphone device.

FIG. 6 shows a function block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. EXAMPLE SYSTEM AND METHOD TO PROVIDE CONTEXTUAL INFORMATION CORRESPONDING TO A VOICE COMMAND

In a household in which multiple NMDs are present, contextualizing voice inputs received at a given NMD may enhance a user's experience. Received voice inputs may be received by one or more NMDs and then processed locally or remotely. In one example, a single NMD receives and processes voice inputs (e.g., a particular NMD to which the voice inputs were directed to, and/or the NMD possessing the highest fidelity recording of the voice input; e.g., "Alexa . . . " or "Siri . . . "). In another example, multiple NMDs receive and relay the voice inputs for processing to another device or group of devices. The one or more NMDs that receive and drive the actual voice processing are referred to herein as the "processing NMD(s)." Any one of NMDs 512-516, PBDs 532-538, CR 522, or computing device 504-508 may operate as a processing NMD.

In some embodiments, a processing NMD may be an NMD that has no zone awareness. For example, the processing NMD may not be able determine the actual or relative location (e.g., living room, bedroom, corner of a bedroom, etc) where a voice input or command was recorded. In such embodiment, NMDs in the household other than the processing NMD(s) may record, or otherwise be capable of recording, some aspect of a voice input and sending the recording to the processing NMD. The one or more NMD(s) that are not necessarily processing NMD(s) but that nonetheless are capable of recording some aspect of the voice input are referred to herein as "contextual NMD(s)." As further described herein, contextual NMDs may provide contextual information indicating a characteristic of a voice input that may improve the voice input received by processing NMDs.

In other embodiments, a processing NMD may have at least some zone awareness. According to this embodiment, the processing NMD may be a microphone equipped device such as NMDs 512-516, PBDs 532-538, CR 522, or computing device 504-508. The processing NMD may be able to determine the actual or relative location of where a voice input or command was recorded. Additionally, the processing NMD may be capable of receiving voice data from contextual NMDs to further determine the actual or relative location of where a voice input or command was recorded. Example scenarios are further described herein.

In some embodiments, a processing NMD may obtain some zone awareness or contextual information based on its GPS, or WiFi connection. The GPS or WiFi connection may provide an indication to the processing NMD that a user is currently in the household. Accordingly, in response to a command to play music out loud, the processing NMD may receive contextual information corresponding to the zone(s) in which the voice input was recorded and play music in the particular zone(s) (rather than requiring a user to specify the zone location in the spoken command).

Generally, it should be understood that one or more functions described herein may be performed by the processing NMD individually or in combination with the media playback system server or networked microphone system server (e.g., computing devices that are part of the cloud network 502), PBDs 532-538, NMDs 512-516, CR 522, or any other devices described herein.

Example device operations may include operations to modify any of the media playback system controls or playback settings. Playback settings may include, for example, playback volume, playback transport controls, music source selection, and grouping, among other possibilities. Other device operations may include operations to adjust television control or play settings, mobile phone device settings, or illumination devices, among other device operations that may be adjustable or controllable via an NMD.

Figure 7:
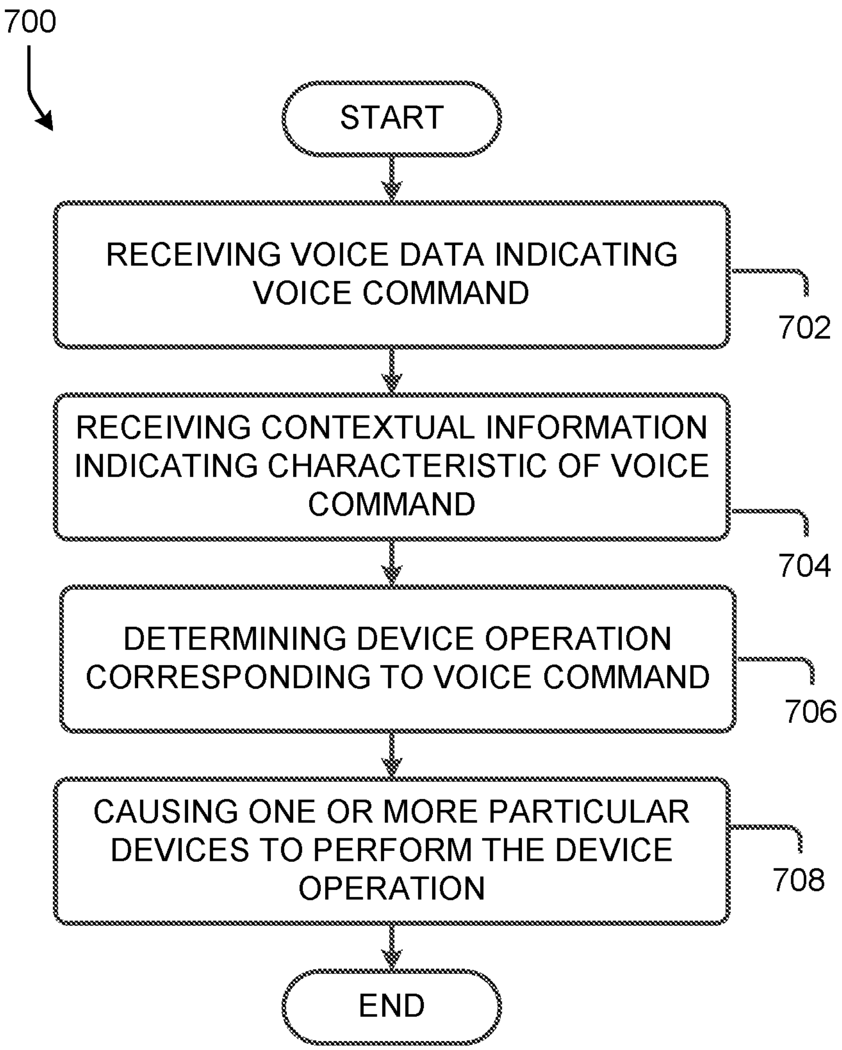
FIG. 7 shows a technique according to example embodiments.

Implementation 700 shown in FIG. 7 presents an embodiment of example techniques described herein. Implementation 700 that can be implemented within an operating environment including or involving, for example, the media playback system 100 of FIG. 1, one or more playback devices 200 of FIG. 2, one or more control devices 300 of FIG. 3, the user interface of FIG. 4, and/or the configuration shown in FIG. 5. Implementation 700 may include one or more operations, functions, or actions as illustrated by one or more of blocks 702-708. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementation 700 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementation 700 and other processes and methods disclosed herein, each block in FIG. 7 may represent circuitry that is wired to perform the specific logical functions in the process.

a. Receive Voice Data Indicating Voice Command

At block 702, implementation 700 involves receiving voice data indicating a voice command. For instance, a processing NMD, such as NMD 512, receives voice data. In some embodiments, the processing NMD may receive voice data via one or more microphones of the processing NMD. For example, a processing NMD located in or near the living room of a household may record a voice input from a user located in the living room.

In some cases, the processing NMD may receive voice data via a network interface of the processing NMD, perhaps in addition to receiving voice data via a microphone. For example, the processing NMD may communicate and receive voice data from the media playback system server, networked microphone system server, PBDs 532-536, NMDs 512-516, CR 522, or any other devices described herein. In some embodiments, the media playback system server and/or networked microphone system server may be cloud-based server systems (e.g., computing devices that are part of the cloud network 502). The processing NMD may receive voice data indicating a voice command from any one or a combination of these devices and/or servers.

In some embodiments, the processing NMD may receive voice data from one or more contextual NMDs and determine separate time-aligned recordings of the voice data by respective NMDs. In other embodiments, the computing device 506, CR 522, or any other device or server described herein may receive voice data from one or more contextual NMDs, determine separate time-aligned recordings of the voice data by respective NMDs, and then send the time-aligned recordings to the processing NMD. Other examples involving the combination of devices and/or systems described herein are possible.

In some implementations, one or more contextual NMDs may continuously send voice data to the computing device 506, CR 522, or any other device or server described herein. In some embodiments, the voice data may be available locally for the processing NMD to receive voice data. In other embodiments, the voice data may be available remotely via one or more servers described herein.

In other implementations, one or more contextual NMDs may continuously record ambient noise but might only provide its recording to a processing NMD if the given NMD (1) itself is woken up by a "wake-up word" (e.g., "hey Sonos", "Ski", "Alexa", or other voice input), or (2) receives an instruction from another NMD (contextual or processing NMD), device, or system to provide the recording to the processing NMD. In such instances, the voice data following the wake-up word may be provided to the processing NMD via the one or more contextual NMDs. In some embodiments, the one or more contextual NMDs may continuously send voice data following the wake-up word while voice recordings are made via respective microphones of the one or more contextual NMDs. In other embodiments, the one or more contextual NMDs may continuously send voice data following the wake-up word until the one or more contextual NMDs receive instructions from another device or server to stop recording or sending voice data to the processing NMD. Alternatively, the one or more contextual NMDs may provide voice data of a specific duration of time (e.g., the next 10 seconds of voice data following the wake-up word) to the processing NMD.

b. Receive Contextual Information Indicating Characteristic of Voice Command

At block 704, implementation 700 involves receiving contextual information indicating a characteristic of the voice command. For instance, the processing NMD may receive, via a network interface from another NMD, contextual information indicating a characteristic of the voice command. A characteristic of the voice command may include, for example, the actual location of where the voice command was recorded (e.g., the location of the NMD that is recording the voice input), or the volume level (e.g., relative magnitude) of the voice command as perceived by the NMD, which the processing NMD may then use to infer a relative location. The processing NMD may receive such contextual information via a network interface from any one or a combination of the devices and/or servers described herein.

As noted above, contextual information indicating a characteristic of the voice command may facilitate locating a user or a particular device within a household, so as to supplement the voice data recorded by a processing NMD. Benefits of providing contextual information to a processing NMD may be particularly noticeable for processing NMDs that have no zone awareness. By way of example, one or more contextual NMDs located in various living spaces of a household may record a voice input or command to turn off the lights (e.g., "turn off the lights in here"). The processing NMD individually might not know which lights in the household to turn off based on the recorded voice input. One or more contextual NMDs, however, may determine the actual or relative location of where the voice input was recorded, and send contextual information to the processing NMD to assist in determining which lights in a household to turn off.

In some embodiments, a contextual NMD may provide contextual information to a processing NMD that has some zone awareness. One or more contextual NMDs may locally or remotely (via another device or server described herein) store a look-up table that provides additional contextual information associated with a specific room or zone. One or more contextual NMDs may share the look-up table with other devices or servers via a network interface. The information in the look-up table may include specific words or commands that correspond to a specific room, zone, playback device, or any other device coupled to the media playback system via a network interface. In some implementations, one or more contextual NMDs (and/or one or more combinations of devices or servers described herein) may create a look-up table. Additionally, one or more contextual NMDs may modify, add, or subtract specific words or commands in a look-up table.

Within examples, a user may speak a particular voice command (e.g., "turn off the lights in District 12") that might not provide sufficient context for a processing NMD to perform the particular device operation associated with the voice command. One or more contextual NMDs that recorded the voice command may look-up which room or zone the voice command (e.g., "District 12") is associated with, determine that it is associated with a particular room and/or zone, and provide such contextual information to the processing NMD.

In some embodiments, a contextual NMD may have multiple microphones to record voice inputs or commands. Utilizing the recordings from multiple microphones, the processing NMD may determine a relative location of the voice command based on the relative magnitude of the respective recordings and a direction in which the voice input was received. Additionally or alternatively, any one of or a combination of the devices or servers described herein may determine the location of the voice command and send data indicative of the location to the processing NMD via the network interface.

The characteristic of the voice command may include data indicating the playback zone that corresponds to the actual or relative location in which the voice command was received. For example, the voice command may be a command to play music in a particular room of a household (e.g., "let's get some music going in here"). The voice command may be recorded by one or more contextual NMDs located in or near the particular room. In some cases, each NMD may be associated with a playback zone of a household (e.g., living room, kitchen, bedroom). The one or more contextual NMDs may provide the processing NMD with contextual information indicating the playback zone that corresponds to the actual or relative location in which the voice command was received. For example, the processing NMD may receive a message indicating that a voice command or input was received from another processing NMD in the living room. In another example, a processing NMD may receive a message indicating that a voice command or input was received from a contextual NMD in the bedroom near the living room at a particular volume level. One or more other contextual NMDs in proximity may also record and provide the processing NMD with contextual information indicating a playback zone.

In another aspect, the contextual information indicating the characteristic of the voice command may vary in level of specificity. For example, multiple NMDs (contextual or processing NMDs) proximate to a user may record voice inputs from the user located in the kitchen. The recordings may be sent to a processing NMD and/or any one or a combination of the devices or servers described herein to determine the actual or relative location of where the voice command or input was received. In one example, a processing NMD may receive an indication or message indicating that the voice command or input received was dominant in a particular living space (e.g., kitchen). In another example, a processing NMD may receive an indication that the voice input received was split (equally, or to some extent) between two contextual NMDs in different living spaces proximate to the user (e.g., the kitchen and the living room). The processing NMD may use such indication to, for example, group playback devices in the different living spaces as a zone scene and play back music within the zone scene. In yet another example, a processing NMD may receive an indication that the voice input received was in a particular zone scene or floor of a house (e.g., first floor).

In a further example, three or more NMDs may triangulate a specific location of the voice input or user based on relative magnitudes of voice input recorded at each respective NMD. The processing NMD may then receive an indication indicating that the voice command or input received was from a particular area within a living space (e.g., corner of a kitchen).

In some embodiments, the contextual information indicating the characteristic of the voice command may infer orientation or direction of the voice input or command relative to an NMD. The NMD as described may have multiple microphones to record the voice inputs or commands. The orientation or direction of the voice input or command may be of particular relevance in determining a device operation corresponding to the voice input or command. For instance, the device operation corresponding to the voice input or command (e.g., "turn off the lights in front of me") may be associated with the relative direction in which the user is facing.

In some examples, orientation or direction may be determined based on frequency response of the voice inputs or commands. Generally, an NMD that a user is facing while recording a voice input or command may have a larger high-frequency component than an NMD that the user is not facing. In particular, the processing NMD or media playback system server (or any one or a combination of the devices or servers described herein) with (1) knowledge of the frequency responses of the respective microphones and (2) separate time-aligned recordings of the voice inputs by multiple NMDs may normalize the frequency response (e.g., 35 Hz-22.05 kHz) of the respective recordings of the voice inputs with respect to the low frequency band. For instance, the frequency response of the voice inputs recorded from a contextual NMD may be normalized with another contextual NMD with respect to the fundamental frequency band for human voice (e.g., 85-255 Hz). The high-frequency components of the normalized responses of the voice inputs may then be compared to determine the direction in which the user is facing while recording the voice input.

In another example, orientation or direction may be determined by using the variance in the known polar responses of two or more microphones of an NMD. The variance may help determine the angle of the user (or voice input) relative to an NMD, perpendicular to the plane of the two or more microphones. The angle of the user relative to an NMD may help more precisely locate the direction in which the user is facing while recording the voice input and may add an additional level of confidence that the voice input was received from a certain direction or orientation. This may be accomplished by measuring the polar responses of the voice inputs at each microphone simultaneously and matching the variance with the known polar responses.

In other examples, the angle of the user relative to an NMD may be determined by measuring the delay across two or more microphones with a known distance between them. Further examples may include visual imaging, measuring the relative magnitude across two or more microphones or NMDs, Bluetooth proximity detection between an NMD and another computing device, such as a mobile phone, or monitoring WiFi Received Signal Strength Indication (RSSI) to detect user proximity and/or location.

c. Determine Device Operation Corresponding to Voice Command

At block 706, implementation 700 involves determining a device operation corresponding to the voice command. Determining a device operation may include the processing NMD identifying various groupings (e.g., bonded zones, playback zones, zone scenes among other examples) that correspond to the characteristic of the voice command, and determining that the voice command corresponds to one or more particular devices that are associated with the identified groupings. In some cases, the processing NMD may independently determine the device operation corresponding to the voice command. Alternatively, any one or a combination of the devices or servers described herein may determine the device operation corresponding to the voice command. For example, a processing NMD (e.g., NMD 512) may send a request to computing device 506 or contextual NMDs to determine the device operation corresponding to the voice command.

In some examples, identifying various groupings that correspond to the characteristic of the voice command may include the processing NMD sending a request for an indication of the bonded playback devices and/or playback zone(s) that detected the voice command. The request may be sent via the network interface from any one or a combination of the devices and/or servers described herein. For example, each PBD may be in a particular zone, such as the living room, bathroom, or bedroom of a household. The processing NMD may send a request to one or more of the PBDs (or contextual NMDs) to identify the playback zone and location of the each PBD that recorded the voice input or command. Alternatively, the processing NMD may send a request to computing device 506 which may have received the recorded voice inputs from the PBDs (or contextual NMDs) and determined time-aligned recordings for respective PBDs.

In some cases, the processing NMD may be an NMD that might not have any zone awareness. The processing NMD may receive a voice input or command to play music in a particular location (e.g., "play some music in here"). The processing NMD may then send a request to the contextual NMDs (or PBDs configured as NMDs) that recorded the voice inputs. The contextual NMDs which are associated with a particular zone (e.g., living room, kitchen) may then send contextual information indicating the zone in which the user recorded the voice input, so as to indicate to the processing NMD the location corresponding to "here."

In other cases, the processing NMD has some zone awareness. In such cases, the processing NMD may individually determine the particular zone in which the user recorded the voice input. Additionally, the processing NMD may send a request to other contextual NMDs that may have recorded the voice input or command in other zones.

In some embodiments, determining that the voice command corresponds to one or more particular devices that are associated with the identified zone may further include determining that the voice command is a playback command corresponding to one or more playback devices in the identified zone. For example, the processing NMD may independently, concurrently, and/or sequentially determine that the recorded voice input is a voice command to play music in a particular location (e.g., Siri, play some music in here). As described previously, the contextual NMDs may provide the missing contextual information corresponding to the zones in which the voice input was recorded or help supplement the processing NMD by providing contextual information corresponding to additional zones in which the voice input was recorded.

In other embodiments, determining that the voice command corresponds to one or more particular devices that are associated with identified zone may include determining that the voice command is a command to control the one or more particular devices. For example, the voice command may be a command to turn off the lights in a particular location (e.g., "turn off the lights"). The processing NMD may receive contextual information corresponding to the zone or location in which the voice input was recorded in order to determine which lights in a household to turn off. Other examples are possible.

d. Causing One or More Particular Devices to Perform Device Operation

At block 708, implementation 700 involves causing one or more particular devices to perform the device operation. For example, the processing NMD may receive a voice command to play music in a particular location (e.g., "play some music here"). After identifying the location or zones in which the voice input was recorded, the processing NMD may cause one or more playback devices in the location or zones to play music. In particular, after receiving contextual information from one or more contextual NMDs (or PBDs configured as NMDs) that the voice input to play music was recorded from the living room and kitchen, the processing NMD may cause the PBDs in the living room and kitchen to play music.

In another example, the processing NMD may receive a voice command to turn on the lights in a particular room (e.g., "turn on the lights"). After receiving contextual information indicating that the voice input to turn on the lights was recorded in the bedroom, the processing NMD may cause one or more illumination devices in the bedroom to turn on.

In some embodiments, after identifying all the zones in which the voice input was recorded, the processing NMD may cause one or more particular devices in only some or one of the zones in which the recorded voice input was dominant (e.g., highest volume level). For example, the processing NMD may receive contextual information that the voice input was recorded from the kitchen, bedroom, and the living room. The processing NMD may individually or in combination with other devices, such as computing device 506, may determine that the relative magnitude of the recorded voice input was dominant in the living room. Accordingly, the processing NMD may cause one or more particular devices (e.g., illumination devices or PBDs 532-536) in the living room to perform the device operation corresponding to the voice command.

Any one or a combination of the devices or servers described herein may cause one or more particular device to perform the device operation, which as noted above may be facilitated by one or more networks connecting the devices (e.g., connection means 546). For example, the processing NMD may send a request to computing device 506 (or another processing NMD) to determine a device operation corresponding to a voice command. The computing device may then determine the device operation and cause one or more particular devices to perform the device operation. The computing device 506 may send the determined device operation directly to the one or more particular devices (e.g., PBDs 532-536) via the network interface. Alternatively, the computing device 506 may send the determined device operation to one or more processing NMDs to cause one or more particular devices to perform the device operation.

IV. CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A network microphone device comprising:

at least one microphone;

at least one network interface;

at least one processor; and at least one non-transitory computer-readable medium comprising program instructions that are executable by the at least one processor such that the network microphone device is configured to:

detect, via the at least one microphone, microphone data comprising speech;

receive, via the at least one network interface over at least one network from a network device comprising one or more sensors, contextual sensor data;

determine, based on the detected microphone data and the received contextual sensor data, an orientation of a user relative to the network microphone device;

determine that the speech is directed at the network microphone device based on the determined orientation of the user relative to the network microphone device; and based on the determination that the speech is directed at the network microphone device, process, via a voice assistant, at least a portion of the speech as a voice input.

2. The network microphone device of claim 1, wherein the at least one non-transitory computer-readable medium further comprises program instructions that are executable by the at least one processor such that the network microphone device is configured to:

detect, via the at least one microphone, additional microphone data comprising additional speech;

receive, via the at least one network interface over the at least one network from the network device, additional contextual sensor data;

determine, based on the detected additional microphone data and the received additional contextual sensor data, an additional orientation of the user relative to the network microphone device;

determine that the speech is not directed at the network microphone device based on the determined additional orientation of the user relative to the network microphone device; and based on the determination that the speech is not directed at the network microphone device, forego processing, via the voice assistant, of the additional speech as an additional voice input.

3. The network microphone device of claim 1, wherein the at least one network comprises a local area network, and wherein the instructions that are executable by the at least one processor such that the network microphone device is configured to determine that the speech is directed at the network microphone device based on the determined orientation of the user relative to the network microphone device comprise instructions that are executable by the at least one processor such that the network microphone device is configured to:

select the network microphone device from among a plurality of network microphone devices connected to the local area network based on the orientation of the user relative to the network microphone device.

4. The network microphone device of claim 1, wherein the instructions that are executable by the at least one processor such that the network microphone device is configured to determine that the speech is directed at the network microphone device based on the determined orientation of the user relative to the network microphone device comprise instructions that are executable by the at least one processor such that the network microphone device is configured to:

increase a confidence metric that the speech is directed at the network microphone device based on the determined orientation of the user relative to the network microphone device.

5. The network microphone device of claim 1, wherein the at least one microphone comprises a first microphone and a second microphone, and wherein the instructions that are executable by the at least one processor such that the network microphone device is configured to determine the orientation of the user relative to the network microphone device comprise instructions that are executable by the at least one processor such that the network microphone device is configured to:

compare a first recording of the speech by the first microphone to a second recording of the speech by the second microphone to determine the orientation of the user relative to the network microphone device.

6. The network microphone device of claim 5, wherein the first microphone and the second microphone are carried on the network microphone device at a known distance, and wherein the instructions that are executable by the at least one processor such that the network microphone device is configured to compare the recording of the speech by the first microphone to the recording of the speech by the second microphone comprise instructions that are executable by the at least one processor such that the network microphone device is configured to:

measure a delay of the speech across the first microphone and the second microphone based on a comparison between the first recording and the second recording.

7. The network microphone device of claim 5, and wherein the instructions that are executable by the at least one processor such that the network microphone device is configured to compare the recording of the speech by the first microphone to the recording of the speech by the second microphone comprise instructions that are executable by the at least one processor such that the network microphone device is configured to:

measure relative magnitudes of the speech in the first recording and the second recording.

8. The network microphone device of claim 1, wherein the one or more sensors comprise at least one additional microphone, wherein the microphone data comprises a first recording of the speech by the at least one microphone, and wherein the contextual sensor data comprises a second recording of the speech by the at least one additional microphone, and wherein the instructions that are executable by the at least one processor such that the network microphone device is configured to determine the orientation of the user relative to the network microphone device comprise instructions that are executable by the at least one processor such that the network microphone device is configured to:

determine that a frequency response of the first recording has a larger high-frequency component relative to a frequency response of the second recording.

9. The network microphone device of claim 1, wherein the one or more sensors comprise an imaging sensor, and wherein the contextual sensor data comprises contextual imaging data.

10. The network microphone device of claim 1, further comprising at least one sensor, and wherein the program instructions that are executable by the at least one processor such that the network microphone device is configured to determine the orientation of the user relative to the network microphone device comprise program instructions that are executable by the at least one processor such that the network microphone device is configured to:

determine the orientation of the user relative to the network microphone device based on the detected microphone data, the received contextual sensor data, and additional contextual sensor data received via the at least one sensor.

11. The network microphone device of claim 1, wherein the instructions that are executable by the at least one processor such that the network microphone device is configured to process at least the portion of the speech as the voice input comprise instructions that are executable by the at least one processor such that the network microphone device is configured to:

query, via the network interface, one or more servers of a voice assistant service configured to provide the voice assistant, with the voice input.

12. The network microphone device of claim 1, further comprising at least one amplifier configured to drive one or more audio transducers, and wherein the instructions are executable by the at least one processor such that the network microphone device is further configured to:

receive, via the voice assistant, data representing a playback command corresponding to the voice input; and play back audio content according to the playback command via the at least one amplifier.

13. A system comprising:

a network microphone device comprising at least one microphone and at least one network interface;

a network device comprising one or more sensors;

at least one processor; and at least one non-transitory computer-readable medium comprising program instructions that are executable by the at least one processor such that the system is configured to:

detect, via the at least one microphone, microphone data comprising speech;

receive, via the at least one network interface over at least one network from the network device, contextual sensor data;

determine, based on the detected microphone data and the received contextual sensor data, an orientation of a user relative to the network microphone device;

determine that the speech is directed at the network microphone device based on the determined orientation of the user relative to the network microphone device; and based on the determination that the speech is directed at the network microphone device, process, via a voice assistant, at least a portion of the speech as a voice input.

14. The system of claim 13, wherein the at least one non-transitory computer-readable medium further comprises program instructions that are executable by the at least one processor such that the system is configured to:

detect, via the at least one microphone, additional microphone data comprising additional speech;

receive, via the at least one network interface over the at least one network from the network device, additional contextual sensor data;

determine, based on the detected additional microphone data and the received additional contextual sensor data, an additional orientation of the user relative to the network microphone device;

determine that the speech is not directed at the network microphone device based on the determined additional orientation of the user relative to the network microphone device; and based on the determination that the speech is not directed at the network microphone device, forego processing, via the voice assistant, of the additional speech as an additional voice input.

15. The system of claim 13, wherein the at least one network comprises a local area network, and wherein the instructions that are executable by the at least one processor such that the system is configured to determine that the speech is directed at the network microphone device based on the determined orientation of the user relative to the network microphone device comprise instructions that are executable by the at least one processor such that the system is configured to:

select the network microphone device from among a plurality of network microphone devices connected to the local area network based on the orientation of the user relative to the network microphone device.

16. The system of claim 13, wherein the instructions that are executable by the at least one processor such that the system is configured to determine that the speech is directed at the network microphone device based on the determined orientation of the user relative to the network microphone device comprise instructions that are executable by the at least one processor such that the system is configured to:

increase a confidence metric that the speech is directed at the network microphone device based on the determined orientation of the user relative to the network microphone device.

17. The system of claim 13, wherein the one or more sensors comprise at least one additional microphone, wherein the microphone data comprises a first recording of the speech by the at least one microphone, and wherein the contextual sensor data comprises a second recording of the speech by the at least one additional microphone, and wherein the instructions that are executable by the at least one processor such that the system is configured to determine the orientation of the user relative to the network microphone device comprise instructions that are executable by the at least one processor such that the system is configured to:

determine that a frequency response of the first recording has a larger high-frequency component relative to a frequency response of the second recording.

18. The system of claim 13, wherein the one or more sensors comprise an imaging sensor, and wherein the contextual sensor data comprises contextual imaging data.

19. The system of claim 13, further comprising at least one sensor, and wherein the program instructions that are executable by the at least one processor such that the system is configured to determine the orientation of the user relative to the network microphone device comprise program instructions that are executable by the at least one processor such that the system is configured to:

determine the orientation of the user relative to the network microphone device based on the detected microphone data, the received contextual sensor data, and additional contextual sensor data received via the at least one sensor.

20. At least one non-transitory computer-readable medium comprising program instructions that are executable by at least one processor such that a network microphone device is configured to:

detect, via at least one microphone, microphone data comprising speech;

receive, via at least one network interface over at least one network from a network device comprising one or more sensors, contextual sensor data;

determine, based on the detected microphone data and the received contextual sensor data, an orientation of a user relative to the network microphone device;

determine that the speech is directed at the network microphone device based on the determined orientation of the user relative to the network microphone device; and based on the determination that the speech is directed at the network microphone device, process, via a voice assistant, at least a portion of the speech as a voice input.

* * * * *